United States Patent
Yukita et al.

(10) Patent No.: US 8,293,856 B2
(45) Date of Patent: Oct. 23, 2012

(54) PROCESS FOR PREPARING OLEFIN POLYMER USING MIXED CATALYST

(75) Inventors: Takashi Yukita, Chiba (JP); Masahiro Yamashita, Chiba (JP); Nobukazu Yamahira, Yamaguchi (JP); Wataru Yamada, Chiba (JP); Hiromu Kaneyoshi, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 67 days.

(21) Appl. No.: 12/993,586

(22) PCT Filed: Aug. 14, 2009

(86) PCT No.: PCT/JP2009/064349
§ 371 (c)(1),
(2), (4) Date: Nov. 19, 2010

(87) PCT Pub. No.: WO2010/021304
PCT Pub. Date: Feb. 25, 2010

(65) Prior Publication Data
US 2011/0077369 A1    Mar. 31, 2011

(30) Foreign Application Priority Data

Aug. 19, 2008  (JP) .................................. 2008-210480

(51) Int. Cl.
C08F 4/6592 (2006.01)
C08F 4/653 (2006.01)
C08F 4/655 (2006.01)
B01J 31/22 (2006.01)

(52) U.S. Cl. ........ 526/113; 526/114; 526/161; 526/165; 526/351; 526/943; 502/103; 502/113; 502/152

(58) Field of Classification Search .................. 526/113, 526/114, 165, 351, 943, 161; 502/103, 113, 502/152
See application file for complete search history.

(56) References Cited

U.S. PATENT DOCUMENTS

| | | | |
|---|---|---|---|
| 4,960,878 A | 10/1990 | Crapo et al. | |
| 4,990,640 A | 2/1991 | Tsutsui et al. | |
| 5,041,584 A | 8/1991 | Crapo et al. | |
| 5,153,157 A | 10/1992 | Hlatky et al. | |
| 5,321,106 A | 6/1994 | LaPointe | |
| 5,350,817 A | 9/1994 | Winter et al. | |
| 5,516,848 A | 5/1996 | Canich et al. | |
| 5,561,092 A | 10/1996 | Ewen et al. | |
| 5,571,880 A | 11/1996 | Alt et al. | |
| 5,614,457 A | 3/1997 | Ewen et al. | |
| 5,663,249 A | 9/1997 | Ewen et al. | |
| 5,696,045 A | 12/1997 | Winter et al. | |
| 5,714,427 A | 2/1998 | Winter et al. | |
| 5,731,254 A | 3/1998 | Winter et al. | |
| 6,121,395 A | 9/2000 | Turner | |
| 6,713,426 B1 | 3/2004 | Winter et al. | |
| 6,939,928 B1 | 9/2005 | Kawai et al. | |
| 7,449,533 B2 | 11/2008 | Kawai et al. | |
| 7,488,789 B2 | 2/2009 | Ikenaga et al. | |
| 8,017,705 B2 * | 9/2011 | Yamaguchi et al. | .......... 526/160 |
| 2006/0270812 A1 | 11/2006 | Tohi et al. | |
| 2007/0197374 A1 * | 8/2007 | Yang et al. | ..................... 502/103 |
| 2008/0220193 A1 * | 9/2008 | Tohi et al. | .................. 428/36.92 |

FOREIGN PATENT DOCUMENTS

| | | |
|---|---|---|
| EP | 0 310 734 A1 | 4/1989 |
| EP | 0 516 018 A2 | 12/1992 |
| EP | 2 083 023 A1 | 7/2009 |
| JP | 01-501950 | 7/1989 |
| JP | 01-502036 | 7/1989 |
| JP | 02-024701 | 1/1990 |
| JP | 02-078687 | 3/1990 |
| JP | 02-167305 | 6/1990 |
| JP | 02-274703 | 11/1990 |
| JP | 03-103407 | 4/1991 |
| JP | 03-179005 | 8/1991 |
| JP | 03-179006 | 8/1991 |
| JP | 03-207703 | 9/1991 |
| JP | 03-207704 | 9/1991 |
| JP | 07-278169 A | 10/1995 |
| JP | 2000-212194 | 8/2000 |
| JP | 2004-051676 | 2/2004 |
| JP | 2004-161957 | 6/2004 |
| JP | 2004-168744 | 6/2004 |
| JP | 2004-189666 | 7/2004 |
| JP | 2007-302853 | 11/2007 |
| JP | 2007-302854 | 11/2007 |
| WO | WO-01/27124 A1 | 4/2001 |
| WO | WO-2004/087775 A1 | 10/2004 |
| WO | WO 2005/100410 A1 | 10/2005 |
| WO | WO 2006/123759 A1 | 11/2006 |
| WO | WO 2007/022244 A2 | 2/2007 |
| WO | WO 2008/059895 A1 | 5/2008 |
| WO | WO 2008/059974 A1 | 5/2008 |

OTHER PUBLICATIONS

International Search Report received in Nov. 17, 2009 for International Application No. PCT/JP2009/064349 (2 pgs). J. Am. Chem. Soc., 1988, vol. 110, pp. 6255-6256.

* cited by examiner

Primary Examiner — Caixia Lu
(74) Attorney, Agent, or Firm — Foley & Lardner LLP

(57) ABSTRACT

[Problem] To efficiently obtain an α-olefin polymer having a high melting point and a high molecular weight. [Solution to Problem] The process for preparing an olefin polymer of the present invention is a process for preparing an olefin polymer, comprising polymerizing at least one monomer selected from α-olefins of 2 or more carbon atoms, wherein the polymerization is carried out at a temperature of not lower than 40° C. in the presence of a catalyst comprising a transition metal compound component (A) which comprises two or more kinds of transition metal compounds (a) represented by the following formula [A1] and an organometallic compound component (B) which comprises an organometallic compound (b), propylene is contained in the monomer, and the olefin polymer is an olefin polymer whose weight-average molecular weight (Mw) and number-average molecular weight (Mn), as determined by gel permeation chromatography (GPC), satisfy the relationship of $1 \leq (Mw/Mn) \leq 3$, and which has a melting point (Tm), as determined by DSC, of not lower than 150° C. and an intrinsic viscosity ([η]) of not less than 1.5 dl/g.

10 Claims, 1 Drawing Sheet

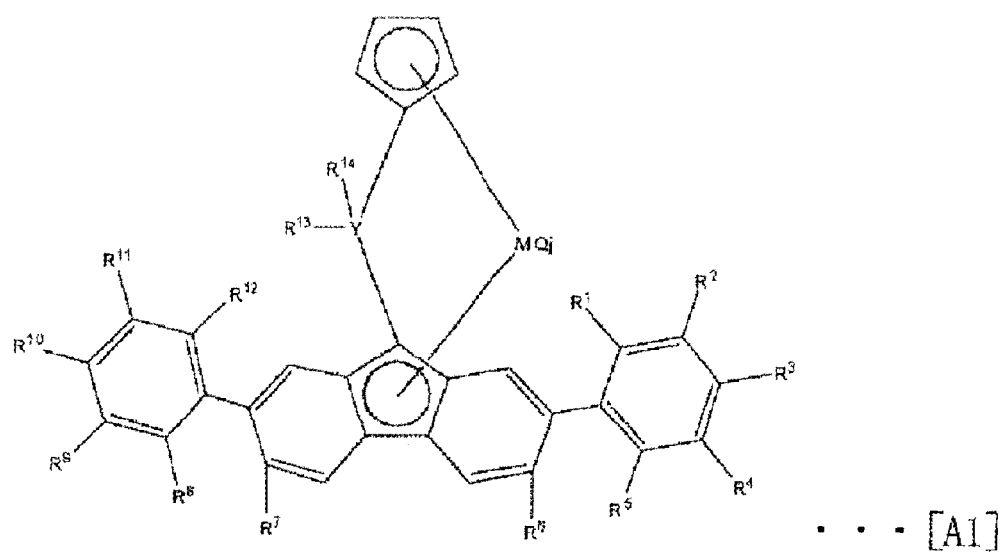

PROCESS FOR PREPARING OLEFIN POLYMER USING MIXED CATALYST

TECHNICAL FIELD

The present invention relates to a process for preparing an olefin polymer.

BACKGROUND ART

Olefin polymers are applied to various uses as thermoplastic resin materials or modifiers of thermoplastic resins. As a polymerization catalyst used in the preparation of olefin polymers, a titanium catalyst or a metallocene catalyst is known. In the case of using the titanium catalyst, however, there is a problem that the composition of olefin types of an olefin polymer that can be prepared is restricted or a problem that the compatibility is not homogeneous because of a wide molecular weight distribution. In the case of using the metallocene catalyst, copolymerizability of α-olefins is excellent and α-olefins can be polymerized with a wide range of composition, but when high-temperature polymerization is carried out, the molecular weight is not increased or the polymerization activity is sometimes low, and this is an obstacle to low cost.

Recently, it has been disclosed by J. A. Ewen, et al. that when a catalyst comprising a transition metal catalyst having, as a ligand, isopropylidene(cyclopentadienyl)(9-fluorene) wherein cyclopentadiene and fluorene are crosslinked by isopropylidene and aluminoxane is used, polypropylene of high tacticity having a syndiotactic pentad fraction of more than 0.7 is obtained (non patent literature 1).

Moreover, it has been reported that by the use of a catalyst having a structure analogous to that of the above transition metal catalyst showing a syndiotactic polypropylene activity, a propylene/ethylene copolymer having a high molecular weight is obtained (patent literature 1). In this transition metal catalyst, however, there is yet room for improvement in polymerization performance at high temperatures and particularly in molecular weight (patent literatures 2 and 3).

By the way, a method for polymerizing an α-olefin by mixing different metallocene compounds for the purpose of allowing the resulting polymer to exhibit specific properties instead of widening a molecular weight distribution of the polymer has been also proposed. For example, a process for preparing polypropylene by using a crosslinked monocyclopentadienyl hetero atom-containing compound and an uncrosslinked biscyclopentadienyl-containing compound has been reported (patent literature 4). Moreover, there is a literature in which use of a hafnium metallocene type catalyst compound of a crosslinked bulky ligand and a zirconium metallocene type catalyst compound is discussed (patent literature 5). Furthermore, a process for preparing a propylene polymer using at least two different zirconium metallocene type catalyst compounds having a crosslinked bulky ligand has been disclosed. One of sterically firm zirconocenes used herein has, as a bulky ligand, an indenyl ligand having a substituent on a six-membered ring (patent literature 6). Still furthermore, a process for preparing polypropylene using two different zirconium metallocene type catalyst compounds having a crosslinked bulky ligand has been disclosed (patent literature 7).

The present applicant has already reported that a polypropylene polymer having a relatively high melting point and a high molecular weight can be prepared by the use of a specific transition metal catalyst (patent literature 8).

CITATION LIST

Patent Literature

Patent literature 1: Japanese Patent Laid-Open Publication No. 274703/1990
Patent literature 2: Japanese Patent Laid-Open Publication No. 161957/2004
Patent literature 3: WO01/027124 pamphlet
Patent literature 4: U.S. Pat. No. 5,516,848
Patent literature 5: EP 0310734B
Patent literature 6: U.S. Pat. No. 5,696,045
Patent literature 7: EP 516018B
Patent literature 8: Japanese Patent Laid-Open Publication No. 302854/2007

Non Patent Literature

Non patent literature 1: J. Am. Chem. Soc. 1988, 110, 6255-6256

SUMMARY OF INVENTION

Technical Problem

In order to make industrialization possible, however, it has been desired that the preparation can be carried out at a high temperature exceeding ordinary temperature, but any catalyst satisfying such requirement soundly has not been reported so far.

Accordingly, it is an object of the present invention to provide an olefin polymerization process to efficiently obtain an α-olefin polymer having a high melting point and a high molecular weight without impairing characteristics of a metallocene catalyst (particularly, characteristic that the molecular weight distribution of the resulting polymer is narrow).

Solution to Problem

Under such circumstances, the present inventors have earnestly studied. As a result, they have found that in the case where an α-olefin such as propylene is polymerized, an α-olefin polymer having a high melting point and a high molecular weight can be obtained even in the polymerization at a high temperature at which industrialization is possible, by using two or more kinds of specific metallocene compounds different in ligand structure, and they have also found that the resulting olefin polymer has a narrow molecular weight distribution. Thus, the present invention has been accomplished.

That is to say, the process for preparing an olefin polymer according to the present invention is a process for preparing an olefin polymer, comprising polymerizing monomers containing propylene and if necessary an α-olefin of 2 or more carbon atoms other than propylene, wherein the polymerization is carried out at a temperature of not lower than 40° C. in the presence of a catalyst comprising a transition metal compound component (A) which comprises two or more kinds of transition metal compounds (a) represented by the following formula [A1] and an organometallic compound component (B) which comprises one or more kinds of organometallic compounds (b) selected from the following compounds (b-1), (b-2) and (b-3):

(b-1) an organoaluminum oxy-compound,
(b-2) a compound which reacts with the transition metal compound (a) to form an ion pair,
(b-3) an organoaluminum compound, and the olefin polymer is an olefin polymer whose weight-average molecular weight (Mw) and number-average molecular weight (Mn), as determined by gel permeation chromatography (GPC), satisfy the relationship of $1 \leq (Mw/Mn) \leq 3$, and which has a melting point (Tm), as determined by DSC, of not lower than 150° C. and an intrinsic viscosity ([η]) of not less than 1.5 dl/g,

[A1]

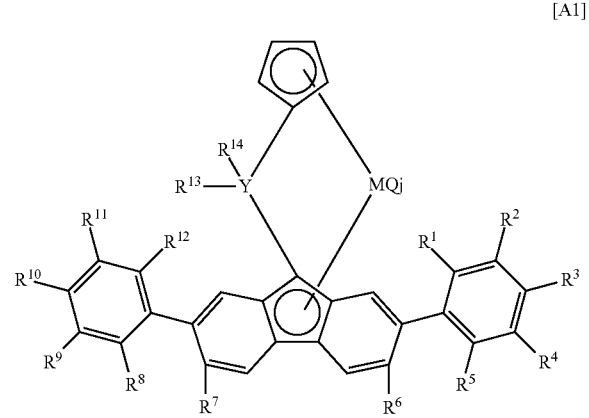

wherein $R^1$ to $R^{12}$ are each independently a hydrogen atom, a halogen atom, a hydrocarbon group, a halogen-containing hydrocarbon group, a nitrogen-containing group, an oxygen-containing group or a silicon-containing group, two adjacent groups of $R^1$ to $R^5$ and $R^8$ to $R^{12}$ may be bonded to form a ring, $R^{13}$ and $R^{14}$ are each independently a hydrogen atom, a hydrocarbon group of 1 to 40 carbon atoms or a silicon-containing group of 1 to 40 carbon atoms and may be bonded to each other to form a ring, M is Ti, Zr or Hf, Y is a silicon atom or a carbon atom, Q is a halogen atom, a hydrocarbon group, an anionic ligand or a neutral ligand capable of being coordinated by a lone pair, j is an integer of 1 to 4, and when plural Q are present, they may be the same as or different from each other.

Advantageous Effects of Invention

The process for preparing an olefin polymer according to the present invention is excellent in polymerization activity. For example, when propylene is used as a monomer, the resulting propylene polymer has a narrow molecular weight and has a high melting point and a high molecular weight. When the olefin polymerization catalyst comprising a crosslinked metallocene compound according to the present invention is used, preparation of polypropylene having a narrow molecular weight distribution becomes possible even in the polymerization at a high temperature. Moreover, when the above olefin polymerization catalyst comprising a crosslinked metallocene compound is used, a polymer exhibiting a molecular weight distribution equivalent to or narrower than that in the case of using publicly known technique and having a high melting point and a high molecular weight is obtained even if a monomer other than propylene is used.

DESCRIPTION OF EMBODIMENTS

With regard to the component (A) and the component (B) relevant to the present invention, the olefin polymerization catalyst containing these components, and the process for polymerizing olefins in the presence of the olefin polymerization catalyst, best modes for carrying out the present invention are described in order hereinafter.

The process for preparing an olefin polymer according to the present invention is a process for preparing an olefin polymer, comprising polymerizing at least one monomer selected from α-olefins of two or more carbon atoms. In the above monomer, propylene is contained. The above polymerization is carried out at a temperature of not lower than 40° C. in the presence of a catalyst comprising a transition metal compound component (A) which comprises two or more kinds of specific transition metal compounds (a) and a specific organometallic compound component (B). In the olefin polymer obtained by this polymerization, the weight-average molecular weight (Mw) and the number-average molecular weight (Mn), as determined by gel permeation chromatography (GPC), satisfy the relationship of $1 \leq (Mw/Mn) \leq 3$, the melting point (Tm), as determined by DSC, is not lower than 150° C., and the intrinsic viscosity ([η]) is not less than 1.5 dl/g. In the present invention, by using the transition metal compound component (A) comprising two or more kinds of specific transition metal compounds (a), an α-olefin can be efficiently polymerized with a high polymerization activity even at a temperature of not lower than room temperature (usually 20° C.), particularly not lower than 40° C., as described above. Moreover, an α-olefin polymer having a narrow molecular weight distribution and having a high melting point and a high molecular weight can be obtained.

Transition Metal Compound Component (A) (Mixed Catalyst)

The transition metal compound component (A) comprises two or more kinds of transition metal compounds (a) represented by the following formula [A1]. The transition metal compound (a) is a crosslinked metallocene compound. Since the transition metal compound component (A) comprises two or more kinds of the transition metal compounds (a), an α-olefin can be polymerized with a high polymerization activity even at a temperature of not lower than room temperature, particularly not lower than 40° C. Moreover, the resulting α-olefin polymer can be improved in the molecular weight distribution and in the melting point and the intrinsic viscosity with a good balance.

[A1]

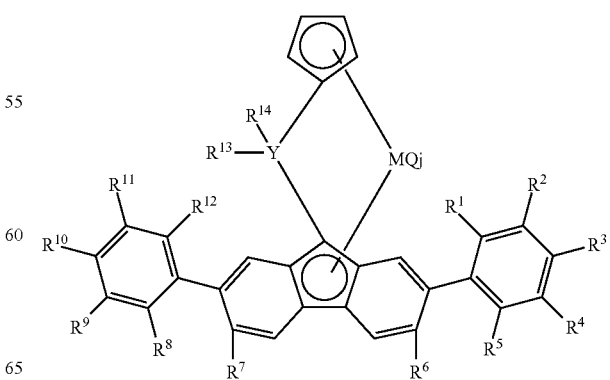

In the formula [A1], $R^1$ to $R^{12}$ are each independently a hydrogen atom, a halogen atom, a hydrocarbon group, a halogen-containing hydrocarbon group, a nitrogen-containing group, an oxygen-containing group or a silicon-containing group.

The halogen atoms include a fluorine atom, a chlorine atom, a bromine atom and an iodine atom.

The number of carbon atoms of the hydrocarbon group is not specifically restricted. Examples of the hydrocarbon groups include straight-chain hydrocarbon groups, such as methyl group, ethyl group, n-propyl group, allyl group, n-butyl group, n-pentyl group, n-hexyl group, n-heptyl group, n-octyl group, n-nonyl group and n-decanyl group; branched hydrocarbon groups, such as isopropyl group, t-butyl group, amyl group, 3-methylpentyl group, 1,1-diethylpropyl group, 1,1-dimethylbutyl group, 1-methyl-1-propylbutyl group, 1,1-propylbutyl group, 1,1-dimethyl-2-methylpropyl group and 1-methyl-1-isopropyl-2-methylpropyl group; cyclic saturated hydrocarbon groups, such as cyclopentyl group, cyclohexyl group, cycloheptyl group, cyclooctyl group, norbornyl group and adamantyl group; and cyclic unsaturated hydrocarbon groups, such as phenyl group, naphthyl group, biphenyl group, phenanthryl group and anthracenyl group, and nucleus alkyl-substituted groups thereof (groups wherein a hydrogen atom on the aromatic ring in the above cyclic unsaturated hydrocarbon groups is replaced with an alkyl group).

The halogen-containing hydrocarbon group is preferably a halogen-containing hydrocarbon group of 1 to 20 carbon atoms, and examples thereof include fluoromethyl group, trifluoromethyl group, trichloromethyl group, pentafluoroethyl group, 1-fluorophenyl group, 1-chlorophenyl group, 1-bromophenyl group, 1-iodophenyl group, 2-fluorophenyl group, 2-bromophenyl group, 2-iodophenyl group, 2-chlorophenyl group, 3-chlorophenyl group, 4-chlorophenyl group, 2-bromophenyl group, 3-bromophenyl group, 4-bromophenyl group, 2-fluorophenyl group, 3-fluorophenyl group, 4-fluorophenyl group, fluoronaphthyl group, chloronaphthyl group, bromonaphthyl group, iodonaphthyl group, pentafluorophenyl group and tri-perfluorophenylmethyl group.

The number of carbon atoms of the halogen-containing hydrocarbon group is more preferably 1 to 10, still more preferably 1 to 6. As the halogen-containing hydrocarbon group, more preferably used is fluoromethyl group, trifluoromethyl group, trichloromethyl group, pentafluoroethyl group, 1-fluorophenyl group, 1-chlorophenyl group, 1-bromophenyl group, 1-iodophenyl group, 2-fluorophenyl group, 2-bromophenyl group, 2-iodophenyl group, 2-chlorophenyl group, 3-chlorophenyl group, 4-chlorophenyl group, 2-bromophenyl group, 3-bromophenyl group, 4-bromophenyl group, 2-fluorophenyl group, 3-fluorophenyl group, 4-fluorophenyl group, pentafluorophenyl group or the like.

The nitrogen-containing group is preferably a nitrogen-containing hydrocarbon group of 1 to 20 carbon atoms, and examples thereof include dimethylamino group, diethylamino group, didecylamino group, pyrrolidinyl group, piperidinyl group, pyrrolyl group, pyridyl group, quinolyl group, imidazolyl group, dimethylaminophenyl group and piperidinylphenyl group.

The number of carbon atoms of the nitrogen-containing hydrocarbon group is more preferably 1 to 10, still more preferably 1 to 6. As the nitrogen-containing hydrocarbon group, more preferably used is dimethylamino group, diethylamino group, pyrrolidinyl group, piperidinyl group, pyrrolyl group, pyridyl group, imidazolyl group or the like.

The oxygen-containing group is preferably an oxygen-containing hydrocarbon group of 1 to 20 carbon atoms, and examples thereof include methoxy group, ethoxy group, n-propoxy group, isopropoxy group, n-butoxy group, sec-butoxy group, isobutoxy group, tert-butoxy group, 1-decyloxy group, 1-icosyloxy group, phenoxy group, 1-naphthoxy group, 2-naphthoxy group, 2-methoxyphenyl group, 3-methoxyphenyl group, 4-methoxyphenyl group and 4-phenoxyphenyl group.

The number of carbon atoms of the oxygen-containing hydrocarbon group is more preferably 1 to 10, still more preferably 1 to 6. As the oxygen-containing hydrocarbon group, more preferably used is methoxy group, ethoxy group, n-propoxy group, isopropoxy group, n-butoxy group, sec-butoxy group, isobutoxy group, tert-butoxy group, phenoxy group or the like.

The silicon-containing group is preferably a silicon-containing hydrocarbon group, and the number of carbon atoms and the number of silicon atoms of the silicon-containing hydrocarbon group are not specifically restricted. The silicon-containing group is, for example, an alkylsilyl group or an arylsilyl group. Examples of such groups include trimethylsilyl group, triethylsilyl group and triphenylsilyl group.

Two adjacent groups of $R^1$ to $R^5$ and $R^8$ to $R^{12}$ may be bonded to form a ring.

$R^{13}$ and $R^{14}$ are each independently a hydrogen atom, a hydrocarbon group (f) of 1 to 40 carbon atoms or a silicon-containing group of 1 to 40 carbon atoms.

The hydrocarbon group (f) of 1 to 40 carbon atoms is preferably a group (f1) selected from an alkyl group (f1-1) of 1 to 40 carbon atoms, preferably 1 to 20 carbon atoms, an aralkyl group (f1-2) of 1 to 40 carbon atoms, preferably 1 to 20 carbon atoms, and an aryl group and a nucleus substituted aryl group (group wherein a hydrogen atom on the aromatic ring in the above aryl group is replaced with a substituent) (f1-3) of 6 to 40 carbon atoms, preferably 6 to 20 carbon atoms.

Examples of the alkyl groups (f1-1) include straight-chain hydrocarbon groups, such as methyl group, ethyl group, n-propyl group, allyl group, n-butyl group, n-pentyl group, n-hexyl group, n-heptyl group, n-octyl group, n-nonyl group and n-decanyl group; branched hydrocarbon groups, such as isopropyl group, t-butyl group, amyl group, 3-methylpentyl group, 1,1-diethylpropyl group, 1,1-dimethylbutyl group, 1-methyl-1-propylbutyl group, 1,1-propylbutyl group, 1,1-dimethyl-2-methylpropyl group and 1-methyl-1-isopropyl-2-methylpropyl group; and cyclic saturated hydrocarbon groups, such as cyclopentyl group, cyclohexyl group, cycloheptyl group, cyclooctyl group, norbornyl group and adamantyl group.

Examples of the aralkyl groups (f1-2) include benzyl group, α-phenethyl group, β-phenethyl group, diphenylmethyl group, naphthylmethyl group and neophyl group.

Examples of the aryl groups and the nucleus substituted aryl groups (f1-3) include aryl groups, such as phenyl group and naphthyl group; alkylaryl groups, such as o-tolyl group, m-tolyl group, p-tolyl group, ethylphenyl group, n-propylphenyl group, i-propylphenyl group, n-butylphenyl group, s-butylphenyl group, t-butylphenyl group and xylyl group; chloroaryl groups, such as o-chlorophenyl group, m-chlorophenyl group, p-chlorophenyl group and chloronaphthyl group; bromoaryl groups, such as o-bromophenyl group, m-bromophenyl group, p-bromophenyl group and bromonaphthyl group; bromoalkylaryl groups, such as bromomethylphenyl group and dibromomethylphenyl group; iodoaryl groups, such as o-iodophenyl group, m-iodophenyl group, p-iodophenyl group and iodonaphthyl group; and iodoalkylaryl groups, such as iodomethylphenyl group and diiodomethylphenyl group.

The silicon-containing group of 1 to 40 carbon atoms is, for example, an alkylsilyl group or an arylsilyl group. Examples of such groups include trimethylsilyl group, triethylsilyl group and triphenylsilyl group.

$R^{13}$ and $R^{14}$ are each more preferably an alkyl group (f1-1) of 1 to 20 carbon atoms, an aralkyl group (f1-2) of 1 to 20 carbon atoms, or an aryl group and a nucleus substituted aryl group (f1-3) of 6 to 20 carbon atoms. Specifically, the later-described organic group represented by the formula [A1-1-1] or [A1-2-1] is preferably used. More specifically, n-butyl group, phenyl group, chlorophenyl group, benzyl group, chlorobenzyl group, methylbenzyl group or tolyl group is preferably used.

$R^{13}$ and $R^{14}$ may be bonded to form a ring.

M is Ti, Zr or Hf. M is preferably Zr or Hf, more preferably Zr.

Y is a silicon atom or a carbon atom. Y is preferably a carbon atom.

Q is a halogen atom, a hydrocarbon group, an anionic ligand or a neutral ligand capable of being coordinated by a lone pair.

The halogen atoms include a fluorine atom, a chlorine atom, a bromine atom and an iodine atom.

Examples of the hydrocarbon groups include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3-trimethylbutyl, neopentyl, cyclohexylmethyl, cyclohexyl and 1-methyl-1-cyclohexyl. Examples of neutral, conjugated or non-conjugated dienes of 10 or less carbon atoms include s-cis- or s-trans-η4-1,3-butadiene, s-cis- or s-trans-η4-1,4-diphenyl-1,3-butadiene, s-cis- or s-trans-η4-3-methyl-1,3-pentadiene, s-cis- or s-trans-η4-1,4-dibenzyl-1,3-butadiene, s-cis- or s-trans-η4-2,4-hexadiene, s-cis- or s-trans-η4-1,3-pentadiene, s-cis- or s-trans-η4-1,4-ditolyl-1,3-butadiene and s-cis- or s-trans-η4-1,4-bis(trimethylsilyl)-1,3-butadiene.

Examples of the anionic ligands include alkoxy groups, such as methoxy, tert-butoxy and phenoxy; carboxylate groups, such as acetate and benzoate; and sulfonate groups, such as mesylate and tosylate.

Examples of the neutral ligands capable of being coordinated by a lone pair include organic phosphorus compounds, such as trimethylphosphine, triethylphosphine, triphenylphosphine and diphenylmethylphosphine; and ethers, such as tetrahydrofuran, diethyl ether, dioxane and 1,2-dimethoxyethane.

A preferred embodiment of Q is a halogen atom or an alkyl group of 1 to 5 carbon atoms among the above atoms and groups.

j is an integer of 1 to 4. j is preferably 2.

When j is an integer of 2 to 4 and plural Q are present, plural Q may be the same as or different from each other.

A more preferred embodiment of the transition metal compound (a) is a transition metal compound (a1-1) or a transition metal compound (a1-2) described below.

The transition metal compound (a1-1) is represented by the following formula [A1-1].

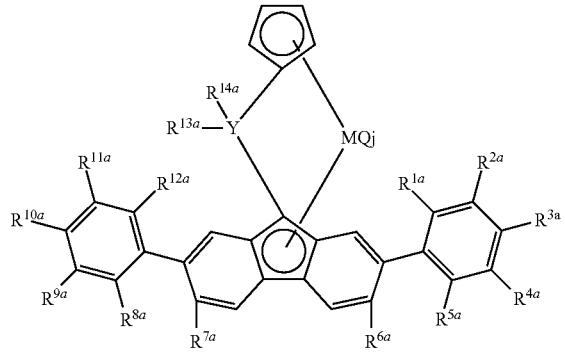

[A1-1]

In the formula [A1-1], $R^{1a}$ to $R^{12a}$ are each independently a hydrogen atom, a halogen atom, a hydrocarbon group, a halogen-containing hydrocarbon group, a nitrogen-containing group, an oxygen-containing group or a silicon-containing group.

Examples and preferred ranges of the halogen atoms, the hydrocarbon groups, the halogen-containing hydrocarbon groups, the nitrogen-containing groups, the oxygen-containing groups and the silicon-containing groups are the same as those described for $R^1$ to $R^{12}$ in the formula [A1].

Two adjacent groups of $R^{1a}$ to $R^{5a}$ and $R^{8a}$ to $R^{12a}$ may be bonded to form a ring.

In the formula [A1-1], however, $R^{1a}$, $R^{5a}$, $R^{8a}$ and $R^{12a}$ are each independently selected from a hydrogen atom, the above-mentioned hydrocarbon group and the above-mentioned silicon-containing group, and at least one of $R^{1a}$, $R^{5a}$, $R^{8a}$ and $R^{12a}$ is selected from the above-mentioned hydrocarbon group and the above-mentioned silicon-containing group.

When such a transition metal compound (a1-1) is used, an α-olefin polymer having a high molecular weight and a high intrinsic viscosity can be prepared.

In the formula [A1-1], it is preferable that $R^{1a}$ and $R^{12a}$ are each a hydrocarbon group (f) of 1 to 40 carbon atoms or a silicon-containing group of 1 to 40 carbon atoms and $R^{5a}$ and $R^{8a}$ are each a hydrogen atom. By virtue of this, an α-olefin polymer having a high molecular weight and a high intrinsic viscosity can be prepared.

The hydrocarbon group (f) of 1 to 40 carbon atoms is preferably a group (f1) selected from an alkyl group (f1-1) of 1 to 40 carbon atoms, preferably 1 to 20 carbon atoms, an aralkyl group (f1-2) of 1 to 40 carbon atoms, preferably 1 to 20 carbon atoms, and an aryl group and a nucleus substituted aryl group (group wherein a hydrogen atom on the aromatic ring in the above aryl group is replaced with a substituent) (f1-3) of 6 to 40 carbon atoms, preferably 6 to 20 carbon atoms.

Examples of the alkyl groups (f1-1) include straight-chain hydrocarbon groups, such as methyl group, ethyl group, n-propyl group, allyl group, n-butyl group, n-pentyl group, n-hexyl group, n-heptyl group, n-octyl group, n-nonyl group and n-decanyl group; branched hydrocarbon groups, such as isopropyl group, t-butyl group, amyl group, 3-methylpentyl group, 1,1-diethylpropyl group, 1,1-dimethylbutyl group, 1-methyl-1-propylbutyl group, 1,1-propylbutyl group, 1,1-dimethyl-2-methylpropyl group and 1-methyl-1-isopropyl-2-methylpropyl group; and cyclic saturated hydrocarbon groups, such as cyclopentyl group, cyclohexyl group, cycloheptyl group, cyclooctyl group, norbornyl group and adamantyl group.

Examples of the aralkyl groups (f1-2) include benzyl group, α-phenethyl group, β-phenethyl group, diphenylmethyl group, naphthylmethyl group and neophyl group.

Examples of the aryl groups and the nucleus substituted aryl groups (f1-3) include aryl groups, such as phenyl group and naphthyl group; alkylaryl groups, such as o-tolyl group, m-tolyl group, p-tolyl group, ethylphenyl group, n-propylphenyl group, i-propylphenyl group, n-butylphenyl group, s-butylphenyl group, t-butylphenyl group and xylyl group; chloroaryl groups, such as o-chlorophenyl group, m-chlorophenyl group, p-chlorophenyl group and chloronaphthyl group; bromoaryl groups, such as o-bromophenyl group, m-bromophenyl group, p-bromophenyl group and bromonaphthyl group; bromoalkylaryl groups, such as bromomethylphenyl group and dibromomethylphenyl group; iodoaryl groups, such as o-iodophenyl group, m-iodophenyl group, p-iodophenyl group and iodonaphthyl group; and iodoalkylaryl groups, such as iodomethylphenyl group and diiodomethylphenyl group.

The silicon-containing group of 1 to 40 carbon atoms is, for example, an alkylsilyl group or an arylsilyl group. Examples of such groups include trimethylsilyl group, triethylsilyl group and triphenylsilyl group.

$R^{1a}$ and $R^{12a}$ are each more preferably a methyl group, an ethyl group, an isopropyl group or a t-butyl group because they are substituents capable of preparing an α-olefin polymer having a high molecular weight and a high intrinsic viscosity. $R^{1a}$ and $R^{12a}$ are preferably the same atoms or the same groups as each other from the viewpoint of preparation of a ligand.

It is preferable that $R^{6a}$ and $R^{7a}$ are each selected from a hydrogen atom, an alkyl group (f1-1) of 1 to 40 carbon atoms and a silicon-containing group of 1 to 40 carbon atoms, and it is more preferable that they are each an alkyl group (f1-1) of 1 to 20 carbon atoms and are the same groups as each other. By virtue of this, an α-olefin polymer having a high molecular weight and a high intrinsic viscosity can be prepared. Examples of the alkyl groups (f1-1) are the same as those described for $R^{1a}$ and $R^{12a}$. It is preferable that $R^{6a}$ and $R^{7a}$ are each a methyl group, an ethyl group, an isopropyl group or a t-butyl group and are the same groups as each other.

$R^{2a}$, $R^{3a}$, $R^{4a}$, $R^{9a}$, $R^{10a}$ and $R^{11a}$ are each more preferably a hydrogen atom because an α-olefin polymer having a high molecular weight and a high intrinsic viscosity can be prepared.

$R^{13a}$ and $R^{14a}$ are each independently an organic group represented by the following formula [A1-1-1].

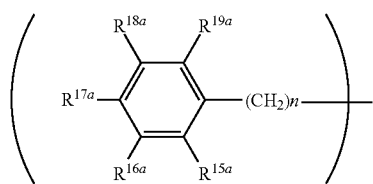

[A1-1-1]

In the formula [A1-1-1], $R^{15a}$ to $R^{19a}$ are each independently a hydrogen atom, a halogen atom, a hydroxyl group, a hydrocarbon group of 1 to 14 carbon atoms, a halogen-containing hydrocarbon group of 1 to 14 carbon atoms, a sulfur-containing group, an oxygen-containing group or a silicon-containing group.

The halogen atoms include a fluorine atom, a chlorine atom, a bromine atom and an iodine atom, and are preferably a fluorine atom, a chlorine atom and a bromine atom, particularly preferably a fluorine atom and a chlorine atom.

Examples of the hydrocarbon groups of 1 to 14 carbon atoms include methyl group, ethyl group, 1-propyl group, 1-butyl group, 1-hexyl group, vinyl group, allyl group, 1-pentenyl group, 1-hexenyl group, 1-octenyl group, 1-decenyl group, 1-tetradecanyl group, isopropyl group, tert-butyl group, 3-methylpentyl group, 1,1-diethylpropyl group, cyclopentyl group, cyclohexyl group, cycloheptyl group, cyclooctyl group, 4-cyclohexyl-tert-butyl group, norbornyl group, adamantyl group, phenyl group, 2-methylphenyl group, 3-methylphenyl group, 4-methylphenyl group, 2,4-dimethylphenyl group, 2,6-dimethylphenyl group, naphthylmethyl group and naphthyl group.

The number of carbon atoms of the hydrocarbon group is preferably 1 to 12, more preferably 1 to 10, still more preferably 1 to 8, particularly preferably 1 to 6. As the hydrocarbon group, more preferably used is methyl group, ethyl group, 1-propyl group, 1-butyl group, sec-butyl group, isobutyl group, tert-butyl group, 1-hexyl group, cyclopentyl group, cyclohexyl group, phenyl group, naphthyl group, biphenyl group or the like.

Examples of the halogen-containing hydrocarbon groups of 1 to 14 carbon atoms include fluoromethyl group, trifluoromethyl group, trichloromethyl group, pentafluoroethyl group, 2-fluorophenyl group, 2-bromophenyl group, 2-iodophenyl group, 2-chlorophenyl group, 3-chlorophenyl group, 4-chlorophenyl group, 2-bromophenyl group, 3-bromophenyl group, 4-bromophenyl group, 4-trifluoromethylphenyl group, 4-trifluoromethoxyphenyl group, 2,6-difluorophenyl group, 3,5-dichlorophenyl group, 3,5-difluorophenyl group, pentafluorophenyl group, 2,6-difluoro-4-tert-butylphenyl group, fluoronaphthyl group and chloronaphthyl group.

The number of carbon atoms of the halogen-containing hydrocarbon group is preferably 1 to 12, more preferably 1 to 10, still more preferably 1 to 8, particularly preferably 1 to 6. As the halogen-containing hydrocarbon group, more preferably used is fluoromethyl group, trifluoromethyl group, trichloromethyl group, pentafluoroethyl group, 2-fluorophenyl group, 2-bromophenyl group, 2-iodophenyl group, 2-chlorophenyl group, 3-chlorophenyl group, 4-chlorophenyl group, 2-bromophenyl group, 3-bromophenyl group, 4-bromophenyl group, 2,6-difluorophenyl group, 3,5-dichlorophenyl group, 3,5-difluorophenyl group, pentafluorophenyl group, fluoronaphthyl group, chloronaphthyl group or the like.

The sulfur-containing group is preferably a sulfur-containing hydrocarbon group of 1 to 14 carbon atoms, and examples thereof include thiomethyl group, thioethyl group, thiocyclohexyl group, thiophenyl group, thionaphthyl group, 2-methylthiophenyl group, 3-methylthiophenyl group, 4-methylthiophenyl group, 2-thienyl group, 3-thienyl group and 5-methyl-2-thiophenyl group.

The number of carbon atoms of the sulfur-containing hydrocarbon group is preferably 1 to 12, more preferably 1 to 10, still more preferably 1 to 8, particularly preferably 1 to 6. As the sulfur-containing group, more preferably used is thiomethyl group, thioethyl group, thiocyclohexyl group, thiophenyl group, thionaphthyl group, 2-thienyl group, 3-thienyl group or the like.

The oxygen-containing group is preferably an oxygen-containing hydrocarbon group of 1 to 14 carbon atoms, and examples thereof include methoxy group, ethoxy group, 1-propoxy group, isopropoxy group, 1-butoxy group, sec-butoxy group, isobutoxy group, tert-butoxy group, 1-tetradecoxy group, phenoxy group, naphthoxy group, biphenyloxy group and benzyloxy group.

The number of carbon atoms of the oxygen-containing hydrocarbon group is preferably 1 to 12, more preferably 1 to 10, still more preferably 1 to 8, particularly preferably 1 to 6. As the oxygen-containing hydrocarbon group, more preferably used is methoxy group, ethoxy group, 1-propoxy group, isopropoxy group, 1-butoxy group, sec-butoxy group, isobutoxy group, tert-butoxy group, phenoxy group, naphthoxy group, biphenyloxy group or the like.

The silicon-containing group is preferably a silicon-containing hydrocarbon group or 1 to 14 carbon atoms, and examples thereof include trimethylsilylmethyl group, triethylsilyl group, triisopropylsilyl group, tert-butyldimethylsilyl group, 4-trimethylsilylphenyl group, 4-(tert-butyldimethylsiloxy)phenyl group, dimethylphenylsilyl group, dimethylnaphthylsilyl group and hexyl-di-1-butylsilyl group.

The number of carbon atoms of the silicon-containing hydrocarbon group is preferably 1 to 12, more preferably 1 to 10, still more preferably 1 to 8, particularly preferably 1 to 6. As the silicon-containing hydrocarbon group, more preferably used is trimethylsilylmethyl group, triethylsilyl group, tert-butyldimethylsilyl group, dimethylphenylsilyl group or the like.

It is preferable that at least one of $R^{15a}$ to $R^{19a}$ is a halogen atom or a halogen-containing hydrocarbon group of 1 to 14 carbon atoms, and it is more preferable that $R^{17a}$ is a halogen atom and $R^{15a}$, $R^{16a}$, $R^{18a}$ and $R^{19a}$ are each a hydrogen atom. By virtue of this, an α-olefin polymer having a high molecular weight and a high intrinsic viscosity can be prepared. It is also preferable that $R^{15a}$ to $R^{19a}$ are each a hydrogen atom.

Two adjacent groups of $R^{15a}$ to $R^{19a}$ may be bonded to form a ring.

n is 0 or 1.

$R^{13a}$ and $R^{14a}$ which are each represented by the above formula [A1-1-1] are each more specifically a phenyl group, a chlorophenyl group, a benzyl group, a chlorobenzyl group, a methylbenzyl group or a tolyl group.

It is preferable that $R^{13a}$ and $R^{14a}$ are each represented by the above formula [A1-1-1] and are the same organic groups as each other.

M is Ti, Zr or Hf, Y is a silicon atom or a carbon atom, Q is a halogen atom, a hydrocarbon group, an anionic ligand or a neutral ligand capable of being coordinated by a lone pair, and j is an integer of 1 to 4. Examples and preferred ranges of M, Y, Q and j are the same as those of M, Y, Q and J in the formula [A1].

When j is an integer of 2 to 4 and plural Q are present, plural Q may the same as or different from each other.

The transition metal compound (a1-2) is represented by the following formula [A1-2].

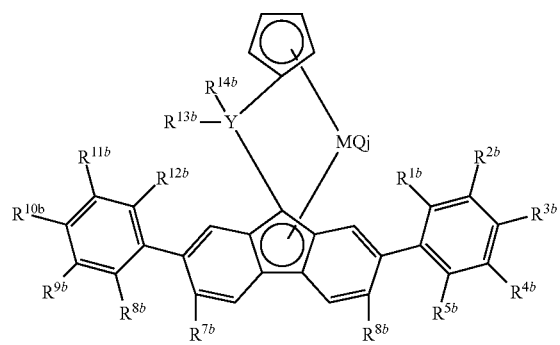

[A1-2]

In the formula [A1-2], $R^{1b}$ to $R^{12b}$ are each independently a hydrogen atom, a halogen atom, a hydrocarbon group, a halogen-containing hydrocarbon group, a nitrogen-containing group, an oxygen-containing group or a silicon-containing group.

Examples and preferred ranges of the halogen atoms, the hydrocarbon groups, the halogen-containing hydrocarbon groups, the nitrogen-containing groups, the oxygen-containing groups and the silicon-containing groups are the same as those described for $R^1$ to $R^{12}$ in the formula [A1].

Two adjacent groups of $R^{1b}$ to $R^{5b}$ and $R^{8b}$ to $R^{12b}$ may be bonded to form a ring.

In the formula [A1-2], however, $R^{1b}$, $R^{5b}$, $R^{8b}$ and $R^{12b}$ are each a hydrogen atom.

When such a transition metal compound (a1-2) is used, an α-olefin polymer having a high melting point can be prepared.

In the formula [A1-2], it is preferable that at least one of $R^{3b}$ and $R^{10b}$ is selected from a halogen atom and the above-mentioned halogen-containing hydrocarbon group, and it is more preferable that $R^{3b}$ and $R^{10b}$ are each selected from a halogen atom and the above-mentioned halogen-containing hydrocarbon group. It is still more preferable that $R^{3b}$ and $R^{10b}$ are each a halogen atom such as chlorine atom or a trifluoromethyl group and are the same groups as each other. By virtue of this, an α-olefin polymer having a high melting point can be prepared.

It is preferable that $R^{6b}$ and $R^{7b}$ are each selected from a hydrogen atom, an alkyl group (f1-1) of 1 to 40 carbon atoms and a silicon-containing group of 1 to 40 carbon atoms, and it is more preferable that they are each an alkyl group (f1-1) of 1 to 20 carbon atoms and are the same groups as each other. Examples of the alkyl groups (f1-1) are the same as those described for $R^{1a}$ and $R^{12a}$. It is preferable that $R^{6b}$ and $R^{7b}$ are each a methyl group, an ethyl group, an isopropyl group or a t-butyl group and are the same groups as each other.

$R^{2b}$, $R^{4b}$, $R^{9b}$ and $R^{11b}$ are each more preferably a hydrogen atom because an α-olefin polymer having a high melting point can be prepared.

$R^{13b}$ and $R^{14b}$ are each independently an organic group represented by the following formula [A1-2-1].

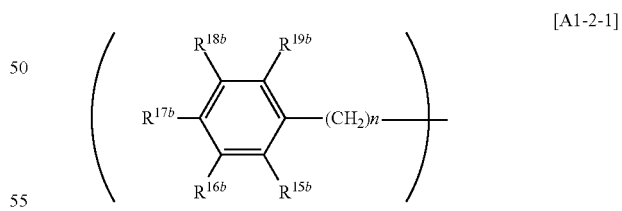

[A1-2-1]

In the formula [A1-2-1], $R^{15b}$ to $R^{19b}$ are each independently a hydrogen atom, a halogen atom, a hydroxyl group, a hydrocarbon group of 1 to 14 carbon atoms, a halogen-containing hydrocarbon group of 1 to 14 carbon atoms, a sulfur-containing group, an oxygen-containing group or a silicon-containing group.

Examples and preferred ranges of the halogen atoms, the hydrocarbon groups of 1 to 14 carbon atoms, the halogen-containing hydrocarbon groups of 1 to 14 carbon atoms, the sulfur-containing groups, the oxygen-containing groups and the silicon-containing groups are the same as those of the halogen atoms, the hydrocarbon groups of 1 to 14 carbon atoms, the halogen-containing hydrocarbon groups of 1 to 14 carbon atoms, the sulfur-containing groups, the oxygen-containing groups and the silicon-containing groups in the formula [A1-1-1] previously described.

It is preferable that at least one of $R^{15b}$ to $R^{19b}$ is a halogen atom or a halogen-containing hydrocarbon group of 1 to 14 carbon atoms, and it is more preferable that $R^{17b}$ is a halogen atom and $R^{15b}$, $R^{16b}$, $R^{18b}$ and $R^{19b}$ are each a hydrogen atom. By virtue of this, an α-olefin polymer having a high melting point can be prepared. It is also preferable that $R^{15b}$ to $R^{19b}$ are each a hydrogen atom.

Two adjacent groups of $R^{15b}$ to $R^{19b}$ may be bonded to form a ring.

n is 0 or 1.

$R^{13b}$ and $R^{14b}$ which are each represented by the above formula [A1-2-1] are each more specifically a phenyl group, a chlorophenyl group, a benzyl group, a chlorobenzyl group, a methylbenzyl group or a tolyl group.

It is preferable that $R^{13b}$ and $R^{14b}$ are each represented by the above formula [A1-2-1] and are the same organic groups as each other.

M is Ti, Zr or Hf, Y is a silicon atom or a carbon atom, Q is a halogen atom, a hydrocarbon group, an anionic ligand or a neutral ligand capable of being coordinated by a lone pair, and j is an integer of 1 to 4. Examples and preferred ranges of M, Y, Q and j are the same as those of M, Y, Q and J in the formula [A1].

When j is an integer of 2 to 4 and plural Q are present, plural Q may the same as or different from each other.

Examples of the crosslinked metallocene compounds represented by the formula [A1-1] are given below, but the scope of the present invention is not restricted by those examples.

There can be mentioned dimethylmethylene(cyclopentadienyl)(2,7-di-o-tolyl-3,6-di-tert-butylfluorenyl)zirconium dichloride, diethylmethylene(cyclopentadienyl)(2,7-di-o-tolyl-3,6-di-tert-butylfluorenyl)zirconium dichloride, di-n-propylmethylene(cyclopentadienyl)(2,7-di-o-tolyl-3,6-di-tert-butylfluorenyl)zirconium dichloride, diisopropylmethylene(cyclopentadienyl)(2,7-di-o-tolyl-3,6-di-tert-butylfluorenyl)zirconium dichloride, di-n-butylmethylene(cyclopentadienyl)(2,7-di-o-tolyl-3,6-di-tert-butylfluorenyl)zirconium dichloride, diisobutylmethylene(cyclopentadienyl)(2,7-di-o-tolyl-3,6-di-tert-butylfluorenyl)zirconium dichloride, di-sec-butylmethylene(cyclopentadienyl)(2,7-di-o-tolyl-3,6-di-tert-butylfluorenyl)zirconium dichloride, di-tert-butylmethylene(cyclopentadienyl)(2,7-di-o-tolyl-3,6-di-tert-butylfluorenyl)zirconium dichloride, di-n-octylmethylene(cyclopentadienyl)(2,7-di-o-tolyl-3,6-di-tert-butylfluorenyl)zirconium dichloride, di-n-triacontylmethylene(cyclopentadienyl)(2,7-di-o-tolyl-3,6-di-tert-butylfluorenyl)zirconium dichloride, phenylmethylene(cyclopentadienyl)(2,7-di-o-tolyl-3,6-di-tert-butylfluorenyl)zirconium dichloride, diphenylmethylene(cyclopentadienyl)(2,7-di-o-tolyl-3,6-di-tert-butylfluorenyl)zirconium dichloride, di-p-tolylmethylene(cyclopentadienyl)(2,7-di-o-tolyl-3,6-di-tert-butylfluorenyl)zirconium dichloride, di(p-chlorophenyl)methylene(cyclopentadienyl)(2,7-di-o-tolyl-3,6-di-tert-butylfluorenyl)zirconium dichloride, di(p-trifluoromethylphenyl)methylene(cyclopentadienyl)(2,7-di-o-tolyl-3,6-di-tert-butylfluorenyl)zirconium dichloride, di(2-naphthyl)methylene(cyclopentadienyl)(2,7-di-o-tolyl-3,6-di-tert-butylfluorenyl)zirconium dichloride, dibenzylmethylene(cyclopentadienyl)(2,7-di-o-tolyl-3,6-di-tert-butylfluorenyl)zirconium dichloride, di(p-chlorobenzyl)methylene(cyclopentadienyl)(2,7-di-o-tolyl-3,6-di-tert-butylfluorenyl)zirconium dichloride, di(p-methylbenzyl)methylene(cyclopentadienyl)(2,7-di-o-tolyl-3,6-di-tert-butylfluorenyl)zirconium dichloride, cyclohexyl(cyclopentadienyl)(2,7-di-o-tolyl-3,6-di-tert-butylfluorenyl)zirconium dichloride, dibenzylmethylene(cyclopentadienyl)(2,7-di-o-tolyl-fluorenyl)zirconium dichloride, dibenzylmethylene(cyclopentadienyl)(2,7-di-o-tolyl-3,6-ditrimethylsilylfluorenyl)zirconium dichloride, dibenzylmethylene(cyclopentadienyl)(2,7-di-o-tolyl-3,6-dicumylfluorenyl)zirconium dichloride, dibenzylmethylene(cyclopentadienyl)(2,7-di-o-tolyl-3,6-adamantyl fluorenyl)zirconium dichloride, dibenzylmethylene(cyclopentadienyl)[2,7-di-(o-ethylphenyl)-3,6-di-tert-butylfluorenyl]zirconium dichloride, dibenzylmethylene(cyclopentadienyl)[2,7-di-[o-(n-propyl)phenyl]-3,6-di-tert-butylfluorenyl]zirconium dichloride, dibenzylmethylene(cyclopentadienyl)[2,7-di-[o-(isopropyl)phenyl]-3,6-di-tert-butylfluorenyl]zirconium dichloride, dibenzylmethylene(cyclopentadienyl)[2,7-di-[o-(n-butyl)phenyl]-3,6-di-tert-butylfluorenyl]zirconium dichloride, dibenzylmethylene(cyclopentadienyl)[2,7-di-[o-(isobutyl)phenyl]-3,6-di-tert-butylfluorenyl]zirconium dichloride, dibenzylmethylene(cyclopentadienyl)[2,7-di-[o-(sec-butyl)phenyl]-3,6-di-tert-butylfluorenyl]zirconium dichloride, dibenzylmethylene(cyclopentadienyl)[2,7-di-[o-(tert-butyl)phenyl]-3,6-di-tert-butylfluorenyl]zirconium dichloride, dibenzylmethylene(cyclopentadienyl)[2,7-di-[o-(n-icosyl)phenyl]-3,6-di-tert-butylfluorenyl]zirconium dichloride, dibenzylmethylene(cyclopentadienyl)[2,7-di-(o-cyclohexylphenyl)-3,6-di-tert-butylfluorenyl]zirconium dichloride, dibenzylmethylene(cyclopentadienyl)[2,7-di-(biphenyl-2-yl)-3,6-di-tert-butylfluorenyl]zirconium dichloride, dibenzylmethylene(cyclopentadienyl)[2,7-di-[o-(2-naphthyl)phenyl]-3,6-di-tert-butylfluorenyl]zirconium dichloride, dibenzylmethylene(cyclopentadienyl)[2,7-di-[o-(2-phenanthryl)phenyl]-3,6-di-tert-butylfluorenyl]zirconium dichloride, dibenzylmethylene(cyclopentadienyl)[2,7-di-(o-trimethylsilylphenyl)-3,6-di-tert-butylfluorenyl]zirconium dichloride, dibenzylmethylene(cyclopentadienyl)[2,7-di-[(o-triphenylsilylphenyl)-3,6-di-tert-butylfluorenyl]zirconium dichloride, etc.

Compounds wherein "zirconium" is replaced with "hafnium" or "titanium" in the above compounds and compounds wherein "dichloride" is replaced with "dimethyl" or "methylethyl" in the above compounds are also preferably used.

Examples of the crosslinked metallocene compounds represented by the formula [A1-2] are given below, but the scope of the present invention is not restricted by those examples.

There can be mentioned diphenylmethylene(cyclopentadienyl)(2,7-diphenyl-3,6-di-tert-butylfluorenyl)zirconium dichloride, dibenzylmethylene(cyclopentadienyl)(2,7-diphenyl-3,6-di-tert-butylfluorenyl)zirconium dichloride, dimethylmethylene(cyclopentadienyl)(2,7-di-p-chlorophenyl-3,6-di-tert-butylfluorenyl)zirconium dichloride, diethylmethylene(cyclopentadienyl)(2,7-di-p-chlorophenyl-3,6-di-tert-butylfluorenyl)zirconium dichloride, di-n-propylmethylene(cyclopentadienyl)(2,7-di-p-chlorophenyl-3,6-di-tert-butylfluorenyl)zirconium dichloride, diisopropylmethylene(cyclopentadienyl)(2,7-di-p-chlorophenyl-3,6-di-tert-butylfluorenyl)zirconium dichloride, di-n-butylmethylene(cyclopentadienyl)(2,7-di-p-chlorophenyl-3,6-di-tert-butylfluorenyl)zirconium dichloride, diisobutylmethylene(cyclopentadienyl)(2,7-di-p-chlorophenyl-3,6-di-tert-butylfluorenyl)zirconium dichloride, di-sec-butylmethylene(cyclopentadienyl)(2,7-di-p-chlorophenyl-3,6-di-tert-butylfluorenyl)zirconium dichloride, di-tertbutylmethylene(cyclopentadienyl)(2,7-di-p-chlorophenyl-3,6-di-tert-butylfluorenyl)zirconium dichloride, di-n-octylmethylene(cyclopentadienyl)(2,7-di-p-chlorophenyl-3,6-di-tert-butylfluorenyl)zirconium dichloride, di-n-triacontylmethylene(cyclopentadienyl)(2,7-di-p-chlorophenyl-3,6-di-tert-butylfluorenyl)zirconium dichloride, phenylmethylene(cyclopentadienyl)(2,7-di-p-chlorophenyl-3,6-di-tert-butylfluorenyl)zirconium dichloride, diphenylmethylene(cyclopentadienyl)(2,7-di-p-chlorophenyl-3,6-di-tert-butylfluorenyl)zirconium dichloride, di-p-tolylmethylene(cyclopentadienyl)(2,7-di-p-chlorophenyl-3,6-di-tert-butylfluorenyl)zirconium dichloride, di(p-chlorophenyl)methylene(cyclopentadienyl)(2,7-di-p-chlorophenyl-3,6-di-tert-butylfluorenyl)zirconium dichloride, di(p-trifluoromethylphenyl)methylene(cyclopentadienyl)(2,7-di-p-chlorophenyl-3,6-di-tert-butylfluorenyl)zirconium dichloride, di(2-naphthyl)methylene(cyclopentadienyl)(2,7-di-p-chlorophenyl-3,6-di-tert-butylfluorenyl)zirconium dichloride, dibenzylmethylene(cyclopentadienyl)(2,7-di-p-chlorophenyl-3,6-di-tert-butylfluorenyl)zirconium dichloride, di(p-chlorobenzyl)methylene(cyclopentadienyl)(2,7-di-p-chlorophenyl-3,6-di-tert-butylfluorenyl)zirconium dichloride, di(p-methylbenzyl)methylene(cyclopentadienyl)(2,7-di-p-chlorophenyl-3,6-di-tert-butylfluorenyl)zirconium dichloride, cyclohexyl(cyclopentadienyl)(2,7-di-p-chlorophenyl-3,6-di-tert-butylfluorenyl)zirconium dichloride, dibenzylmethylene(cyclopentadienyl)(2,7-di-p-chlorophenyl-fluorenyl)zirconium dichloride, dibenzylmethylene(cyclopentadienyl)(2,7-di-p-chlorophenyl-3,6-ditrimethylsilylfluorenyl)zirconium dichloride, dibenzylmethylene(cyclopentadienyl)(2,7-di-p-chlorophenyl-3,6-dicumylfluorenyl)zirconium dichloride, dibenzylmethylene(cyclopentadienyl)(2,7-di-p-chlorophenyl-3,6-adamantylfluorenyl)zirconium dichloride, dibenzylmethylene(cyclopentadienyl)(2,7-di-p-trifluoromethylphenyl-3,6-di-tert-butylfluorenyl)zirconium dichloride, diethylmethylene(cyclopentadienyl)(2,7-di-p-trifluoromethylphenyl-3,6-di-tert-butylfluorenyl)zirconium dichloride, di-n-propylmethylene(cyclopentadienyl)(2,7-di-p-trifluoromethylphenyl-3,6-di-tert-butylfluorenyl)zirconium dichloride, diisopropylmethylene(cyclopentadienyl)(2,7-di-p-trifluoromethylphenyl-3,6-di-tert-butylfluorenyl)zirconium dichloride, di-n-butylmethylene(cyclopentadienyl)(2,7-di-p-trifluoromethylphenyl-3,6-di-tert-butylfluorenyl)zirconium dichloride, diisobutylmethylene(cyclopentadienyl)(2,7-di-p-trifluoromethylphenyl-3,6-di-tert-butylfluorenyl)zirconium dichloride, di-sec-butylmethylene(cyclopentadienyl)(2,7-di-p-trifluoromethylphenyl-3,6-di-tert-butylfluorenyl)zirconium dichloride, di-tert-butylmethylene(cyclopentadienyl)(2,7-di-p-trifluoromethylphenyl-3,6-di-tert-butylfluorenyl)zirconium dichloride, di-n-octylmethylene(cyclopentadienyl)(2,7-di-p-trifluoromethylphenyl-3,6-di-tert-butylfluorenyl)zirconium dichloride, di-n-triacontylmethylene(cyclopentadienyl)(2,7-di-p-trifluoromethylphenyl-3,6-di-tert-butylfluorenyl)zirconium dichloride, phenylmethylene(cyclopentadienyl)(2,7-di-p-trifluoromethylphenyl-3,6-di-tert-butylfluorenyl)zirconium dichloride, diphenylmethylene(cyclopentadienyl)(2,7-di-p-trifluoromethylphenyl-3,6-di-tert-butylfluorenyl)zirconium dichloride, di-p-tolylmethylene(cyclopentadienyl)(2,7-di-p-trifluoromethylphenyl-3,6-di-tert-butylfluorenyl)zirconium dichloride, di(p-chlorophenyl)methylene(cyclopentadienyl)(2,7-di-p-trifluoromethylphenyl-3,6-di-tert-butylfluorenyl)zirconium dichloride, di(p-trifluoromethylphenyl)methylene(cyclopentadienyl)(2,7-di-p-trifluoromethylphenyl-3,6-di-tert-butylfluorenyl)zirconium dichloride, di(2-naphthyl)methylene(cyclopentadienyl)(2,7-di-p-trifluoromethylphenyl-3,6-di-tert-butylfluorenyl)zirconium dichloride, dibenzylmethylene(cyclopentadienyl)(2,7-di-p-trifluoromethylphenyl-3,6-di-tert-butylfluorenyl)zirconium dichloride, di(p-chlorobenzyl)methylene(cyclopentadienyl)(2,7-di-p-trifluoromethylphenyl-3,6-di-tert-butylfluorenyl)zirconium dichloride, di(p-methylbenzyl)methylene(cyclopentadienyl)(2,7-di-p-trifluoromethylphenyl-3,6-di-tert-butylfluorenyl)zirconium dichloride, cyclohexyl(cyclopentadienyl)(2,7-di-p-trifluoromethylphenyl-3,6-di-tert-butylfluorenyl)zirconium dichloride, dibenzylmethylene(cyclopentadienyl)(2,7-di-p-trifluoromethylphenyl-fluorenyl)zirconium dichloride, dibenzylmethylene(cyclopentadienyl)(2,7-di-p-trifluoromethylphenyl-3,6-ditrimethylsilylfluorenyl)zirconium dichloride, dibenzylmethylene(cyclopentadienyl)(2,7-di-p-trifluoromethylphenyl-3,6-dicumylfluorenyl)zirconium dichloride, dibenzylmethylene(cyclopentadienyl)(2,7-di-p-trifluoromethylphenyl-3,6-adamantylfluorenyl)zirconium dichloride, dibenzylmethylene(cyclopentadienyl)(2,7-di-p-bromophenyl-3,6-ditrimethylsilylfluorenyl)zirconium dichloride, dibenzyl(cyclopentadienyl)(2,7-di-p-iodophenyl-3,6-ditrimethylsilylfluorenyl)zirconium dichloride, etc.

Compounds wherein "zirconium" is replaced with "hafnium" or "titanium" in the above compounds and compounds wherein "dichloride" is replaced with "dimethyl" or "methylethyl" in the above compounds are also preferably used.

The transition metal compound (a), e.g., the transition metal compound (a1-1) and the transition metal compound (a1-2), can be prepared by a publicly known process, and the preparation process is not specifically restricted. Examples of the publicly known preparation processes include preparation processes described in WO2001/27124 pamphlet and WO2004/087775 pamphlet by the present applicant.

Now, an example of a process for preparing a fluorene derivative that is used for preparing the transition metal compound (a) is described.

The process for preparing a fluorene derivative is a process for preparing a specific fluorene derivative by allowing a specific fluorene compound (AA) to react with a specific boron compound (BB) in the presence of a base (CC), and is characterized by carrying out the reaction in a water-containing solvent (FF) using a specific phosphorus compound (DD) and a specific palladium compound (EE) as catalysts.

The fluorene compound (AA), the boron compound (BB), the base (CC), the phosphorus compound (DD), the palladium compound (EE) and the water-containing solvent (FF) are described below in detail.

Fluorene Compound (AA)

The fluorene compound (AA) for use in the present invention is a fluorene compound represented by the following formula [11] or the following formula (22).

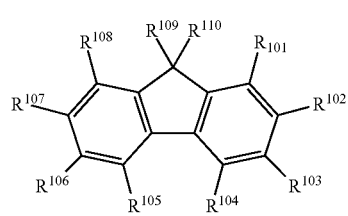

[11]

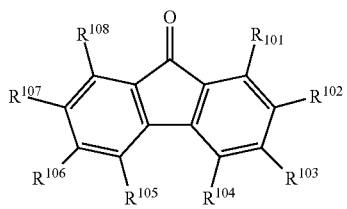
[22]

In the formula [11] and the formula [22], $R^{101}$ to $R^{110}$ are each a hydrogen atom, a hydroxyl group, a halogen atom (XX), a hydrocarbon group (GG) of 1 to 20 carbon atoms, an oxygen-containing hydrocarbon group (OO) of 1 to 20 carbon atoms, a nitrogen-containing hydrocarbon group (NN) of 1 to 20 carbon atoms, a silicon-containing hydrocarbon group (SSI) of 1 to 20 carbon atoms, a halogen-containing hydrocarbon group (HH) of 1 to 20 carbon atoms or a sulfur-containing hydrocarbon group (SS) of 1 to 20 carbon atoms, and they may be the same as or different from one another. In one or more combinations of adjacent groups, the adjacent groups may be bonded to each other to form a ring. At least one of $R^{101}$ to $R^{108}$ is a halogen atom (XX) or a sulfur-containing hydrocarbon group (SS) of 1 to 20 carbon atoms.

$R^{101}$ to $R^{108}$ which are atoms or groups other than a halogen atom (XX) and a sulfur-containing hydrocarbon group (SS) may be the same as $R^1$ to $R^{12}$ in the formula [A1].

In the process for preparing a fluorene derivative, the halogen atom (XX) and/or the sulfur-containing hydrocarbon group (SS) of the substituents of the fluorene compound (AA) is converted into a substituent $R^{113}$ of the later-described boron compound (BB) to obtain a fluorene derivative.

It is preferable that arbitrary two of $R^{102}$, $R^{103}$, $R^{106}$ and $R^{107}$ are each a halogen atom (XX), and the residual two are each a hydrocarbon group (GG) of 1 to 20 carbon atoms, an oxygen-containing hydrocarbon group (OO) of 1 to 20 carbon atoms, a silicon-containing hydrocarbon group (SSI) of 1 to 20 carbon atoms, a halogen-containing hydrocarbon group (HH) of 1 to 20 carbon atoms or a sulfur-containing hydrocarbon group (SS) of 1 to 20 carbon atoms. If such a fluorene compound (AA) is used as a reaction raw material, yield of the resulting fluorene derivative is lowered in the conventional preparation process. However, when the reaction is carried out in a solvent containing water using the later-described phosphorus compound (DD) and palladium compound (EE) as catalysts, the reaction proceeds rapidly and the fluorene derivative is obtained in a good yield even if such a fluorene compound (AA) is used as a reaction raw material.

The halogen atom (XX) is, for example, a fluorine atom, a chlorine atom, a bromine atom or an iodine atom. Of such atoms, a chlorine atom, a bromine atom or an iodine atom is preferable, and a bromine atom or an iodine atom is particularly preferable.

Examples of the hydrocarbon groups (GG) of 1 to 20 carbon atoms include methyl group, ethyl group, 1-propyl group, allyl group, 1-butyl group, 1-pentyl group, 1-hexyl group, 1-heptyl group, 1-octyl group, 1-nonyl group, 1-decanyl group, 1-eicosanyl group, isopropyl group, tert-butyl group, 3-methylpentyl group, 1,1-diethylpropyl group, 1,1-dimethylbutyl group, 1-methyl-1-propylbutyl group, 1,1-dipropylbutyl group, 1,1-dimethyl-2-methylpropyl group, 1-methyl-1-isopropyl-2-methylpropyl group, 1,1-dimethyl-2,2-dimethyl-3,3-dimethyl-4,4-dimethylpentyl group, cyclopentyl group, cyclohexyl group, cycloheptyl group, cyclooctyl group, 4-cyclohexyl-tert-butyl group, norbornyl group, adamantyl group, phenyl group, 2-methylphenyl group, 3-methylphenyl group, 4-methylphenyl group, 2,4-dimethylphenyl group, 2,6-dimethylphenyl group, mesityl group, benzyl group, α-phenethyl group, diphenylmethyl group, naphthylmethyl group, cumyl group, neophyl group, naphthyl group, biphenyl group, binaphthyl group, phenanthryl group, anthracenyl group and fluorenyl group.

The number of carbon atoms of the hydrocarbon group (GG) is preferably 1 to 10, more preferably 1 to 6. Examples of such hydrocarbon groups (GG) include straight-chain hydrocarbon groups, such as methyl group, ethyl group, 1-propyl group, allyl group, 1-butyl group, 1-pentyl group and 1-hexyl group; isopropyl group, tert-butyl group, 3-methylpentyl group, 1,1-dimethylbutyl group, 1,1-dimethyl-2-methylpropyl group, cyclopentyl group, cyclohexyl group and aryl group.

Examples of the oxygen-containing hydrocarbon groups (OO) of 1 to 20 carbon atoms include methoxy group, ethoxy group, n-propoxy group, isopropoxy group, n-butoxy group, sec-butoxy group, isobutoxy group, tert-butoxy group, 1-decyloxy group, 1-icosyloxy group, phenoxy group, 1-naphthoxy group, 2-naphthoxy group, 2-methoxyphenyl group, 3-methoxyphenyl group, 4-methoxyphenyl group and 4-phenoxyphenyl group.

The number of carbon atoms of the oxygen-containing hydrocarbon group (OO) is preferably 1 to 10, more preferably 1 to 6. Examples of such oxygen-containing hydrocarbon groups (OO) include methoxy group, ethoxy group, n-propoxy group, isopropoxy group, n-butoxy group, sec-butoxy group, isobutoxy group, tert-butoxy group and phenoxy group.

Examples of the nitrogen-containing hydrocarbon groups (NN) of 1 to 20 carbon atoms include dimethylamino group, diethylamino group, didecylamino group, pyrrolidinyl group, piperidinyl group, pyrrolyl group, pyridyl group, quinolyl group, imidazolyl group, dimethylaminophenyl group and piperidinylphenyl group.

The number of carbon atoms of the nitrogen-containing hydrocarbon group (NN) is preferably 1 to 10, more preferably 1 to 6. Examples of such nitrogen-containing hydrocarbon groups (NN) include dimethylamino group, diethylamino group, pyrrolidinyl group, piperidinyl group, pyrrolyl group, pyridyl group and imidazolyl group.

Examples of the silicon-containing hydrocarbon groups (SSI) of 1 to 20 carbon atoms include trimethylsilyl group, triethylsilyl group, triisopropylsilyl group, tert-butyldimethylsilyl group, hexyl-di-1-heptylsilyl group, 4-trimethylsilylphenyl group and triphenylsilyl group.

The number of carbon atoms of the silicon-containing hydrocarbon group (SSI) is preferably 1 to 10, more preferably 1 to 6. Examples of such silicon-containing hydrocarbon groups (SSI) include trimethylsilyl group, triethylsilyl group and tert-butyldimethylsilyl group.

Examples of the halogen-containing hydrocarbon groups (HH) of 1 to 20 carbon atoms include fluoromethyl group, trifluoromethyl group, trichloromethyl group, pentafluoroethyl group, 1-fluorophenyl group, 1-chlorophenyl group, 1-bromophenyl group, 1-iodophenyl group, 2-fluorophenyl group, 2-bromophenyl group, 2-iodophenyl group, 2-chlorophenyl group, 3-chlorophenyl group, 4-chlorophenyl group, 2-bromophenyl group, 3-bromophenyl group, 4-bromophenyl group, 2-fluorophenyl group, 3-fluorophenyl group, 4-fluorophenyl group, fluoronaphthyl group, chloronaphthyl group, bromonaphthyl group, iodonaphthyl group, pentafluorophenyl group and tri-perfluorophenylmethyl group.

The number of carbon atoms of the halogen-containing hydrocarbon group (HH) is preferably 1 to 10, more preferably 1 to 6. Examples of such halogen-containing hydrocarbon groups (HH) include fluoromethyl group, trifluoromethyl group, trichloromethyl group, pentafluoroethyl group, 1-fluorophenyl group, 1-chlorophenyl group, 1-bromophenyl group, 1-iodophenyl group, 2-fluorophenyl group, 2-bromophenyl group, 2-iodophenyl group, 2-chlorophenyl group, 3-chlorophenyl group, 4-chlorophenyl group, 2-bromophenyl group, 3-bromophenyl group, 4-bromophenyl group, 2-fluorophenyl group, 3-fluorophenyl group, 4-fluorophenyl group and pentafluorophenyl group.

Examples of the sulfur-containing hydrocarbon groups (SS) of 1 to 20 carbon atoms include methanesulfonato group, ethanesulfonato group, trifluoromethanesulfonato group, 2,2,2-trifluoroethanesulfonato group, benzenesulfonato group, o-toluenesulfonato group, m-toluenesulfonato group, p-toluenesulfonato group, p-ethylbenzenesulfonato group and p-tert-butylbenzenesulfonato group.

The number of carbon atoms of the sulfur-containing hydrocarbon group (SS) is preferably 1 to 10, more preferably 1 to 6. Examples of such sulfur-containing hydrocarbon groups (SS) include methanesulfonato group, ethanesulfonato group, trifluoromethanesulfonato group, 2,2,2-trifluoroethanesulfonato group, benzenesulfonato group, p-toluenesulfonato group, p-ethylbenzenesulfonato group and p-tert-butylbenzenesulfonato group.

The fluorene compound (AA) is particularly preferably a fluorene compound represented by the following formula [77].

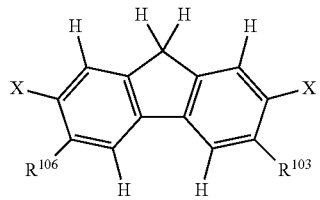

[77]

In the formula [77], each X is independently a chlorine atom, a bromine atom, an iodine atom or a fluorine atom, and $R^{103}$ and $R^{106}$ are each independently a hydrocarbon group of 1 to 20 carbon atoms.

In the formula [77], it is more preferable that each X is independently a chlorine atom, a bromine atom or an iodine atom and $R^{103}$ and $R^{106}$ are each independently a hydrocarbon group of 1 to 15 carbon atoms.

Examples of the hydrocarbon groups of 1 to 15 carbon atoms include methyl group, ethyl group, 1-propyl group, allyl group, 1-butyl group, 1-pentyl group, 1-hexyl group, 1-heptyl group, 1-octyl group, 1-nonyl group, 1-decanyl group, 1-pentadecanyl group, isopropyl group, tert-butyl group, 3-methylpentyl group, 1,1-diethylpropyl group, 1,1-dimethylbutyl group, 1-methyl-1-propylbutyl group, 1,1-dipropylbutyl group, 1,1-dimethyl-2-methylpropyl group, 1-methyl-1-isopropyl-2-methylpropyl group, cyclopentyl group, cyclohexyl group, cycloheptyl group, cyclooctyl group, 4-cyclohexyl-tert-butyl group, norbornyl group, adamantyl group, phenyl group, o-methylphenyl group, m-methylphenyl group, p-methylphenyl group, 2,4-dimethylphenyl group, 2,6-dimethylphenyl group, mesityl group, benzyl group, α-phenethyl group, naphthylmethyl group, cumyl group, neophyl group, 1-naphthyl group and 2-naphthyl group.

In the formula [77], it is still more preferable that each X is independently a chlorine atom or a bromine atom and $R^{103}$ and $R^{106}$ are each independently a hydrocarbon group of 1 to 10 carbon atoms.

Examples of the hydrocarbon groups of 1 to 10 carbon atoms include methyl group, ethyl group, 1-propyl group, allyl group, 1-butyl group, 1-decyl group, isopropyl group, tert-butyl group, 4-cyclohexyl-tert-butyl group, o-methylphenyl group, m-methylphenyl group, p-methylphenyl group, 2,4-dimethylphenyl group, 2,6-dimethylphenyl group, mesityl group, benzyl group, 1-naphthyl group and 2-naphthyl group.

In the formula [77], it is also preferable that $R^{103}$ and $R^{106}$ are each selected from a hydrogen atom, an alkyl group (f1-1) of 1 to 40 carbon atoms and a silicon-containing group of 1 to 40 carbon atoms, and it is more preferable that they are each an alkyl group (f1-1) of 1 to 20 carbon atoms and are the same groups as each other, as described for $R^{6a}$ and $R^{7a}$ in the aforesaid formula [A1-1] or $R^{6b}$ and $R^{7b}$ in the aforesaid formula [A1-2]. It is still more preferable that $R^{103}$ and $R^{106}$ are each a methyl group, an ethyl group, an isopropyl group or a t-butyl group and are the same groups as each other.

If the fluorene compound (AA) represented by the formula [77] is used as a reaction raw material, yield of the resulting fluorene derivative is lowered in the conventional preparation process. However, when the reaction is carried out in a solvent containing water using the later-described phosphorus compound (DD) and palladium compound (EE) as catalysts, the reaction proceeds rapidly and the fluorene derivative is obtained in a good yield even if such a fluorene compound (AA) is used as a reaction raw material.

Boron Compound (BB)

The boron compound (BB) is a boron compound represented by the following formula [33], the following formula [44] or the following formula [55].

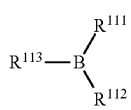

[33]

$R^{113}BF_3M$ [44]

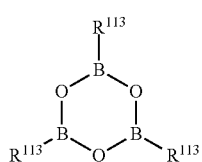

[55]

In the formula [33], the formula [44] and the formula [55], $R^{111}$, $R^{112}$ and $R^{113}$ are each a hydroxyl group, a hydrocarbon group (GG2) of 1 to 20 carbon atoms, an oxygen-containing hydrocarbon group (OO2) of 1 to 20 carbon atoms, a nitrogen-containing hydrocarbon group (NN2) of 1 to 20 carbon atoms, a silicon-containing hydrocarbon group (SSI2) of 1 to 20 carbon atoms, a halogen-containing hydrocarbon group (HH2) of 1 to 20 carbon atoms or a sulfur-containing hydrocarbon group (SS2) of 1 to 20 carbon atoms, and they may be the same as or different from one another. $R^{111}$ and $R^{112}$ may be bonded to each other to form a ring. M is a lithium atom, a sodium atom or a potassium atom.

If such a boron compound (BB) is used as a reaction raw material, yield of the resulting fluorene derivative is lowered in the conventional preparation process. However, when the reaction is carried out in a solvent containing water using the later-described phosphorus compound (DD) and palladium compound (EE) as catalysts, the reaction proceeds rapidly and the fluorene derivative is obtained in a good yield even if such a boron compound (BB) is used as a reaction raw material.

Examples of the hydrocarbon groups (GG2) of 1 to 20 carbon atoms include methyl group, ethyl group, 1-propyl group, 1-hexyl group, 1-heptyl group, 1-decanyl group, vinyl group, allyl group, 1-pentenyl group, 1-hexenyl group, 1-octenyl group, 1-decenyl group, 1-icosyloxy group, isopropyl group, tert-butyl group, 3-methylpentyl group, 1,1-diethylpropyl group, 1,1-dimethylbutyl group, 1-methyl-1-propylbutyl group, 1,1-dipropylbutyl group, 1,1-dimethyl-2-methylpropyl group, 1-methyl-1-isopropyl-2-methylpropyl group, cyclopentyl group, cyclohexyl group, cycloheptyl group, cyclooctyl group, 4-cyclohexyl-tert-butyl group, norbornyl group, adamantyl group, 2-cyclohexylvinyl group, phenyl group, 2-phenylvinyl group, 2-(4-biphenyl)vinyl group, 2-methylphenyl group, 3-methylphenyl group, 4-methylphenylgroup, 2-ethylphenylgroup, 2,4-dimethylphenyl group, 2,6-dimethylphenyl group, mesityl group, benzyl group, α-phenethyl group, diphenylmethyl group, naphthylmethyl group, cumyl group, neophylgroup, naphthylgroup, biphenylgroup, binaphthyl group, phenanthryl group, anthracenyl group and fluorenyl group.

The number of carbon atoms of the hydrocarbon group (GG2) is preferably 1 to 16, more preferably 1 to 12. Examples of such hydrocarbon groups (GG2) include methyl group, ethyl group, 1-propyl group, 1-hexyl group, 1-heptyl group, 1-decanyl group, vinyl group, allyl group, 1-pentenyl group, 1-hexenyl group, 1-octenyl group, 1-decenyl group, isopropyl group, tert-butyl group, 3-methylpentyl group, 1,1-diethylpropyl group, 1,1-dimethylbutyl group, 1-methyl-1-propylbutyl group, 1,1-dipropylbutyl group, 1,1-dimethyl-2-methylpropyl group, 1-methyl-1-isopropyl-2-methylpropyl group, cyclopentyl group, cyclohexyl group, cycloheptyl group, cyclooctyl group, 4-cyclohexyl-tert-butyl group, norbornyl group, adamantyl group, 2-cyclohexylvinyl group, phenyl group, 2-phenylvinyl group, 2-methylphenyl group, 3-methylphenyl group, 4-methylphenyl group, 2-ethylphenyl group, 2,4-dimethylphenyl group, 2,6-dimethylphenyl group, mesityl group, benzyl group, α-phenethyl group, diphenylmethyl group, naphthylmethyl group, cumyl group, neophyl group, naphthyl group and biphenyl group.

Examples of the oxygen-containing hydrocarbon groups (OO2) of 1 to 20 carbon atoms include methoxy group, ethoxy group, 1-propoxy group, isopropoxy group, 1-butoxy group, s-butoxy group, isobutoxy group, tert-butoxy group, 1-decyloxy group, 1-icosyloxy group, phenoxy group, benzyloxy group, 1-naphthoxy group, 2-naphthoxy group, 2-methoxyphenyl group, 3-methoxyphenyl group, 4-methoxyphenyl group, 4-ethoxyphenyl group, 4-isopropoxyphenyl group, 4-phenoxyphenyl group, 4-formylphenyl group, 4-hydroxyphenyl group, 2-furyl group, 3-furyl group, benzofuryl group, 4-carboxyphenyl group and 4-benzoylphenyl group. Moreover, there can be also mentioned pinacol ester, catechol ester, 1,3-propanediol ester, neopentyl glycol ester, etc. wherein $R^{11}$ and $R^{12}$ are bonded to each other.

The number of carbon atoms of the oxygen-containing hydrocarbon group (OO2) is preferably 1 to 16, more preferably 1 to 12. Examples of such oxygen-containing hydrocarbon groups (OO2) include methoxy group, ethoxy group, 1-propoxy group, isopropoxy group, 1-butoxy group, s-butoxy group, isobutoxy group, tert-butoxy group, 1-decyloxy group, phenoxy group, benzyloxy group, 1-naphthoxy group, 2-naphthoxy group, 2-methoxyphenyl group, 3-methoxyphenyl group, 4-methoxyphenyl group, 4-ethoxyphenyl group, 4-isopropoxyphenyl group, 4-phenoxyphenyl group, 4-formylphenyl group, 4-hydroxyphenyl group, 2-furyl group, 3-furyl group, benzofuryl group and 4-carboxyphenyl group. Moreover, there can be also mentioned pinacol ester, catechol ester, 1,3-propanediol ester, neopentyl glycol ester, etc. wherein $R^{111}$ and $R^{112}$ bonded to each other.

Examples of the nitrogen-containing hydrocarbon groups (NN2) of 1 to 20 carbon atoms include dimethylamino group, diethylamino group, didecylamino group, 2-aminophenyl group, 3-aminophenyl group, 4-aminophenyl group, 3-nitrophenyl group, 4-cyanophenyl group, 3-acetamidophenyl group, 4-acetamidophenyl group, 3-pyridinyl group, 4-pyridinyl group, 3-quinolinyl group, 8-quinolinyl group, 4-isoquinolinyl group, 4-pyrazole group, 1-methyl-4-pyrazole group and 3,5-dimethyl-4-pyrazole group.

The number of carbon atoms of the nitrogen-containing hydrocarbon group (NN2) is preferably 1 to 10, more preferably 1 to 6. Examples of such nitrogen-containing hydrocarbon groups (NN2) include dimethylamino group, diethylamino group, 2-aminophenyl group, 3-aminophenyl group, 4-aminophenyl group, 3-pyridinyl group, 4-pyridinyl group, 4-pyrazole group, 1-methyl-4-pyrazole group and 3,5-dimethyl-4-pyrazole group.

Examples of the silicon-containing hydrocarbon groups (SSI2) of 1 to 20 carbon atoms include trimethylsilyl group, triethylsilyl group, triisopropylsilyl group, tert-butyldimethylsilyl group, 2-triphenylsilylethyl group, 4-trimethylsilylphenyl group, 4-(tert-butyldimethylsiloxy)phenyl group and hexyl-di-1-heptylsilyl group.

The number of carbon atoms of the silicon-containing hydrocarbon group (SSI2) is preferably 1 to 10, more preferably 1 to 6. Examples of such silicon-containing hydrocarbon groups (SSI2) include trimethylsilyl group, triethylsilyl group and tert-butyldimethylsilyl group.

Examples of the halogen-containing hydrocarbon groups (HH2) of 1 to 20 carbon atoms include fluoromethyl group, trifluoromethyl group, trichloromethyl group, pentafluoroethyl group, 2-fluorophenyl group, 2-bromophenyl group, 2-iodophenyl group, 2-chlorophenyl group, 3-chlorophenyl group, 4-chlorophenyl group, 2-methyl-4-chlorophenyl group, 2-bromophenyl group, 3-bromophenyl group, 4-bromophenyl group, 4-fluorophenyl group, 4-trifluoromethylphenyl group, 4-trifluoromethoxyphenyl group, 2,6-difluorophenyl group, 3,5-dichlorophenyl group, 3,5-difluorophenyl group, pentafluorophenyl group and triperfluorophenylmethyl group.

The number of carbon atoms of the halogen-containing hydrocarbon group (HH2) is preferably 1 to 10, more preferably 1 to 7. Examples of such halogen-containing hydrocarbon groups (HH2) include fluoromethyl group, trifluoromethyl group, trichloromethyl group, pentafluoroethyl group, 2-fluorophenyl group, 2-bromophenyl group, 2-iodophenyl group, 2-chlorophenyl group, 3-chlorophenyl group, 4-chlorophenyl group, 2-methyl-4-chlorophenyl group, 2-bromophenyl group, 3-bromophenyl group, 4-bromophenyl group, 4-fluorophenyl group, 4-trifluoromethylphenyl group, 2,6-difluorophenyl group, 3,5-dichlorophenyl group, 3,5-difluorophenyl group and pentafluorophenyl group.

Examples of the sulfur-containing hydrocarbon groups (SS2) of 1 to 20 carbon atoms include thiophenyl group, 2-methylthiophenyl group, 3-methylthiophenyl group, 4-methylthiophenyl group, 2-thienyl group, 3-thienyl group, 5-methyl-2-thiophenyl group, 2-thianaphthalenyl group, 3-thianaphthalenyl group and thiotrityl group.

The number of carbon atoms of the sulfur-containing hydrocarbon group (SS2) is preferably 1 to 10, more preferably 1 to 6. Examples of such sulfur-containing hydrocarbon groups (SS2) include thiophenyl group, 2-thienyl group and 3-thienyl group.

M is a sodium atom, a lithium atom or a potassium atom, and is preferably a potassium atom.

$R^{113}$ is more preferably a group represented by the following formula [88].

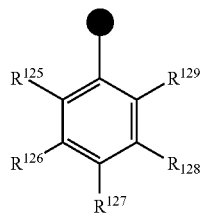

[88]

In the formula [88], $R^{125}$ to $R^{129}$ are each a hydrogen atom, a hydroxyl group, a halogen atom (XX3), a hydrocarbon group (GG3) of 1 to 14 carbon atoms, an oxygen-containing hydrocarbon group (OO3) of 1 to 14 carbon atoms, a silicon-containing hydrocarbon group (SSI3) of 1 to 14 carbon atoms, a halogen-containing hydrocarbon group (HH3) of 1 to 14 carbon atoms or a sulfur-containing hydrocarbon group (SS3) of 1 to 14 carbon atoms, and the substituents may be the same as or different from one another. In one or more combinations of adjacent groups, the adjacent groups may be bonded to each other to form a ring. The black circle (●) represents a linkage point to a boron atom, and the total number of carbon atoms of $R^{125}$ to $R^{129}$ is 14 or less.

The halogen atom (XX3) is, for example, a fluorine atom, a chlorine atom, a bromine atom or an iodine atom. Of such atoms, a fluorine atom, a chlorine atom or a bromine atom is preferable, and a fluorine atom or a chlorine atom is particularly preferable.

Examples of the hydrocarbon groups (GG3) of 1 to 14 carbon atoms include methyl group, ethyl group, 1-propyl group, 1-butyl group, 1-hexyl group, vinyl group, allyl group, 1-pentenyl group, 1-hexenyl group, 1-octenyl group, 1-decenyl group, 1-tetradecanyl group, isopropyl group, tert-butyl group, 3-methylpentyl group, 1,1-diethylpropyl group, cyclopentyl group, cyclohexyl group, cycloheptyl group, cyclooctyl group, 4-cyclohexyl-tert-butyl group, norbornyl group, adamantyl group, phenyl group, 2-methylphenyl group, 3-methylphenyl group, 4-methylphenyl group, 2,4-dimethylphenyl group, 2,6-dimethylphenyl group, naphthylmethyl group and naphthyl group.

The number of carbon atoms of the hydrocarbon group (GG3) is preferably 1 to 12, more preferably 1 to 10, still more preferably 1 to 8, particularly preferably 1 to 6. Examples of such hydrocarbon groups (GG3) include methyl group, ethyl group, 1-propyl group, 1-butyl group, sec-butyl group, isobutyl group, tert-butyl group, 1-hexyl group, cyclopentyl group, cyclohexyl group, phenyl group, naphthyl group and biphenyl group.

Examples of the oxygen-containing hydrocarbon groups (OO3) of 1 to 14 carbon atoms include methoxy group, ethoxy group, 1-propoxy group, isopropoxy group, 1-butoxy group, sec-butoxy group, isobutoxy group, tert-butoxy group, 1-tetradecoxy group, phenoxy group, naphthoxy group, biphenyloxy group and benzyloxy group.

The number of carbon atoms of the oxygen-containing hydrocarbon group (OO3) is preferably 1 to 12, more preferably 1 to 10, still more preferably 1 to 8, particularly preferably 1 to 6. Examples of such oxygen-containing hydrocarbon groups (OO3) include methoxy group, ethoxy group, 1-propoxy group, isopropoxy group, 1-butoxy group, sec-butoxy group, isobutoxy group, tert-butoxy group, phenoxy group, naphthoxy group and biphenyloxy group.

Examples of the silicon-containing hydrocarbon groups (SSI3) of 1 to 14 carbon atoms include trimethylsilyl group, triethylsilyl group, triisopropylsilyl group, tert-butyldimethylsilyl group, 4-trimethylsilylphenyl group, 4-(tert-butyldimethylsiloxy)phenyl group, dimethylphenylsilyl group, dimethylnaphthylsilyl group and hexyl-di-1-butylsilyl group.

The number of carbon atoms of the silicon-containing hydrocarbon group (SSI3) is preferably 1 to 12, more preferably 1 to 10, still more preferably 1 to 8, particularly preferably 1 to 6. Examples of such silicon-containing hydrocarbon groups (SSI3) include trimethylsilyl group, triethylsilyl group, tert-butyldimethylsilyl group and dimethylphenylsilyl group.

Examples of the halogen-containing hydrocarbon groups (HH3) of 1 to 14 carbon atoms include fluoromethyl group, trifluoromethyl group, trichloromethyl group, pentafluoroethyl group, 2-fluorophenyl group, 2-bromophenyl group, 2-iodophenyl group, 2-chlorophenyl group, 3-chlorophenyl group, 4-chlorophenyl group, 2-bromophenyl group, 3-bromophenyl group, 4-bromophenyl group, 4-trifluoromethylphenyl group, 4-trifluoromethoxyphenyl group, 2,6-difluorophenyl group, 3,5-dichlorophenyl group, 3,5-difluorophenyl group, pentafluorophenyl group, 2,6-difluoro-4-tert-butylphenyl group, fluoronaphthyl group and chloronaphthyl group.

The number of carbon atoms of the halogen-containing hydrocarbon group (HH3) is preferably 1 to 12, more preferably 1 to 10, still more preferably 1 to 8, particularly preferably 1 to 6. Examples of such halogen-containing hydrocarbon groups (HH3) include fluoromethyl group, trifluoromethyl group, trichloromethyl group, pentafluoroethyl group, 2-fluorophenyl group, 2-bromophenyl group, 2-iodophenyl group, 2-chlorophenyl group, 3-chlorophenyl group, 4-chlorophenyl group, 2-bromophenyl group, 3-bromophenyl group, 4-bromophenyl group, 2,6-difluorophenyl group, 3,5-dichlorophenyl group, 3,5-difluorophenyl group, pentafluorophenyl group, fluoronaphthyl group and chloronaphthyl group.

Examples of the sulfur-containing hydrocarbon groups (SS3) of 1 to 14 carbon atoms include thiomethyl group, thioethyl group, thiocyclohexyl group, thiophenyl group, thionaphthyl group, 2-methylthiophenyl group, 3-methylthiophenyl group, 4-methylthiophenyl group, 2-thienyl group, 3-thienyl group and 5-methyl-2-thiophenyl group.

The number of carbon atoms of the sulfur-containing hydrocarbon group (SS3) is preferably 1 to 12, more preferably 1 to 10, still more preferably 1 to 8, particularly preferably 1 to 6. Examples of such sulfur-containing hydrocarbon groups (SS3) include thiomethyl group, thioethyl group, thiocyclohexyl group, thiophenyl group, thionaphthyl group, 2-thienyl group and 3-thienyl group.

In the formula [88], it is preferable that one substituent is a halogen atom (XX3), a hydrocarbon group (GG3) of 1 to 14 carbon atoms, an oxygen-containing hydrocarbon group (OO3) of 1 to 14 carbon atoms, a silicon-containing hydrocarbon group (SSI3) of 1 to 14 carbon atoms, a halogen-containing hydrocarbon group (HH3) of 1 to 14 carbon atoms or a sulfur-containing hydrocarbon group (SS3) of 1 to 14 carbon atoms, the residual four substituents are each a hydrogen atom, and the total number of carbon atoms of $R^{125}$ to $R^{129}$ is 14 or less. It is also preferable that at least one of $R^{125}$ and $R^{129}$ in the formula [88] is a hydrocarbon group (GG3) of 1 to 14 carbon atoms. It is more preferable that $R^{125}$ is a hydrocarbon group (GG3) of 1 to 14 carbon atoms and $R^{126}$ to $R^{129}$ are each a hydrogen atom. More specifically, in the formula [88], it is preferable that $R^{125}$ is a hydrocarbon group of 1 to 10 carbon atoms, such as methyl group, ethyl group, propyl group, 1-propyl group, 1-butyl group, sec-butyl group, isobutyl group, tert-butyl group, 1-hexyl group, 1-decyl group, cyclopentyl group, cyclohexyl group, 4-cyclohexyl-tert-butyl group, phenyl group, 1-naphthyl group or 2-naphthyl group, and $R^{126}$ to $R^{129}$ are each a hydrogen atom.

In the formula [88], it is also preferable that $R^{127}$ is a halogen atom and $R^{125}$, $R^{126}$, $R^{128}$ and $R^{129}$ are each a hydrogen atom. It is also preferable that $R^{125}$ to $R^{129}$ are each a hydrogen atom.

The total number of carbon atoms of $R^{125}$ to $R^{129}$ is 14 or less, preferably 12 or less, more preferably 10 or less, still more preferably 8 or less, particularly preferably 6 or less.

If a boron compound (BB) represented by the formula [88] is used as a reaction raw material, yield of the resulting fluorene derivative is lowered in the conventional preparation process. However, when the reaction is carried out in a solvent containing water using the later-described phosphorus compound (DD) and palladium compound (EE) as catalysts, the reaction proceeds rapidly and the fluorene derivative is obtained in a good yield even if such a fluorene compound (AA) is used as a reaction raw material.

In the process for preparing a fluorene derivative, the amount of the boron compound (BB) used is in the range of preferably 0.01 to 5 mol, more preferably 0.1 to 5 mol, particularly preferably 0.5 to 5 mol, based on 1 mol of the halogen atom (XX) and the sulfur-containing hydrocarbon group (SS) which are bonded to the fluorene compound (AA). When the amount of the boron compound (BB) used is in the above range, the reaction proceeds in a good yield.

Base (CC)

Examples of the bases (CC) include alkali metal salts, such as lithium hydroxide, sodium hydroxide, potassium hydroxide, barium hydroxide, potassium phosphate, sodium carbonate, potassium carbonate, sodium hydrogencarbonate, potassium hydrogencarbonate, calcium carbonate, cesium carbonate, sodium fluoride, potassium fluoride, cesium fluoride, sodium methoxide, sodium ethoxide and potassium tert-butoxide; and amine bases, such as ammonia, methylamine, ethylamine, propylamine, isopropylamine, butylamine, isobutylamine, tert-butylamine, ethylenediamine, benzylamine, hexamethylenediamine, 1,2-cyclohexanediamine, dimethylamine, diethylamine, dipropylamine, dibutylamine, trimethylamine, triethylamine, diisopropylethylamine, pyridine, 2-methylpyridine, 3-methylpyridine, 4-methylpyridine, pyrrolidine, N-methylpyrrolidine, piperidine, N-methylpiperidine, morpholine, N-methylmorpholine, piperazine, 1-methylpiperazine, 2-methylpiperazine, 3-methylpiperazine, 4-methylpiperazine, quinuclidine, 4-dimethylaminopyridine, imidazole, N-methylimidazole, tetramethylethylenediamine, hexamethylenediamine, phenethylamine, diphenylamine, guanidine, 1,8-diazabicyclo[5.4.0]undec-7-ene, 1,5-diazabicyclo[4.3.0]non-5-ene, 1,4-diazabicyclo[2.2.2]octane, aniline, N-methylaniline and N,N-dimethylaniline.

The base (CC) is preferably a base which is liquid or solid at ordinary temperature from the viewpoint of handling, and examples of such bases include lithium hydroxide, sodium hydroxide, potassium hydroxide, barium hydroxide, potassium phosphate, sodium carbonate, potassium carbonate, sodium hydrogencarbonate, potassium hydrogencarbonate, calcium carbonate, cesium carbonate, sodium fluoride, potassium fluoride, cesium fluoride, sodium methoxide, sodium ethoxide, potassium tert-butoxide, ethylenediamine, 1,3-diaminopropane, propylamine, benzylamine, hexamethylenediamine, 1,2-cyclohexanediamine, dimethylamine, diethylamine, dipropylamine, dibutylamine, trimethylamine, triethylamine, diisopropylethylamine, pyridine, 2-methylpyridine, 3-methylpyridine, 4-methylpyridine, pyrrolidine, N-methylpyrrolidine, piperidine, N-methylpiperidine, morpholine, N-methylmorpholine, piperazine, quinuclidine, 4-dimethylaminopyridine, imidazole, N-methylimidazole, tetramethylethylenediamine, hexamethylenediamine, phenethylamine, guanidine, 1,8-diazabicyclo[5.4.0]undec-7-ene, 1,5-diazabicyclo[4.3.0]non-5-ene, 1,4-diazabicyclo[2.2.2]octane, aniline, N-methylaniline and N,N-dimethylaniline. Of these, more preferably used are lithium hydroxide, sodium hydroxide, potassium hydroxide, barium hydroxide, potassium phosphate, sodium carbonate, potassium carbonate, sodium hydrogencarbonate, potassium hydrogencarbonate, calcium carbonate, cesium carbonate, sodium fluoride, potassium fluoride, cesium fluoride, sodium methoxide, sodium ethoxide and potassium tert-butoxide.

In the process for preparing a fluorene derivative, the amount of the base (CC) used is in the range of preferably 0.0001 to 100 mol, more preferably 0.01 to 50 mol, particularly preferably 0.10 to 30 mol, based on 1 mol of the fluorene compound (AA). When the amount of the base (CC) used is in the above range, the reaction proceeds in a good yield.

Phosphorus Compound (DD)

The phosphorus compound (DD) used as a catalyst is a phosphorus compound represented by the following formula [66].

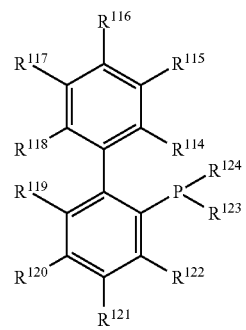

[66]

In the formula [66], $R^{114}$ to $R^{124}$ are each a hydrogen atom, a halogen atom, a hydrocarbon group of 1 to 20 carbon atoms, an oxygen-containing hydrocarbon group of 1 to 20 carbon atoms, a nitrogen-containing hydrocarbon group of 1 to 20 carbon atoms, a silicon-containing hydrocarbon group of 1 to 20 carbon atoms, a halogen-containing hydrocarbon group of 1 to 20 carbon atoms or a sulfur-containing hydrocarbon group of 1 to 20 carbon atoms, and they may be the same as or different from one another. In one or more combinations of adjacent groups, the adjacent groups may be bonded to each other to form a ring.

Examples of the halogen atoms, the hydrocarbon groups of 1 to 20 carbon atoms, the oxygen-containing hydrocarbon groups of 1 to 20 carbon atoms, the nitrogen-containing hydrocarbon groups of 1 to 20 carbon atoms, the silicon-containing hydrocarbon groups of 1 to 20 carbon atoms, the halogen-containing hydrocarbon groups of 1 to 20 carbon atoms and the sulfur-containing hydrocarbon groups of 1 to 20 carbon atoms are the same as those of the halogen atoms (XX3), the hydrocarbon groups (GG) of 1 to 20 carbon atoms, the oxygen-containing hydrocarbon groups (OO) of 1 to 20 carbon atoms, the nitrogen-containing hydrocarbon groups (NN) of 1 to 20 carbon atoms, the silicon-containing hydrocarbon groups (SSI) of 1 to 20 carbon atoms, the halogen-containing hydrocarbon groups (HH) of 1 to 20 carbon atoms and the sulfur-containing hydrocarbon groups (SS3) of 1 to 20 carbon atoms previously described.

The phosphorus compound (DD) is preferably represented by the following formula [99].

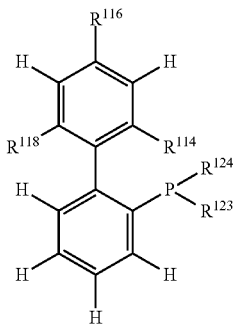

[99]

In the formula [99], $R^{114}$, $R^{116}$, $R^{118}$, $R^{123}$ and $R^{124}$ are each a hydrogen atom, a halogen atom, a hydrocarbon group of 1 to 20 carbon atoms, an oxygen-containing hydrocarbon group of 1 to 20 carbon atoms, a nitrogen-containing hydrocarbon group of 1 to 20 carbon atoms, a silicon-containing hydrocarbon group of 1 to 20 carbon atoms, a halogen-containing hydrocarbon group of 1 to 20 carbon atoms or a sulfur-containing hydrocarbon group of 1 to 20 carbon atoms, and they may be the same as or different from one another. Examples of the halogen atoms, the hydrocarbon groups of 1 to 20 carbon atoms, the oxygen-containing hydrocarbon groups of 1 to 20 carbon atoms, the nitrogen-containing hydrocarbon groups of 1 to 20 carbon atoms, the silicon-containing hydrocarbon groups of 1 to 20 carbon atoms, the halogen-containing hydrocarbon groups of 1 to 20 carbon atoms and the sulfur-containing hydrocarbon groups of 1 to 20 carbon atoms are the same as those of the halogen atoms (XX3), the hydrocarbon groups (GG) of 1 to 20 carbon atoms, the oxygen-containing hydrocarbon groups (OO) of 1 to 20 carbon atoms, the nitrogen-containing hydrocarbon groups (NN) of 1 to 20 carbon atoms, the silicon-containing hydrocarbon groups (SSI) of 1 to 20 carbon atoms, the halogen-containing hydrocarbon groups (HH) of 1 to 20 carbon atoms and the sulfur-containing hydrocarbon groups (SS3) of 1 to 20 carbon atoms previously described.

In the formula [99], it is more preferable that $R^{114}$, $R^{116}$, $R^{118}$, $R^{123}$ and $R^{124}$ are each independently a hydrocarbon group of 1 to 6 carbon atoms, such as methyl group, ethyl group, 1-propyl group, isopropyl group, 1-butyl group, tert-butyl group, 1-hexyl group, cyclopentyl group or cyclohexyl group, an oxygen-containing hydrocarbon group of 1 to 6 carbon atoms, such as methoxy group, ethoxy group, 1-propoxy group, isopropoxy group, 1-butoxy group or tert-butoxy group, or a nitrogen-containing hydrocarbon group of 1 to 6 carbon atoms, such as amino group, methylamino group, dimethylamino group, diethylamino group or dipropylamino group, and it is particularly preferable that they are each independently a methoxy group, an isopropyl group, a tert-butyl group or a cyclohexyl group.

In the process for preparing a fluorene derivative by allowing the fluorene compound (AA) to react with the boron compound (BB) in the presence of the base (CC), the fluorene derivative can be obtained in a high yield by carrying out the reaction in a water-containing solvent (FF) using the phosphorus compound (DD) and the later-described palladium compound (EE) as catalysts.

In the process for preparing a fluorene derivative, the amount of the phosphorus compound (DD) used is in the range of preferably 0.00001 to 100 mol, more preferably 0.0001 to 50 mol, particularly preferably 0.001 to 30 mol, based on 1 mol of the fluorene compound (AA). When the amount of the phosphorus compound (DD) used is in the above range, the reaction proceeds rapidly.

Palladium Compound (EE)

Examples of the palladium compounds (EE) used as catalysts include divalent palladium compounds, such as bis(acetonitrile)dichloropalladium(II), bis(benzonitrile)dicloropalladium(II), di-μ-chlorobis[(μ-allyl)palladium(II)], trans-dichlorobis(triphenylphosphine)palladium(II), dichloro(μ-dichloroocta-1,5-diene)palladium(II), (bicycle[2.2.1]hepta-2,5-diene)dichlopalladium(II), dichloro(1,5-cyclooctadiene)palladium(II), (2,2'-bipyridine)dichloropalladium(II), palladium(II) acetate, palladium(II) chloride, palladium(II) bromide, palladium(II) iodide, palladium(II) cyanide, palladium(II) acetylacetonate, palladium(II) hexafluoroacetylacetonate, palladium(II) nitrate, 1,4-bis(diphenylphosphino)butane-dichloropalladium(II), [1,2-bis(diphenylphosphino)ethane]dichloropalladium(II), (1,3-bis(diphenylphosphino)propane)palladium(II) chloride, [1,1'-bis(diphenylphosphino)ferrocene]dichloropalladium(II), activated carbon palladium and bis(triphenylphosphine)palladium(II) chloride; and zero-valent palladium compounds, such as tris(dibenzylideneacetone)dipalladium(0), tetrakis(triphenylphosphine)palladium(0), bis[1,2-bis(diphenylphosphino)ethane]palladium(0) and bis(3,5,3',5'-dimethoxybenzylideneacetone)palladium(0). The valence of palladium of the palladium compound (EE) is preferably a valence of 2, and palladium(II) acetate or bis(acetonitrile)dichloropalladium(II) is more preferably used.

In the process for preparing a fluorene derivative by allowing the fluorene compound (AA) to react with the boron compound (BB) in the presence of the base (CC), the fluorene derivative can be obtained in a high yield by carrying out the reaction in a water-containing solvent (FF) using the phosphorus compound (DD) and the palladium compound (EE) as catalysts.

In the process for preparing a fluorene derivative, the amount of the palladium compound (EE) used is in the range of preferably 0.00001 to 50 mol, more preferably 0.0001 to 25 mol, particularly preferably 0.001 to 15 mol, based on 1 mol of the fluorene compound (AA). When the amount of the palladium compound (EE) used is in the above range, the reaction proceeds rapidly.

Water-Containing Solvent (FF)

The water-containing solvent (FF) is not specifically restricted as long as it is a solvent containing water as an essential component.

Examples of solvents other than water include aliphatic hydrocarbons, such as pentane, hexane, heptane, octane, decane and dodecane; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; polar solvents, such as acetone, methyl acetate, ethyl acetate, dimethylformamide, 1,3-dimethyl-2-imidazolidinone and dimethyl sulfoxide; polar solvents, such as methanol, ethanol, propanol, isopropanol, butanol and tert-butanol; and ether-based solvents, such as diethyl ether, tert-butyl methyl ether, tetrahydrofuran, dioxane and cyclopentyl methyl ether.

The water-containing solvent (FF) is preferably constituted of water and an organic compound containing an oxygen atom.

Examples of the organic compounds containing an oxygen atom include acetone, methyl acetate, ethyl acetate, dimethylformamide, 1,3-dimethyl-2-imidazolidinone, dimethyl sulfoxide, methanol, ethanol, propanol, isopropanol, butanol, tert-butanol, tetrahydrofuran, dioxane and cyclopentyl methyl ether.

The solvent is more preferably a solvent which does not undergo decomposition during the reaction. Specifically, there can be mentioned acetone, dimethylformamide, 1,3-dimethyl-2-imidazolidinone, dimethyl sulfoxide, methanol, ethanol, propanol, isopropanol, butanol, tert-butanol, tetrahydrofuran and cyclopentyl methyl ether. Particularly preferable are diethyl ether, tert-butyl methyl ether, tetrahydrofuran, dioxane and cyclopentyl methyl ether.

The content of water (water/solvent other than water, in terms of volume) in the water-containing solvent (FF) is preferably not less than 0.01, more preferably not less than 0.02, particularly preferably not less than 0.05.

The ratio of water to the palladium compound (EE) (water/palladium compound (EE), in terms of mol) is preferably not less than 50 times, more preferably not less than 100 times, still more preferably not less than 200 times, particularly preferably not less than 400 times.

It is particularly preferable that the content of water (water/solvent other than water, in terms of volume) in the water-containing solvent (FF) is not less than 0.05 and the ratio of water to the palladium compound (EE) (water/palladium compound (EE), in terms of mol) is not less than 400 times. The upper limit of the content of water in the water-containing solvent (FF) is not specifically restricted, but the water-containing solvent (FF) must always contain a solvent other than water because the reaction proceeds in the solvent. Therefore, the upper limit of the content of water (water/solvent other than water, in terms of volume) is, for example, not more than 20.

By allowing the fluorene compound (AA) to react with the boron compound (BB) in such a water-containing solvent (FF) in the presence of the base (CC) using the phosphorus compound (DD) and the palladium compound (EE) as catalysts, the fluorene derivative can be obtained in a high yield.

Process for Preparing Fluorene Derivative

The process for preparing a fluorene derivative is a process comprising allowing the fluorene compound (AA) to react with the boron compound (BB) in the presence of the base (CC) to prepare a fluorene derivative wherein a halogen atom and/or a sulfur-containing hydrocarbon group of the substituents of the fluorene compound (AA) has been converted into the substituent $R^{13}$ of the boron compound (BB), and is characterized by carrying out the reaction in the water-containing solvent (FF) using the phosphorus compound (DD) and the palladium compound (EE) as catalysts.

The temperature of the reaction of the fluorene compound (AA) with the boron compound (BB) is in the range of preferably −70 to 150° C., more preferably −40 to 100° C., particularly preferably −20 to 70° C. The reaction temperature is preferably a temperature at which industrialization is possible. The reaction pressure is in the range of preferably 0.01 to 10 MPa, more preferably 0.02 to 5 MPa, particularly preferably 0.05 to 2 MPa. The reaction pressure is preferably a pressure at which industrialization is possible. The reaction time is in the range of preferably 0.1 to 300 hours, more preferably 0.1 to 100 hours, particularly preferably 0.1 to 72 hours. The reaction time is preferably a time for which industrialization is possible.

When the reaction is carried out, the order of addition of the components (AA) to (FF) to the reaction container is arbitrarily determined, but it is preferable to add the components in, for example, the following order.

(i) The components (AA) to (EE) are added, then a solvent other than water is added, and finally water is added.

(ii) A solvent other than water is added, then the components (AA) to (EE) are added, and finally water is added.

(iii) The component (AA), the component (BB), the component (CC), the component (DD), the component (EE) and the component (FF) are added in this order.

(iv) The component (FF) is added, and then the components (AA) to (EE) are added.

(v) The components (AA) to (EE) are added, and then the component (FF) is added.

(vi) The component (AA), the component (CC), the component (DD), the component (EE) and a solvent other than water are added, then water is added, and finally the component (BB) is added.

(vii) The component (BB), the component (CC), the component (DD), the component (EE) and a solvent other than water are added, then water is added, and finally the component (AA) is added.

(viii) The component (CC) to which water has been added in advance, the component (AA), the component (BB), the component (DD), the component (EE) and a solvent other than water are added.

(ix) The component (AA), the component (BB), the component (DD), the component (EE) and a solvent other than water are added, and then the component (CC) to which water has been added in advance is added.

In the present invention, the fluorene derivative is obtained by allowing the fluorene compound (AA) to react with the boron compound (BB) in the water-containing solvent (FF) in the presence of the base (CC) using the phosphorus compound (DD) and the palladium compound (EE) as catalysts, as described above. That is to say, the fluorene derivative is a fluorene derivative wherein a halogen atom and/or a sulfur-containing hydrocarbon group of the substituents of the fluorene compound (AA) has been converted into the substituent $R^{13}$ of the boron compound (BB).

Examples of the fluorene derivatives obtained by the above preparation process are given below.

That is to say, examples of the fluorene derivatives obtained by the above preparation process include 2,7-di(o-tolyl)-3,6-di-tert-butylfluorene, 2,7-di(p-chlorophenyl)-3,6-di-tert-butylfluorene, 2,7-diphenyl-3,6-di-tert-butylfluorene, 2,7-di(p-fluorophenyl)-3,6-di-tert-butylfluorene, 2,7-di(p-trifluoromethylphenyl)-3,6-di-tert-butylfluorene, 2,7-di(p-methoxyphenyl)-3,6-di-tert-butylfluorene, 2,7-di(o-ethylphenyl)-3,6-di-tert-butylfluorene, 2,7-di(biphenyl-4-yl)-3,6-di-tert-butylfluorene, 2,7-bis(2,4-dimethylphenyl)-3,6-di-tert-butylfluorene, 2,7-bis(4-chloro-2-methylphenyl)-3,6-di-tert-butylfluorene, 2,7-di(o-tolyl)-fluorene, 2,7-di(p-fluorophenyl)-fluorene, 2,7-di(p-trifluoromethylphenyl)-fluorene, 2,7-di(p-methoxyphenyl)-fluorene, 2,7-di(o-ethylphenyl)-fluorene, 2,7-di(biphenyl-4-yl)-fluorene, 2,7-bis(2,4-dimethylphenyl)-fluorene, 2,7-bis(4-chloro-2-methylphenyl)-fluorene, 2-(o-tolyl)-3,6-di-tert-butylfluorene, 2-(p-fluorophenyl)-3,6-di-tert-butylfluorene, 2-(p-trifluoromethylphenyl)-3,6-di-tert-butylfluorene, 2-(p-methoxyphenyl)-3,6-di-tert-butylfluorene, 2-(o-ethylphenyl)-3,6-di-tert-butylfluorene, 2-(biphenyl-4-yl)-3,6-di-tert-butylfluorene, 2-(2,4-dimethylphenyl)-3,6-di-tertbutylfluorene, 2-(4-chloro-2-methylphenyl)-3,6-di-tert-butylfluorene, 2-(o-tolyl)-fluorene, 2-(p-fluorophenyl)-fluorene, 2-(p-trifluoromethylphenyl)-fluorene, 2-(p-methoxyphenyl)-fluorene, 2-(o-ethylphenyl)-fluorene, 2-(biphenyl-4-yl)-fluorene, 2-(2,4-dimethylphenyl)-fluorene, 2-(4-chloro-2-methylphenyl)-fluorene, 1-(o-tolyl)-fluorene, 2-(p-fluorophenyl)-fluorene, 3-(p-trifluoromethylphenyl)-fluorene, 4-(p-methoxyphenyl)-fluorene, 1-(o-ethylphenyl)-fluorene, 2-(biphenyl-4-yl)-fluorene, 3-(2,4-dimethylphenyl)-fluorene, 4-(4-chloro-2-methylphenyl)-fluorene, 2,7-di(o-tolyl)-3,6-di-tert-butylfluorenone, 2,7-di(p-fluorophenyl)-3,6-di-tert-butylfluorenone, 2,7-di(p-trifluoromethylphenyl)-3,6-di-tert-butylfluorenone, 2,7-di(p-methoxyphenyl)-3,6-di-tert-butylfluorenone, 2,7-di(o-ethylphenyl)-3,6-di-tert-butylfluorenone, 2,7-di(biphenyl-4-yl)-3,6-di-tert-butylfluorenone, 2,7-bis(2,4-dimethylphenyl)-3,6-di-tert-butylfluorenone, 2,7-bis(4-chloro-2-methylphenyl)-3,6-di-tert-butylfluorenone, 2,7-di(o-tolyl)-fluorenone, 2,7-di(p-fluorophenyl)-fluorenone, 2,7-di(p-trifluoromethylphenyl)-fluorenone, 2,7-di(p-methoxyphenyl)-fluorenone, 2,7-di(o-ethylphenyl)-fluorenone, 2,7-di(biphenyl-4-yl)-fluorenone, 2,7-bis(2,4-dimethylphenyl)-fluorenone, 2,7-bis(4-chloro-2-methylphenyl)-fluorenone, 2-(o-tolyl)-3,6-di-tert-butylfluorenone, 2-(p-fluorophenyl)-3,6-di-tert-butylfluorenone, 2-(p-trifluoromethylphenyl)-3,6-di-tert-butylfluorenone, 2-(p-methoxyphenyl)-3,6-di-tert-butylfluorenone, 2-(o-ethylphenyl)-3,6-di-tert-butylfluorenone, 2-(biphenyl-4-yl)-3,6-di-tert-butylfluorenone, 2-(2,4-dimethylphenyl)-3,6-di-tert-butylfluorenone, 2-(4-chloro-2-methylphenyl)-3,6-di-tert-butylfluorenone, 2-(o-tolyl)-fluorenone, 2-(p-fluorophenyl)-fluorenone, 2-(p-trifluoromethylphenyl)-fluorenone, 2-(p-methoxyphenyl)-fluorenone, 2-(o-ethylphenyl)-fluorenone, 2-(biphenyl-4-yl)-fluorenone, 2-(2,4-dimethylphenyl)-fluorenone, 2-(4-chloro-2-methylphenyl)-fluorenone, 1-(o-tolyl)-fluorenone, 2-(p-fluorophenyl)-fluorenone, 3-(p-trifluoromethylphenyl)-fluorenone, 4-(p-methoxyphenyl)-fluorenone, 1-(o-ethylphenyl)-fluorenone, 2-(biphenyl-4-yl)-fluorenone, 3-(2,4-dimethylphenyl)-fluorenone and 4-(4-chloro-2-methylphenyl)-fluorenone.

The fluorene derivative (ligand) for use in the preparation of the transition metal compound (a1-1) and the transition metal compound (a1-2) can be prepared by the use of the fluorene compound represented by the formula [77] and the boron compound having a substituent represented by the formula [88]. Here, $R^{103}$ and $R^{106}$ in the formula [77] correspond to $R^{6a}$ and $R^{7a}$ in the formula [A1-1] or $R^{6b}$ and $R^{7b}$ in the formula [A1-2], and the substituent represented by the formula [88] corresponds to a phenyl group having $R^{1a}$ to $R^{5e}$ and a phenyl group having $R^{8a}$ to $R^{12a}$ in the formula [A1-1], or a phenyl group having $R^{1b}$ to $R^{5b}$ and a phenyl group having $R^{8b}$ to $R^{12b}$ in the formula [A1-2].

By the use of the olefin polymerization catalyst comprising the component (A) satisfying the aforesaid conditions and the later-described component (B), the effect of the present invention can be achieved.

In other words, the transition metal compound component (A) (mixed catalyst) comprises two or more kinds of the transition metal compounds (a) represented by the formula [A1]. According to such a transition metal compound component (A), an α-olefin can be polymerized with a high polymerization activity even at a temperature of not lower than room temperature, particularly not lower than 40° C. Moreover, the resulting polymer can be improved in the molecular weight distribution and in the melting point and the intrinsic viscosity with a good balance. The expression "high polymerization activity" means that an activity of such a level that industrialization is possible is exhibited, and means an activity of usually 1.0 to 1000 (kg/mmol-cat-hr).

It is particularly preferable that in the transition metal compound component (A) (mixed catalyst), at least one kind (one or more kinds) of the transition metal compounds (a) is a transition metal compound (a1-1) represented by the formula [A1-1], or in the transition metal compound component (A) (mixed catalyst), at least one kind (one or more kinds) of the transition metal compounds (a) is a transition metal compound (a1-2) represented by the formula [A1-2]. When the transition metal compound (a1-1) is used, an α-olefin polymer having a high molecular weight and a high intrinsic viscosity can be prepared, and when the transition metal compound (a1-2) is used, an α-olefin polymer having a high melting point can be prepared. In this case, if the transition metal compound (a1-2) is a transition metal compound wherein at least one of $R^{3b}$ and $R^{10b}$ in the formula [A1-2] is selected from a halogen atom and a halogen-containing hydrocarbon group or a transition metal compound wherein at least one of $R^{15b}$ and $R^{19b}$ in the formula [A1-2-1] is selected from a halogen atom and a halogen-containing hydrocarbon group, an α-olefin polymer having a higher melting point can be prepared.

Moreover, it is desirable that the transition metal compound component (A) (mixed catalyst) contains at least one kind (one or more kinds) of the transition metal compound (a1-1) represented by the formula [A1-1] and at least one kind (one or more kinds) of the transition metal compound (a1-2) represented by the formula [A1-2]. According to such a transition metal compound component (A) (mixed catalyst), the molecular weight distribution can be adjusted to a more preferred range.

Olefin Polymerization Catalyst

Next, a preferred embodiment of use of the transition metal compound component (A) for the olefin polymerization catalyst in the present invention is described.

When the crosslinked metallocene compound is used for the olefin polymerization catalyst, the catalyst comprises the transition metal compound component (A) and an organometallic compound component (B). The organometallic compound component (B) comprises one or more kinds of organometallic compounds (b) selected from the following compounds (b-1), (b-2) and (b-3):

(b-1) an organoaluminum oxy-compound,
(b-2) a compound which reacts with the transition metal compound (a) to form an ion pair,
(b-3) an organoaluminum compound.

The compounds (b-1), (b-2) and (b-3) may be respectively used singly, or may be respectively used in combination of two or more kinds. The olefin polymerization catalyst further comprises a particulate carrier (C) and an organic compound component (D), when needed. The components are described below in detail.

Organoaluminum Oxy-Compound (b-1)

As the organoaluminum oxy-compound (b-1) for use in the present invention, hitherto publicly known aluminoxane can be used as it is. Specifically, there can be mentioned a compound represented by the following formula [2]:

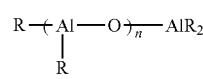

[2]

and/or the following formula [3]:

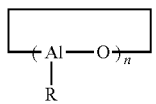

[3]

In the formulas [2] and [3], R is a hydrocarbon group of 1 to 10 carbon atoms, and n is an integer of 2 or more. In particular, a compound of the above formula wherein R is a methyl group and n is 3 or more, preferably 10 or more, is preferably used. In such aluminoxanes, some quantity of an organoaluminum compound may be contained. A characteristic property of the high-temperature solution polymerization of the present invention is that such a benzene-insoluble organoaluminum oxy-compound as given as an example in Japanese Patent Laid-Open Publication No. 78687/1990 is also applicable. Moreover, an organoaluminum oxy-compound described in Japanese Patent Laid-Open Publication No. 167305/1990, aluminoxane having two or more kinds of alkyl groups, which is described in Japanese Patent Laid-Open Publication No. 24701/1990 and Japanese Patent Laid-Open Publication No. 103407/1991, etc. are also preferably employable. The "benzene-insoluble" organoaluminum oxy-compound used in the high-temperature solution polymerization of the present invention means an organoaluminum oxy-compound in which an Al component that is soluble in benzene at 60° C. is contained in an amount of usually not more than 10%, preferably not more than 5%, particularly preferably not more than 2%, in terms of Al atom and which is insoluble or slightly soluble in benzene.

As the organoaluminum oxy-compound for use in the present invention, there can be also mentioned, for example, such modified methylaluminoxane as represented by the following formula [4]:

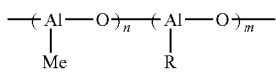

[4]

wherein R is a hydrocarbon group of 1 to 10 carbon atoms, and m and n are each an integer of 2 or more.

This modified methylaluminoxane is prepared by the use of trimethylaluminum and alkylaluminum other than trimethylaluminum. Such a compound of the formula [4] is generally called MMAO. Such MMAO can be prepared by processes described in U.S. Pat. No. 4,960,878 and U.S. Pat. No. 5,041,584. Compounds of the above formula prepared by the use of trimethylaluminum and triisobutylaluminum and having an isobutyl group as R are commercially produced by Tosoh Finechem Corporation under the names of MMAO and TMAO. Such MMAO is aluminoxane having been improved in solubility in various solvents and storage stability, and is specifically a compound which is soluble in aliphatic hydrocarbons and alicyclic hydrocarbons differently from compounds which are insoluble or slightly soluble in benzene, such as the compound of the formula [2] or [3].

As the organoaluminum oxy-compound for use in the present invention, there can be also mentioned an organoaluminum oxy-compound containing boron, which is represented by the following formula [5]:

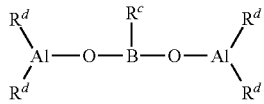

[5]

wherein $R^c$ is a hydrocarbon group of 1 to 10 carbon atoms, and each $R^d$ may be the same or different and is a hydrogen atom, a halogen atom or a hydrocarbon group of 1 to 10 carbon atoms.

Such organoaluminum oxy-compounds (b-1) as above may be used singly, or may be used as a mixture of two or more kinds.

Compound (b-2) which Reacts with Transition Metal Compound (a) to Form Ion Pair

Examples of the compounds (b-2) which react with the transition metal compound (a) to form an ion pair (sometimes referred to as "ionic compounds" hereinafter) include Lewis acid, an ionic compound, a borane compound and a carborane compound which are described in Japanese Patent Laid-Open Publication No. 501950/1989, Japanese Patent Laid-Open Publication No. 502036/1989, Japanese Patent Laid-Open Publication No. 179005/1991, Japanese Patent Laid-Open Publication No. 179006/1991, Japanese Patent Laid-Open Publication No. 207703/1991, Japanese Patent Laid-Open Publication No. 207704/1991, U.S. Pat. No. 5,321,106, etc. Moreover, a heteropoly compound and an isopoly compound are also included.

In the present invention, an ionic compound preferably adopted is a compound represented by the following formula [6].

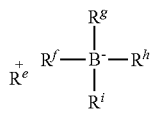

[6]

In the above formula, $R^{e+}$ is $H^+$, carbenium cation, oxonium cation, ammonium cation, phosphonium cation, cycloheptyltrienyl cation, ferrocenium cation having transition metal, or the like. $R^f$ to $R^i$ may be the same as or different from one another and are each an organic group, preferably an aryl group.

Examples of the carbenium cations include tri-substituted carbenium cations, such as triphenylcarbenium cation, tris(methylphenyl)carbenium cation and tris(dimethylphenyl)carbenium cation.

Examples of the ammonium cations include trialkylammonium cations, such as trimethylammonium cation, triethylammonium cation, tri(n-propyl)ammonium cation, triisopropylammonium cation, tri(n-butyl)ammonium cation and triisobutylammonium cation; N,N-dialkylanilinium cations, such as N,N-dimethylanilinium cation, N,N-diethylanilinium cation and N,N-2,4,6-pentamethylanilinium cation; and dialkylammonium cations, such as diisopropylammonium cation and dicyclohexylammonium cation.

Examples of the phosphonium cations include triarylphosphonium cations, such as triphenylphosphonium cation, tris(methylphenyl)phosphonium cation and tris(dimethylpheny) phosphonium cation.

Of the above cations, carbenium cation, ammonium cation or the like is preferable as $R^{e+}$, and triphenylcarbenium cation, N,N-dimethylanilinium cation or N,N-diethylanilinium cation is particularly preferable.

Examples of carbenium salts include triphenylcarbenium tetraphenylborate, triphenylcarbenium tetrakis(pentafluorophenyl)borate, triphenylcarbenium tetrakis(3,5-ditrifluoromethylphenyl)borate, tris(4-methylphenyl)carbenium tetrakis(pentafluorophenyl)borate and tris(3,5-dimethylphenyl)carbenium tetrakis(pentafluorophenyl)borate.

As ammonium salts, trialkyl-substituted ammonium salts, N,N-dialkylanilinium salts, dialkylammonium salts, etc. can be mentioned.

Examples of the trialkyl-substituted ammonium salts include triethylammonium tetraphenylborate, tripropylammonium tetraphenylborate, tri(n-butyl)ammonium tetraphenylborate, trimethylammonium tetrakis(p-tolyl)borate, trimethylammonium tetrakis(o-tolyl)borate, tri(n-butyl)ammonium tetrakis(pentafluorophenyl)borate, triethylammonium tetrakis(pentafluorophenyl)borate, tripropylammonium tetrakis(pentafluorophenyl)borate, tripropylammonium tetrakis(2,4-dimethylphenyl)borate, tri(n-butyl)ammonium tetrakis(3,5-dimethylphenyl)borate, tri(n-butyl)ammonium tetrakis(4-trifluoromethylphenyl)borate, tri(n-butyl)ammonium tetrakis(3,5-ditrifluoromethylphenyl)borate, tri(n-butyl)ammonium tetrakis(o-tolyl)borate, dioctadecylmethylammonium tetraphenylborate, dioctadecylmethylammonium tetrakis(p-tolyl)borate, dioctadecylmethylammonium tetrakis(o-tolyl)borate, dioctadecylmethylammonium tetrakis(pentafluorophenyl)borate, dioctadecylmethylammonium tetrakis(2,4-dimethylphenyl)borate, dioctadecylmethylammonium tetrakis(3,5-dimethylphenyl)borate, dioctadecylmethylammonium tetrakis(4-trifluoromethylphenyl)borate, dioctadecylmethylammonium tetrakis(3,5-ditrifluoromethylphenyl)borate and dioctadecylmethylammonium.

Examples of the N,N-dialkylanilinium salts include N,N-dimethylanilinium tetraphenylborate, N,N-dimethylanilinium tetrakis(pentafluorophenyl)borate, N,N-dimethylanilinium tetrakis(3,5-ditrifluoromethylphenyl)borate, N,N-diethylanilinium tetraphenylborate, N,N-diethylanilinium tetrakis(pentafluorophenyl)borate, N,N-diethylanilinium tetrakis(3,5-ditrifluoromethylphenyl)borate, N,N-2,4,6-pentamethylanilinium tetraphenylborate and N,N-2,4,6-pentamethylanilinium tetrakis(pentafluorophenyl)borate.

Examples of the dialkylammonium salts include di(1-propyl)ammonium tetrakis(pentafluorophenyl)borate and dicyclohexylammonium tetraphenylborate.

In addition, ionic compounds disclosed by the present applicant (Japanese Patent Laid-Open Publication No. 51676/2004) can be also used without any restriction.

Such ionic compounds (b-2) as above may be used singly, or may be used as a mixture of two or more kinds.

Organoaluminum Compound (b-3)

The organoaluminum compound (b-3) for forming the olefin polymerization catalyst is, for example, an organoaluminum compound represented by the following formula [7] or an alkylated complex compound of a group 1 metal and aluminum, which is represented by the following formula [8].

An organoaluminum compound represented by the formula [7]:

$$R^a{}_m Al(OR^b)_n H_p X_q \qquad [7]$$

wherein $R^a$ and $R^b$ may be the same as or different from each other and are each a hydrocarbon group of 1 to 15 carbon atoms, preferably 1 to 4 carbon atoms, X is a halogen atom, and m, n, p and q are numbers satisfying the conditions of $0<m\leq3$, $0\leq n<3$, $0\leq p<3$, $0\leq q-3$ and $m+n+p+q=3$.

Examples of such compounds include tri-n-alkylaluminums, such as trimethylaluminum, triethylaluminum, tri-n-butylaluminum, trihexylaluminum and trioctylaluminum; branched chain trialkylaluminums, such as triisopropylaluminum, triisobutylaluminum, tri-sec-butylaluminum, tri-tert-butylaluminum, tri-2-methylbutylaluminum, tri-3-methylhexylaluminum and tri-2-ethylhexylaluminum; tricycloalkylaluminums, such as tricyclohexylaluminum and tricyclooctylaluminum; triarylaluminums, such as triphenylaluminum and tritolylaluminum; dialkylaluminum hydrides, such as diisopropylaluminum hydride and diisobutylaluminum hydride; alkenylaluminums such as isoprenylaluminum represented by the formula $(i-C_4H_9)_x Al_y(C_5H_{10})_z$ (wherein x, y and z are each a positive number, and $z\leq 2x$) or the like; alkylaluminum alkoxides, such as isobutylaluminum methoxide and isobutylaluminum ethoxide; dialkylaluminum alkoxides, such as dimethylaluminum methoxide, diethylaluminum ethoxide and dibutylaluminum butoxide; alkylaluminum sesquialkoxides, such as ethylaluminum sesquiethoxide and butylaluminum sesquibutoxide; partially alkoxylated alkylaluminums having an average composition represented by the formula Ra2.5Al (ORb)0.5 or the like; alkylaluminum aryloxides, such as diethylaluminum phenoxide and diethylaluminum(2,6-di-t-butyl-4-methylphenoxide); dialkylaluminum halides, such as dimethylaluminum chloride, diethylaluminum chloride, dibutylaluminum chloride, diethylaluminum bromide and diisobutylaluminum chloride; alkylaluminum sesquihalides, such as ethylaluminum sesquichloride, butylaluminum sesquichloride and ethylaluminum sesquibromide; partially halogenated alkylaluminums, e.g., alkylaluminum dihalides such as ethylaluminum dichloride; dialkylaluminum hydrides, such as diethylaluminum hydride and dibutylaluminum hydride; other partially hydrogenated alkylaluminums, e.g., alkylaluminum dihydrides, such as ethylaluminum dihydride and propylaluminum dihydride; and partially alkoxylated and halogenated alkylaluminums, such as ethylaluminum ethoxychloride, butylaluminum butoxychloride and ethylaluminum ethoxybromide.

An alkylated complex compound of a periodic table group 1 metal and aluminum, which is represented by the formula [8]:

$$M^2 AlR^a{}_4 \qquad [8]$$

wherein $M^2$ is Li, Na or K, and $R^a$ is a hydrocarbon group of 1 to 15 carbon atoms, preferably 1 to 4 carbon atoms.

Such a compound is, for example, $LiAl(C_2H_5)_4$ or $LiAl(C_7H_{15})_4$.

Moreover, a compound analogous to the compound represented by the formula [8] is also employable, and for example, an organoaluminum compound wherein two or more aluminum compounds are bonded through a nitrogen atom is employable. An example of such a compound is $(C_2H_5)_2 AlN(C_2H^5)Al(C_2H_5)_2$.

As the organoaluminum compound (b-3), trimethylaluminum or triisobutylaluminum is preferably used from the viewpoint of ease of obtaining.

Such organoaluminum compounds (b-3) as above may be used singly, or may be used as a mixture of two or more kinds.

The olefin polymerization catalyst for use in the present invention may contain a carrier (C) when needed, in addition to the transition metal compound component (A) and the organometallic compound component (B).

Carrier (C)

The carrier (C) for use in the present invention is an inorganic or organic compound and is a granular or finely particulate solid. As the inorganic compound, porous oxide, inorganic chloride, clay, clay mineral or an ion-exchange layered compound is preferable.

As the porous oxide, $SiO_2$, $Al_2O_3$, MgO, ZrO, $TiO_2$, $B_2O_3$, CaO, ZnO, BaO, $ThO_2$ or the like is employable. A composite or a mixture containing these oxides is also employable. For example, natural or synthetic zeolite, $SiO_2$—MgO, $SiO_2$—$Al_2O_3$, $SiO_2$—$TiO_2$, $SiO_2$—$V_2O_5$, $SiO_2$—$Cr_2O_3$, $SiO_2$—$TiO_2$—MgO, etc. are employable. Of these, porous oxide containing $SiO_2$ and/or $Al_2O_3$ as a main component is preferable. Such porous oxides differ from one another in their properties according to the type and the preparation process. However, the carrier that is preferably used in the present invention desirably has a particle diameter of 10 to 300 μm, preferably 20 to 200 μm, a specific surface area of 50 to 1000 $m^2/g$, preferably 100 to 700 $m^2/g$, and a pore volume of 0.3 to 3.0 $cm^3/g$. Such a carrier is used after it is calcined at a temperature of 100 to 1000° C., preferably 150 to 700° C., when needed.

As the inorganic chloride, $MgCl_2$, $MgBr_2$, $MnCl_2$, $MnBr_2$ or the like is used. The inorganic chloride may be used as it is, or may be used after it is pulverized by a ball mill or an oscillating mill. Also employable is a substance in the form of fine particles obtained by dissolving the inorganic chloride in a solvent such as an alcohol and then precipitating fine particles from the solution using a precipitant.

The clay for use in the present invention usually comprises clay mineral that is a main component. The ion-exchange layered compound for use in the present invention is a compound having a crystal structure wherein faces made by ionic bonding or the like are laid one upon another in parallel with a weak bonding force, and ions contained are exchangeable. Most of clay minerals are ion-exchange layered compounds. These clay, clay mineral and ion-exchange layered compound are not limited to natural ones, and artificial synthetic ones are also employable. As the clay, the clay mineral or the ion-exchange layered compound, clay, clay mineral or an ionic crystalline compound having a layered crystal structure, such as hexagonal close packing type, antimony type, CdCl2 type or CdI2 type, can be mentioned. Examples of such clays and clay minerals include kaolin, bentonite, Kibushi clay, gairome clay, allophane, hisingerite, pyrophyllite, mica group, montmorillonite group, vermiculite, chlorite group, palygorskite, kaolinite, nacrite, dickite and halloysite. Examples of the ion-exchange layered compounds include crystalline acid salts of polyvalent metals, such as α-Zr$(HAsO_4)_2.H_2O$, α-Zr$(HPO_4)_2$, α-Zr$(KPO_4)_2.3H_2O$, α-Ti$(HPO_4)_2$, α-Ti$(HAsO_4)_2.H_2O$, α-Sn$(HPO_4)_2.H_2O$, γ-Zr$(HPO_4)_2$, γ-Ti$(HPO_4)_2$ and γ-Ti$(NH_4PO_4)_2.H_2O$. It is also preferable to subject the clay and the clay mineral for use in the present invention to chemical treatment. As the chemical treatment, surface treatment to remove impurities adhering to the surface, treatment having influence on the crystal structure of clay, or the like can be used. Examples of such chemical treatments include acid treatment, alkali treatment, salts treatment and organic substance treatment.

The ion-exchange layered compound for use in the present invention may be a layered compound which is in such a state that spaces between layers are enlarged by exchanging exchangeable ions between layers for different large bulky ions utilizing ion exchange properties. Such a bulky ion plays a pillar-like role to support the layer structure, and is usually called a pillar. Introduction of another substance into the space between layers is referred to as "intercalation". Examples of guest compounds to be intercalated include cationic inorganic compounds, such as $TiCl4$ and $ZrCl4$, metallic alkoxides, such as $Ti(OR)_4$, $Zr(OR)_4$, $PO(OR)_3$ and $B(OR)_3$ (R is a hydrocarbon group or the like), and metallic hydroxide ions, such as $[Al_{13}O_4(OH)_{24}]^{7+}$, $[Zr_4(OH)_{14}]^{2+}$ and $[Fe_3O(OCOCH_3)_6]^+$. These compounds are used singly or in combination of two or more kinds. When such a compound is intercalated, a polymerization product obtained by hydrolyzing metallic alkoxide, such as $Si(OR)_4$, $Al(OR)_3$ or $Ge(OR)_4$ (R is a hydrocarbon group or the like), or a colloidal inorganic compound, such as $SiO_2$, may be allowed to coexist. The pillar is, for example, an oxide formed by carrying out thermal dehydration after intercalation of the metallic hydroxide ions between layers. Of the above inorganic compounds, preferable are clays and clay minerals, and particularly preferable are montmorillonite, vermiculite, pectolite, taeniolite and synthetic mica.

As the organic compound, a granular or finely particulate solid having a particle diameter of 10 to 300 μm can be mentioned. Examples of such solids include (co)polymers formed by using, as a main component, an a-olefin of 2 to 14 carbon atoms, such as ethylene, propylene, 1-butene or 4-methyl-1-pentene, (co)polymers formed by using, as a main component, vinylcyclohexane or styrene, and modification products thereof.

Such carriers (C) as above may be used singly, or may be used as a mixture of two or more kinds.

The olefin polymerization catalyst for use in the present invention may contain an organic compound component (D), in addition to the transition metal compound component (A), the organometallic compound component (B) and the carrier (C) that is used when needed.

Organic Compound Component (D)

In the present invention, the organic compound component (D) is used when needed, for the purpose of improving polymerization performance and properties of the resulting polymer. Examples of such organic compounds include alcohols, phenolic compounds, carboxylic acids, phosphoric acids and sulfonic acid salts, but the organic compounds employable are not limited to these compounds.

Such organic compound components (D) as above may be used singly, or may be used as a mixture of two or more kinds.

In the polymerization, the way of use and the order of addition of the above components are arbitrarily selected, and such methods as below can be mentioned.

(1) A method of adding the transition metal compound (a) alone to the polymerizer.

(2) A method of adding the transition metal compound (a) and the organometallic compound (b) to the polymerizer in an arbitrary order.

(3) A method of adding a catalyst component in which the transition metal compound (a) has been supported on the carrier (C), and the organometallic compound (b) to the polymerizer in an arbitrary order.

(4) A method of adding a catalyst component in which the organometallic compound (b) has been supported on the carrier (C), and the transition metal compound (a) to the polymerizer in an arbitrary order.

(5) A method of adding a catalyst component in which the transition metal compound (a) and the organometallic compound (b) have been supported on the carrier (C) to the polymerizer.

In the above methods (1) to (5), at least two or more of the catalyst components may be contacted with each other in advance.

In the methods (4) and (5) wherein the organometallic compound (b) has been supported, the organometallic compound (b) that is not supported may be added in an arbitrary order, when needed. In this case, these organometallic compounds (b) may be the same as or different from each other.

On the solid catalyst component in which the transition metal compound (a) has been supported on the component (C) and on the solid catalyst component in which the transition metal compound (a) and the organometallic compound (b) have been supported on the component (C), an olefin may have been prepolymerized, and on the thus prepolymerized solid catalyst components, a catalyst component may have been further supported.

In the preparation process of the present invention, it is also preferable to use the transition metal compound (a1-1) and the transition metal compound (a1-2) in the supported form.

The quantity ratio between the transition metal compound (a1-1) and the transition metal compound (a1-2) used can be arbitrarily determined from the molecular weight and the melting point of an olefin polymer to be prepared. Specifically, the molar ratio (charge molar ratio) of the transition metal compound (a1-1) to the transition metal compound (a1-2) is preferably $0.05 \leqq (a1-1)/(a1-2) \leqq 20$, more preferably $0.10 \leqq (a1-1)/(a1-2) \leqq 20$, particularly preferably $0.1 \leqq (a1-1)/(a1-2) \leqq 10$. The reason why the molar ratio is preferably in a given range is that the molecular weight distribution of the olefin polymer is narrowed.

Preparation of Olefin Polymer

In the process for polymerizing an olefin according to the present invention, an olefin is homopolymerized or copolymerized in the presence of such an olefin polymerization catalyst as above to obtain an olefin polymer.

In the present invention, the polymerization can be carried out by any of liquid phase polymerization such as solution polymerization or suspension polymerization and gas phase polymerization. Examples of inert hydrocarbon media (inert hydrocarbon solvents) used in the liquid phase polymerization include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures of these hydrocarbons. An olefin itself may be used as a solvent.

When the polymerization of an olefin is carried out using such an olefin polymerization catalyst as above, the transition metal compound component (A) is used in an amount of usually $10^{-9}$ to $10^{-1}$ mol, preferably $10^{-8}$ to $10^{-2}$ mol, based on 1 liter of the reaction volume.

The organoaluminum oxy-compound (b-1) is used in such an amount that the molar ratio [(b-1)/M] of the organoaluminum oxy-compound (b-1) to all the transition metal atoms (M) in the transition metal compounds (a) becomes usually 0.01 to 5000, preferably 0.05 to 2000. The ionic compound (b-2) is used in such an amount that the molar ratio [(b-2)/M] of the ionic compound (b-2) to the transition metal atoms (M) in the transition metal compounds (a) becomes usually 1 to 10, preferably 1 to 5. The organoaluminum compound (b-3) is used in such an amount that the molar ratio [(b-3)/M] of the aluminum atom in the organoaluminum compound (b-3) to all the transition metals (M) in the transition metal compounds (a) becomes usually 10 to 5000, preferably 20 to 2000. The above molar ratios are calculated using the number of moles of all the transition metal atoms (M) in the transition metal compounds (a), that is, the total of the numbers of moles of the transition metal atoms (M) contained in two or more kinds of the transition metal compounds (a).

When the organometallic compound component (B) is the organoaluminum oxy-compound (b-1), the organic compound component (D) is used in such an amount that the molar ratio [(D)/(b-1)] becomes usually 0.01 to 10, preferably 0.1 to 5. When the organometallic compound component (B) is the ionic compound (b-2), the organic compound component (D) is used in such an amount that the molar ratio [(D)/(b-2)] becomes usually 0.01 to 10, preferably 0.1 to 5. When the organometallic compound component (B) is the organoaluminum compound (b-3), the organic compound component (D) is used in such an amount that the molar ratio [(D)/(b-3)] becomes usually 0.01 to 2, preferably 0.005 to 1.

The temperature of polymerization of an olefin using such an olefin polymerization catalyst is in the range of usually −50 to +200° C., preferably 40 to 170° C., more preferably 50 to 170° C., particularly preferably 60 to 150° C. This particularly preferred range is a temperature range suitable for industrialization.

The polymerization pressure is in the range of usually normal pressure to 10 MPa gauge pressure, preferably normal pressure to 5 MPa gauge pressure.

The polymerization reaction can be carried out by any of batch process, semi-continuous process and continuous process. It is also possible to carry out polymerization in two or more stages different in reaction conditions.

The molecular weight of the resulting olefin polymer can be controlled by allowing hydrogen to exist in the polymerization system or by changing the polymerization temperature. Moreover, the molecular weight can be controlled by the amount of the organometallic compound component (B) used. When hydrogen is added, the amount thereof is preferably about 0.001 to 100 NL based on 1 kg of the olefin.

According to the present invention, for example, a propylene polymer having a high melting point, a high molecular weight and a narrow molecular weight distribution can be obtained even under the conditions of a polymerization temperature of not lower than 40° C.

In the present invention, the olefin fed for the polymerization reaction is one or more monomers selected from ethylene and α-olefins. In other words, at least one monomer selected from α-olefins of 2 or more carbon atoms (ethylene and α-olefins of 3 or more carbon atoms) is polymerized in the present invention.

Examples of the α-olefins of 3 or more carbon atoms include straight-chain or branched α-olefins of 3 to 20 carbon atoms, preferably 3 to 10 carbon atoms, such as propylene, 1-butene, 2-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene.

In the polymerization process of the present invention, the α-olefins also include cycloolefins of 3 to 30 carbon atoms, preferably 3 to 20 carbon atoms, such as cyclopentene, cycloheptene, norbornene, 5-methyl-2-norbornene, tetracyclododecene and 2-methyl-1,4,5,8-dimethano-1,2,3,4,4a, 5,8,8a-octahydronaphthalene; and polar monomers, e.g., α,β-unsaturated carboxylic acids, such as acrylic acid, methacrylic acid, fumaric acid, maleic anhydride, itaconic acid, itaconic anhydride and bicycle (2,2,1)-5-heptene-2,3-dicarboxylic anhydride, and metallic salts thereof, such as sodium salts, potassium salts, lithium salts, zinc salts, magnesium salts and calcium salts thereof; α, β-unsaturated carboxylic acid esters, such as methyl acrylate, n-butyl acrylate, n-propyl acrylate, isopropyl acrylate, n-butyl acrylate, isobutyl acrylate, tert-butyl acrylate, 2-n-butylhexyl acrylate, methyl methacrylate, n-butylmethacrylate, n-propylmethacrylate, isopropyl methacrylate, n-butyl methacrylate and isobutyl methacrylate; vinyl esters, such as vinyl acetate, vinyl propionate, vinyl caproate, vinyl caprate, vinyl laurate, vinyl stearate and vinyl trifluoroacetate; and unsaturated glycidyls, such as glycidyl acrylate, glycidyl methacrylate and itaconic acid monoglycidyl ester.

The polymerization may be promoted by allowing vinylcyclohexane, diene or polyene; an aromatic vinyl compound, e.g., mono- or polyalkylstyrene, such as styrene, o-methylstyrene, m-methylstyrene, p-methylstyrene, o,p-dimethylstyrene, o-n-butylstyrene, m-n-butylstyrene or p-n-butylstyrene; a functional group-containing styrene derivative, such as methoxystyrene, ethoxystyrene, vinylbenzoic acid, methyl vinylbenzoate, vinyl benzyl acetate, hydroxystyrene, o-chlorostyrene, p-chlorostyrene or divinylbenzene; 3-phenylpropylene, 4-phenylpropylene, α-methylstyrene, or the like to coexist in the reaction system.

Of these, propylene is preferably contained in the monomers. That is to say, it is preferable that propylene only is used as the monomer or propylene and at least one monomer selected from ethylene and α-olefins of 3 or more carbon atoms are used as the monomers. As the monomer (another α-olefin) which is used together with propylene, more preferable is ethylene, 1-butene, 2-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, cyclopentene, cycloheptene, norbornene, 5-methyl-2-norbornene, tetracyclododecene, 2-methyl-1,4,5,8-dimethano-1,2,3,4,4a, 5,8, 8a-octahydronaphthalene or the like, and still more preferably used is ethylene, 1-butene, 4-methyl-1-pentene, 1-hexene, 1-octene or 1-decene. It is particularly preferable to use propylene only as the above monomer.

When propylene and another α-olefin are used as the monomers, it is preferable to use propylene and another α-olefin in such amounts that the amount of constituent units derived from propylene in the resulting α-olefin polymer becomes less than 100% by mol but not less than 30% by mol, preferably less than 100% by mol but not less than 40% by mol, more preferably less than 100% by mol but not less than 51% by mol, and the amount of constituent units derived from another α-olefin becomes more than 0% by mol but not more than 70% by mol, preferably more than 0% by mol but not more than 60% by mol, more preferably more than 0% by mol but not more than 49% by mol.

Olefin Polymer

Next, the olefin polymer obtained by the polymerization process according to the present invention is described. The olefin polymer obtained by polymerizing an olefin in the presence of the olefin polymerization catalyst of the present invention has the following two characteristics.

Characteristic 1

The weight-average molecular weight (Mw) and the number-average molecular weight (Mn), as determined by gel permeation chromatography (GPC), satisfy the relationship of $1 \leq Mw/Mn \leq 3$.

The olefin polymer obtained by polymerizing an olefin in the presence of the aforesaid olefin polymerization catalyst has a relatively narrow molecular weight distribution. In GPC, Mw/Mn can be arbitrarily determined from the melting point and the molecular weight of the olefin polymer to be prepared, but preferable is $1 \leq Mw/Mn \leq 3$, more preferable is $1 \leq Mw/Mn \leq 2.9$, and particularly preferable is $1 \leq Mw/Mn \leq 2.8$. When the olefin polymer prepared has a narrow molecular weight distribution, there is an advantage that the compatibility can be made homogeneous.

It is also desirable that the molecular weight distribution (Mw/Mn) of the olefin polymer obtained by polymerizing an olefin in the presence of the aforesaid olefin polymerization catalyst is in the range of preferably 2.01 to 3.00, more preferably 2.02 to 2.90, still more preferably 2.03 to 2.80. When the molecular weight distribution is well-balanced as above, that is, in the case of $2.03 \leq Mw/Mn \leq 2.80$, molding processability can be enhanced. The balance of the molecular weight distribution can be adjusted to a more preferred range by using two or more kinds of the transition metal compounds (a) represented by the formula [A1]. Moreover, by using the transition metal compound (a) represented by the formula [A1-1] and the transition metal compound (a) represented by the formula [A1-2] in combination, the balance can be adjusted to a still more preferred range.

The second characteristic of the olefin polymer is described below.

Characteristic 2

The olefin polymer obtained by polymerizing an olefin at a polymerization temperature of not lower than 40° C. in the presence of the aforesaid olefin polymerization catalyst has a melting point (Tm), as determined by DSC, of $Tm \geq 150°$ C. and an intrinsic viscosity ($[\eta]$) of $[\eta]$ (dl/g)$\geq 1.50$. If the polymerization temperature in the olefin polymerization is raised, a melting point and a molecular weight of the resulting olefin polymer are generally lowered. According to the olefin polymerization catalyst, an olefin polymer having a melting point (Tm) of $Tm \geq 150°$ C. and an intrinsic viscosity ($[\eta]$) of $[\eta]$ (dl/g)$\geq 1.50$ can be prepared even at a temperature at which industrialization is possible.

The olefin polymer has a high melting point and a high molecular weight (namely high intrinsic viscosity). As for the melting point and the molecular weight of the olefin polymer, $Tm \geq 150°$ C. and $[\eta]$ (dl/g)$\geq 1.50$ are preferable, $Tm \geq 151°$ C. and $[\eta]$ (dl/g)$\geq 1.51$ are more preferable, and $Tm \geq 151°$ C. and $[\eta]$ (dl/g)$\geq 1.52$ are particularly preferable. The upper limit of Tm is usually 170° C., and the upper limit of $[\eta]$ is usually 10 dl/g. If the melting point of the olefin polymer prepared is high, molding processability can be enhanced. When the melting point of the olefin polymer is not lower than 150° C., the olefin polymer exhibits favorable molding processability. If the molecular weight is high, strength and molding processability of the olefin polymer can be enhanced. When the molecular weight is high, that is, in the case of $[\eta]$ (dl/g)$\cong 1.50$, the olefin polymer exhibits favorable strength and molding processability.

The olefin polymer obtained by polymerizing an olefin at a polymerization temperature of not lower than 40° C. in the presence of the aforesaid olefin polymerization catalyst preferably further has the following characteristic.

The number-average molecular weight (Mn) as determined by gel permeation chromatography (GPC) is in the range of preferably 50000 to 500000, more preferably 52500 to 500000, and the weight-average molecular weight (Mw) is in the range of preferably 100000 to 1000000, more preferably 110000 to 1000000. When Mn and Mw are high, that is, in the case of $Mn \geq 52500$ and $Mw \geq 110000$, the olefin polymer exhibits favorable strength and molding processability. The value of melt flow rate (MFR) (g/10 min) is in the range of preferably 0.01 to 10, more preferably 0.01 to 7, still more preferably 0.01 to 6. When MFR is low, that is, in the case of $MFR \leq 6$, the olefin polymer exhibits favorable strength and molding processability. The stereoregularity (rrrr) as determined by NMR is in the range of preferably 80% to 100%, more preferably 85% to 100%. When the stereoregularity (rrrr) is high, that is, in the case of stereoregularity (rrrr)$\geq$ 85%, molding processability can be enhanced.

EXAMPLES

The present invention is further described with reference to the following examples, but it should be construed that the present invention is in no way limited to those examples.

Measuring Methods

First, methods for measuring properties and characteristics of polymers obtained by polymerization of an olefin in the presence of a catalyst containing the aforesaid transition metal compound are described.

The compounds described in the synthesis examples were identified by the use of 270 MHz $^1$H-NMR (JEOL GSH-270) and FD-mass spectrometry (FD-MS) (JEOL SX-102A).

Intrinsic Viscosity [η]

The intrinsic viscosity is a value measured at 135° C. using a decalin solvent. That is to say, granulated pellets of about 20 mg were dissolved in 15 ml of decalin, and a specific viscosity ηsp was measured in an oil bath at 135° C. To this decalin solution was added 5 ml of a decalin solvent to dilute the solution, and then a specific viscosity ηsp was measured in the same manner as above. This dilution operation was further repeated twice, and a value of ηsp/C given when the concentration (C) was extrapolated to 0 was taken as an intrinsic viscosity.

$$[\eta]=\lim(\eta sp/C)\ (C\rightarrow 0)$$

Weight-Average Molecular Weight (Mw), Number-Average Molecular Weight (Mn), Molecular Weight Distribution (Mq/Mn)

The weight-average molecular weight (Mw), the number-average molecular weight (Mn) and the molecular weight distribution (Mw/Mn) were measured in the following manner using a gel permeation chromatograph Alliance GPC-2000 model manufactured by Waters Corporation. As separation columns, two of TSKgel GNH6-HT and two of TSKgel GNH6-HTL were used, and each of them had a column size of a diameter of 7.5 mm and a length of 300 mm. The column temperature was 140° C. As a mobile phase, o-dichlorobenzene (Wako Pure Chemical Industries, Ltd.) was used, and as an antioxidant, BHT (Takeda Pharmaceutical Co., Ltd.) of 0.025% by weight was used, and the sample was moved at 1.0 ml/min. The sample concentration was 15 mg/10 ml, and the amount of the sample poured was 500 microliters. As a detector, a differential refractometer was used. As standard polystyrene having a molecular weight of Mw<1000 and standard polystyrene having a molecular weight of Mw>4×10$^6$, those available from Tosoh Corporation were used, and as standard polystyrene having a molecular weight of 1000≦Mw≦4×10$^6$, polystyrene available from Pressure Chemical Company was used. The molecular weight distribution and the average molecular weight were calculated in terms of polypropylene molecular weight in accordance with the procedure of general purpose calibration.

Melting Point (Tm), Crystallization Temperature (Tc), Quantity of Heat of Fusion (ΔH(Tm)), Quantity of Heat of Crystallization (ΔH(Tc))

Using DSC Pyris1 or DSC7 manufactured by Perkin Elmer Inc., in an atmosphere of nitrogen (20 ml/min), a sample of about 5 mg was heated up to 200° C., held for 10 minutes and then cooled down to 30° C. at 10° C./min. The sample was maintained at 30° C. for 5 minutes and then heated up to 200° C. at 10° C./min. From the peak top of the crystallization temperature peak in the cooling, a crystallization temperature (Tc) was determined, and from the integrated value of the peak, a quantity of heat of crystallization (ΔH(Tc) (J/g)) was calculated. From the peak top of the crystal melting peak in the heating of the second time, a melting point (T$_m$) was determined, and from the integrated value of the peak, a quantity of heat of fusion (ΔH(T$_m$) (J/g)) was calculated.

When two peaks were observed with regard to the propylene-based polymers described in the examples, the peak on the lower temperature side was taken as T$_{m1}$, the peak on the higher temperature side was taken as T$_{m2}$, and the T$_{m2}$ was defined as a melting point (T$_m$).

Stereoregularity (rrrr)

The stereoregularity (rrrr) was calculated from the $^{13}$C-NMR spectrum measurement.

MFR (Melt Flow Rate)

The polymer was heated at 230° C. for 6 minutes, and then measurement of a melt flow rate was carried out under a load of 2.16 kg.

Solvent

The types of solvents for solution polymerization, which were used in the examples of the present invention and the comparative examples described later, are as follows.

Cyclohexane n-Heptane

Solvent A: mixed solvent consisting of n-hexane (60 to 65% by volume), isohexane (10 to 19% by volume), methylcyclopentane (18 to 22% by volume) and other aliphatic hydrocarbon components (0 to 3% by volume)

Catalyst

The catalysts (b) to (e) were synthesized by the processes described in the following patents:

Japanese Patent Laid-Open Publication No. 212194/2000, Japanese Patent Laid-Open Publication No. 168744/2004, Japanese Patent Laid-Open Publication No. 189666/2004, Japanese Patent Laid-Open Publication No. 1619575/2004, Japanese Patent Laid-Open Publication No. 302854/2007, Japanese Patent Laid-Open Publication No. 302853/2007 and WO01/027124 pamphlet.

Catalyst (a): dibenzylmethylene(cyclopentadienyl)[2,7-di(o-methylphenyl)-3,6-di-tert-butylfluorenyl]zirconium dichloride Catalyst (b): dibenzylmethylene(cyclopentadienyl)[2,7-di(p-chlorophenyl)-3,6-di-tert-butylfluorenyl]zirconium dichloride Catalyst (c): di(p-chlorobenzyl)methylene(cyclopentadienyl)[2,7-diphenyl-3,6-di-tert-butylfluorenyl]zirconium dichloride Catalyst (d): dibenzylmethylene(cyclopentadienyl)(2,7-diphenyl-3,6-di-tert-butylfluorenyl)zirconium dichloride Catalyst (e): dibenzylmethylene(cyclopentadienyl)(3,6-di-tert-butylfluorenyl)zirconium dichloride Catalyst (f): di(p-chlorobenzyl)methylene(cyclopentadienyl)[2,7-di(o-methylphenyl)-3,6-di-tert-butylfluorenyl]zirconium dichloride Catalyst (g): diphenylmethylene(cyclopentadienyl)(2,7-diphenyl-3,6-di-tert-butylfluorenyl)zirconium dichloride Synthesis Example 1

Catalyst (a): dibenzylmethylene(cyclopentadienyl)[2,7-di(o-methylphenyl)-3,6-di-tert-butylfluorenyl]zirconium dichloride (i) Synthesis of 2,7-dibromo-3,6-di-tert-butylfluorene In a stream of nitrogen, to 15.22 g (54.7 mmol) of 3,6-di-tert-butylfluorene was added 170 ml of propylene carbonate, and they were stirred. To this solution, 20.52 g (115 mmol) of N-bromosuccinimide was added. The resulting solution was stirred under heating at 80° C. for 5 hours. After the reaction solution was naturally allowed to cool, the solution was added to 800 ml of water. The resulting solution was stirred at room temperature for 15 minutes and filtered using a Kiriyama funnel. The resulting white yellow powder was washed with 10 ml of ethanol five times. To this white yellow powder, a mixed solution of hexane and a small amount of dichloromethane was added, and they were heated to 60° C. to dissolve all the powder. The resulting solution was allowed to stand still at −20° C. for one night. The crystals precipitated were washed with 5 ml of hexane three times to obtain a desired product as a white yellow powder.

Yield: 21.1 g, 76%

$^1$H NMR (270 MHz, CDCl$_3$): δ/ppm 1.60 (18H), 3.75 (2H), 7.73 (2H), 7.81 (2H); MS (FD): M/z 436 (M$^+$)

(ii) Synthesis of 2,7-di(o-tolyl)-3,6-di-tert-butylfluorene

In a stream of nitrogen, 5.0 g (11.5 mmol) of 3,6-di-tert-butyl-2,7-dibromofluorene, 135 mg (0.60 mmol) of palladium(II) acetate, 603 mg (1.72 mmol) of (2-biphenyl)dicyclohexylphosphine, 14.5 g (68.3 mmol) of potassium phosphate, 4.7 g (34.6 mmol) of o-tolylboronic acid and 100 ml of THF were placed in a reaction container, and with stirring them at room temperature, 25 ml of water was slowly dropwise added. After the dropwise addition, the reaction solution was heated up to 50° C., and with stirring, the solution was heated for 10 hours. Thereafter, the reaction solution was quenched with 1N hydrochloric acid, and a soluble matter was extracted with ether. The organic phase was washed with water, a sodium hydrogencarbonate aqueous solution and a saturated saline solution. Thereafter, the thus washed organic phase was dried using magnesium sulfate, and the solvent was distilled off to obtain an unpurified desired product. The conversion ratio as measured by HPLC was 86%.

In a beaker, 200 ml of methanol was placed, and the resulting unpurified desired product was dropwise added to the methanol to obtain a precipitate. The resulting precipitate was filtered through a Kiriyama funnel, and methanol was evaporated under reduced pressure to obtain 3.96 g (8.63 mmol, isolation yield: 76%) of 2,7-di(o-tolyl)-3,6-di-tert-butylfluorene as an isolated desired product.

The results of identification of the desired product obtained are as follows.

$^1$H NMR (270 MHz, CDCl$_3$): δ 1.27 (18H), 2.07 (6H), 3.79 (2H), 7.07 (2H), 7.19-7.25 (8H), 8.00 (2H); MS (FD): m/z 458 (M$^+$)

(iii) Synthesis of 6,6-dibenzylfulvene

In an atmosphere of nitrogen, 8.0 g (121.0 mmol) of cyclopentadiene and 100 ml of dehydrated THF were placed in a 500 ml three-necked flask, and they were stirred. This mixed solution was cooled in an ice bath, and to the mixed solution was added 80 ml (125.6 mmol) of a hexane solution of n-butyllithium having a concentration of 15.7 mol/liter. Thereafter, the mixture was stirred at room temperature for 3 hours, and the resulting white slurry was cooled in an ice bath, followed by adding a solution obtained by dissolving 25.0 g (118.0 mmol) of 1,3-diphenyl-2-propanone in 50 ml of dehydrated THF. Thereafter, the mixture was stirred at room temperature for 12 hours, and the resulting yellow solution was quenched with a saturated NH$_4$Cl aqueous solution. Then, 100 ml of hexane was added to extract a soluble matter, and this organic phase was washed with water and a saturated saline solution, followed by drying using magnesium sulfate. Then, the solvent was distilled off, and the residue was purified by column chromatography to obtain a desired product of a yellow solid.

Yield: 3.7 g, 12%

$^1$H NMR (270 MHz, CDCl$_3$): δ/ppm 3.69 (4H), 6.60-6.72 (4H), 7.13-7.32 (10H)

(iv) Synthesis of dibenzylmethylene(cyclopentadienyl)(3,6-di-tert-butyl-2,7-di-o-tolylfluorene)

In a stream of nitrogen, to 0.92 g (2.00 mmol) of 3,6-di-tert-butyl-2,7-di-o-tolylfluorene was added 40 ml of anhydrous tBuOMe, and they were stirred. This solution was cooled in an ice bath, and 1.45 ml (2.20 mmol) of a hexane solution of n-butyllithium of 1.52 M was added. The mixture was stirred at room temperature for 4 hours. The resulting red solution was cooled in an ice bath, and a solution of 0.58 g (2.24 mmol) of 6,6-dibenzylfulvene in 20 ml of THF was dropwise added over a period of 25 minutes. With slowly heating the resulting solution up to room temperature, the solution was stirred for 18 hours, followed by refluxing under heating for 3 hours. The resulting black red solution was naturally allowed to cool, and then in an ice bath, 1N hydrochloric acid was added to terminate the reaction. Ether was added to perform liquid separation, then the aqueous layer was extracted with diethyl ether twice, and the resulting extract was mixed with the organic layer previously obtained. The resulting organic layer was washed with a saturated sodium hydrogen carbonate aqueous solution twice, then with water twice, then with a saturated saline solution once and dried using magnesium sulfate. The solvent was distilled off, and the residue was separated by silica gel chromatography to obtain a yellow powder. To this yellow powder, a mixed solvent of hexane and ethanol was added, and they were heated to 60° C. to dissolve all the powder. The resulting solution was allowed to stand still at −20° C. for one night. The crystals precipitated were washed with ethanol to obtain a desired product as a light yellow powder.

Yield: 0.57 g, 40%

$^1$H NMR (270 MHz, CDCl$_3$): δ/ppm 1.21-1.23 (18H), 1.96-2.19 (6H), 2.66 (1H), 3.06-3.34 (4H), 4.45 (1H), 5.80-6.48 (4H), 6.75-7.20 (20H), 7.64-7.79 (2H); MS (FD): M/z 716 (M$^+$)

(v) Synthesis of dibenzylmethylene(cyclopentadienyl)(3,6-di-tert-butyl-2,7-di-o-tolylfluorenyl)zirconium dichloride In an atmosphere of nitrogen, 0.36 g (0.50 mmol) of dibenzylmethylene(cyclopentadienyl)(3,6-di-tert-butyl-2,7-di-o-tolylfluorene) and 25 ml of anhydrous diethyl ether were placed in a 50 ml Schlenk flask, and they were stirred. This mixed slurry solution was cooled in an ice bath, then 0.72 ml (1.09 mmol) of a hexane solution of n-butyllithium having a concentration of 1.52 mol/liter was added, and with slowly heating the resulting solution up to room temperature, the solution was stirred for 48 hours. This red reaction solution was cooled (−78° C.) in a dry ice/methanol bath, and then 0.251 g (1.08 mmol) of zirconium tetrachloride was added. Thereafter, with slowly heating the mixture to room temperature, the mixture was stirred for 16 hours to obtain a red orange suspension.

After the solvent was vacuum dried, the residue was dissolved in hexane in a globe box, and the resulting solution was passed through a fritted glass funnel packed with Celite and then washed with hexane. The orange powder which had not been dissolved in hexane was extracted with dichloromethane. The solvent of the dichloromethane solution portion was distilled off, and the residue was washed with diethyl ether/cold pentane. The resulting substance was dried to obtain a desired product as a dark pink powder.

Yield: 167 mg, 38%

$^1$H NMR (270 MHz, CDCl$_3$): δ/ppm 1.28-1.33 (18H), 1.68-2.16 (6H), 3.34-4.30 (4H), 5.73-5.82 (2H), 6.45-6.48 (2H), 6.95-7.30 (18H), 7.48 (2H), 8.37-8.41 (2H); MS (FD): M/z 876 (M$^+$)

Synthesis Example 2

Catalyst (f): di(p-chlorobenzyl)methylene(cyclopentadienyl)[2,7-di(o-methylphenyl)-3,6-di-tert-butylfluorenyl]zirconium dichloride (i) Synthesis of 6,6-di(chlorobenzyl)fulvene To 1.5 g (20.2 mmol) of lithium cyclopentadiene was added 80 ml of dehydrated THF, and they were stirred. This solution was cooled to −78° C. in an ice bath, and a solution obtained by dissolving 5.2 g (18.6 mmol) of bis(4-chlorobenzyl)ketone in dehydrated THF was added. Thereafter, the mixture was stirred at room temperature for 24 hours, and the resulting yellow solution was quenched with 1N hydrochloric acid. Then, hexane was added to extract a soluble matter, and this organic phase was washed with water and a saturated saline solution, followed by drying using magnesium sulfate. The solvent was distilled off, and the residue was purified by column chromatography to obtain a desired product.
Yield: 0.53 g, 80%
$^1$H NMR (270 MHz, CDCl$_3$): δ/ppm 3.69 (4H), 6.60 (4H), 7.00-7.30 (8H)

(ii) Synthesis of di(p-chlorobenzyl)methylene(cyclopentadienyl)(3,6-di-tert-butyl-2,7-di-o-tolylfluorene)

In a stream of nitrogen, to 0.73 g (1.59 mmol) of 3,6-di-tert-butyl-2,7-di-o-tolylfluorene was added 40 ml of anhydrous THF, and they were stirred. This solution was cooled in an ice bath, and 1.22 ml (1.92 mmol) of a hexane solution of n-butyllithium of 1.52 M was added. The mixture was stirred at room temperature for 4 hours. The resulting solution was cooled in an ice bath, and a solution of 0.62 g (1.89 mmol) of 6,6-di(p-chlorobenzyl)fulvene in 20 ml of THF was dropwise added over a period of 25 minutes. With slowly heating the resulting solution up to room temperature, the solution was stirred for 18 hours. To the resulting solution was added 1N hydrochloric acid in an ice bath to terminate the reaction. Ether was added to perform liquid separation, then the aqueous layer was extracted with diethyl ether twice, and the resulting extract was mixed with the organic layer previously obtained. The resulting organic layer was washed with a saturated sodium hydrogencarbonate aqueous solution twice, then with water twice, then with a saturated saline solution once and dried using magnesium sulfate. The solvent was distilled off, and the residue was separated by silica gel chromatography to obtain a desired product.
Yield: 0.72 g, 58%
$^1$H NMR (270 MHz, CDCl$_3$): δ/ppm 1.21-1.23 (18H), 1.96-2.30 (6H), 2.66-3.34 (5H), 4.45 (1H), 5.80-6.48 (4H), 6.75-7.20 (18H), 7.64-7.79 (2H); MS (FD): M/z 784 (M$^+$)

(iii) Synthesis of di(p-chlorobenzyl)methylene(cyclopentadienyl)(3,6-di-tert-butyl-2,7-di-o-tolylfluorenyl)zirconium dichloride To 0.72 g (0.92 mmol) of di(p-chlorobenzyl)methylene(cyclopentadienyl)-3,6-di-tert-butyl-2,7-di-o-tolylfluorene was added 25 ml of anhydrous diethyl ether, and they were stirred. This mixed slurry solution was cooled in an ice bath, then 1.22 ml (1.92 mmol) of a hexane solution of n-butyllithium having a concentration of 1.52 mol/liter was added, and with slowly heating the resulting solution to room temperature, the solution was stirred for 24 hours. To this reaction solution was added 0.23 g (0.98 mmol) of zirconium tetrachloride at −78° C. Thereafter, with slowly heating the mixture to room temperature, the mixture was stirred for 16 hours to obtain a red orange suspension.

After the solvent was vacuum dried, the residue was dissolved in hexane in a globe box, and the resulting solution was passed through a fritted glass funnel packed with Celite and then washed with hexane. The orange powder which had not been dissolved in hexane was extracted with dichloromethane. The solvent of the dichloromethane solution portion was distilled off, and the residue was washed with diethyl ether/cold pentane. The resulting substance was dried to obtain a desired product as a dark pink powder.
Yield: 0.347 mg, 25%
$^1$H NMR (270 MHz, CDCl$_3$): δ/ppm 1.28-1.33 (18H), 1.68-2.16 (6H), 3.10-4.30 (4H), 5.73-5.82 (2H), 6.45-6.48 (2H), 6.95-7.48 (18H), 8.20-8.40 (2H); MS (FD): M/z 942 (M$^+$)

Synthesis Example 3

Catalyst (g): diphenylmethylene(cyclopentadienyl)(2,7-diphenyl-3,6-di-tert-butylfluorenyl)zirconium dichloride (i) Synthesis of diphenylmethylene(cyclopentadienyl)(2,7-diphenyl-3,6-di-tert-butylfluorene)

In an atmosphere of nitrogen, to 2.01 g (4.67 mmol) of 2,7-diphenyl-3,6-di-tert-butylfluorene was added 60 ml of dehydrated tetrahydrofuran, and they were stirred. This solution was cooled in an ice bath, and 3.10 ml (4.99 mmol) of a hexane solution of n-butyllithium of 1.61 mol/liter was added. The mixture was stirred at room temperature for 1 hour. The resulting dark orange solution was cooled to −78° C. in a dry ice-methanol bath, and a solution of 1.26 g (5.47 mmol) of 6,6-dibenzylfulvene in 40 ml of tetrahydrofuran was dropwise added over a period of 24 minutes. Thereafter, with slowly heating the resulting solution up to room temperature, the solution was stirred for 17 hours. To the resulting black red solution was added 60 ml of 1N hydrochloric acid to terminate the reaction. Then, 100 ml of hexane was added to perform liquid separation, and a soluble matter was extracted. This organic layer was washed with a saturated sodium hydrogencarbonate aqueous solution twice, then with water twice, then with a saturated saline solution once and dried using magnesium sulfate. The solvent was distilled off, and the residue was purified by silica gel chromatography to obtain a desired product of a white yellow powder.
Yield: 1.70 g, 55.4%
Identification of the desired product was carried out by $^1$H-NMR and FD-MS spectrum.
$^1$H NMR (270 MHz, CDCl$_3$, TMS): δ/ppm 1.18 (18H), 2.88 (2H), 5.35 (1H), 6.10-6.32 (3H), 6.60 (2H), 6.97-7.34 (20H), 7.63 (2H); MS (FD): M/z 660 (M$^+$)

(ii) Synthesis of diphenylmethylene(cyclopentadienyl)(2,7-diphenyl-3,6-di-tert-butylfluorenyl)zirconium dichloride In an atmosphere of nitrogen, 0.80 g (1.21 mmol) of diphenylmethylene(cyclopentadienyl)(2,7-diphenyl-3,6-di-tert-butylfluorene) and 60 ml of dehydrated diethyl ether were placed in a 100 ml Schlenk flask, and they were stirred. This mixed slurry solution was cooled in an ice bath, then 1.50 ml (2.42 mmol) of a hexane solution of n-butyllithium having a concentration of 1.61 mol/liter was added, and with slowly heating the resulting solution to room temperature, the solution was stirred for 18 hours. This red reaction solution was cooled to −78° C. in a dry ice/methanol bath, and then 0.27 g (1.17 mmol) of zirconium tetrachloride was added. Thereafter, with slowly heating the mixture to room temperature, the mixture was stirred for 20 hours to obtain a red orange suspension. After the solvent was distilled off under reduced pressure, the residue was dissolved in n-hexane in an atmosphere of nitrogen, and the resulting solution was passed through a fritted glass funnel packed with Celite and then washed with n-hexane. The orange powder which had not been dissolved in n-hexane was extracted with dichloromethane. The solvent of the dichloromethane solution portion was distilled off, and the residue was washed with diethyl ether/cold n-pentane. The resulting substance was dried to obtain a desired product as an orange powder.

Yield: 0.68 g, 70.9%

Identification of the desired product was carried out by $^1$H-NMR and FD-MS spectrum.

$^1$H NMR (270 MHz, CDCl$_3$, TMS): δ/ppm 1.10 (18H), 5.50 (2H), 6.29 (2H), 6.91-7.27 (22H), 8.28 (2H); MS (FD): M/z 848 (M$^+$)

Example 1

Propylene Polymerization

In a glass autoclave having an internal volume of 500 ml and having been thoroughly purged with nitrogen, 400 ml of heptane was placed, then propylene was passed through the autoclave at a rate of 150 l/hr, and the contents in the autoclave were maintained at 50° C. for 20 minutes. On the other hand, in a side arm flask having an internal volume of 30 ml and having been thoroughly purged with nitrogen, a magnetic stirrer was placed, then 5.00 mmol of a toluene solution of methylaluminoxane (Al=1.53 mol/l), a toluene solution of the catalyst (a) (amount of catalyst (a): 3.2 μmol) and a toluene solution of the catalyst (b) (amount of catalyst (b): 1.8 μmol) were placed in the flask, and they were stirred for 20 minutes. This solution was added to the heptane in the glass autoclave through which propylene had been passed, to initiate polymerization. Propylene gas was continuously fed at a feed rate of 150 l/hr, and polymerization was carried out at 50° C. for 15 minutes at normal pressure. Thereafter, a small amount of methanol was added to terminate the polymerization. The polymer solution was added to a large excess of methanol to precipitate a polymer, and the polymer was vacuum dried at 80° C. for 12 hours. As a result, 4.65 g of a polymer was obtained. The polymerization activity was 3.72 kg-PP/mmol-Zr·hr, and the resulting polymer had [η] of 3.82 dl/g, Mw of 254000, Mw/Mn of 2.33 and Tm of 153.5° C.

Example 2

Operations were carried out in the same manner as in Example 1, except that the catalysts were changed to a toluene solution of the catalyst (a) (amount of catalyst (a): 4.0 μmol) and a toluene solution of the catalyst (b) (amount of catalyst (b): 1.0 μmol), and the polymerization time was changed to 30 minutes. As a result, 2.61 g of a polymer was obtained. The polymerization activity was 1.04 kg-PP/mmol-Zr·hr, and the resulting polymer had [η] of 2.22 dl/g, Mw of 191000, Mw/Mn of 2.23 and Tm of 151.3° C.

Example 3

Operations were carried out in the same manner as in Example 1, except that the catalysts were changed to a toluene solution of the catalyst (b) (amount of catalyst (b): 4.0 μmol) and a toluene solution of the catalyst (f) (amount of catalyst (f): 1.0 μmol), and the polymerization time was changed to 40 minutes. As a result, 9.87 g of a polymer was obtained. The polymerization activity was 1.48 kg-PP/mmol-Zr·hr, and the resulting polymer had [η] of 1.92 dl/g, Mw of 142000, Mw/Mn of 2.35 and Tm of 154.6° C.

Example 4

Operations were carried out in the same manner as in Example 1, except that the catalysts were changed to a toluene solution of the catalyst (f) (amount of catalyst (f): 2.5 μmol) and a toluene solution of the catalyst (d) (amount of catalyst (d): 2.5 μmol), and the polymerization time was changed to 22 minutes. As a result, 1.88 g of a polymer was obtained. The polymerization activity was 1.02 kg-PP/mmol-Zr·hr, and the resulting polymer had [η] of 2.05 dl/g, Mw of 205000, Mw/Mn of 2.04 and Tm of 152.9° C.

Example 5

In a glass autoclave having an internal volume of 500 ml and having been thoroughly purged with nitrogen, 400 ml of heptane was placed, then propylene was passed through the autoclave at a rate of 150 l/hr, and the contents in the autoclave were maintained at 50° C. for 20 minutes. On the other hand, in a side arm flask having an internal volume of 30 ml and having been thoroughly purged with nitrogen, a magnetic stirrer was placed, then 3.00 mmol of a toluene solution of methylaluminoxane (Al=1.53 mol/l) and a toluene solution of the catalyst (a) (amount of catalyst (a): 3.0 μmol) were placed in the flask, and they were stirred for 20 minutes. Moreover, in a different side arm flask having an internal volume of 30 ml and having been thoroughly purged with nitrogen, a magnetic stirrer was placed, then 2.00 mmol of a toluene solution of methylaluminoxane (Al=1.53 mol/l) and a toluene solution of the catalyst (b) (amount of catalyst (b): 2.0 μmol) were placed in the flask, and they were stirred for 20 minutes. The solution containing the catalyst (a) was added to the heptane in the glass autoclave through which propylene had been passed, and subsequently the solution containing the catalyst (b) was added to initiate polymerization. Propylene gas was continuously fed at a feed rate of 150 l/hr, and polymerization was carried out at 50° C. for 30 minutes at normal pressure. Thereafter, a small amount of methanol was added to terminate the polymerization. The polymer solution was added to a large excess of methanol to precipitate a polymer, and the polymer was vacuum dried at 80° C. for 12 hours. As a result, 2.60 g of a polymer was obtained. The polymerization activity was 1.04 kg-PP/mmol-Zr·hr, and the resulting polymer had [η] of 2.01 dl/g, Mw of 201000, Mw/Mn of 2.33 and Tm of 153.6° C.

Comparative Example 1

Operations were carried out in the same manner as in Example 1, except that the catalysts were changed to a toluene solution of the catalyst (e) (amount of catalyst (e): 0.25 μmol) and a toluene solution of the catalyst (d) (amount of catalyst (d): 0.25 μmol), and the polymerization time was changed to 30 minutes. As a result, 8.76 g of a polymer was obtained. The polymerization activity was 3.05 kg-PP/mmol-Zr·hr, and the resulting polymer had [η] of 1.45 dl/g, Mw of 135000, Mw/Mn of 1.99 and Tm of 148.8° C.

Comparative Example 2

Operations were carried out in the same manner as in Example 1, except that the catalysts were changed to a toluene solution of the catalyst (a) (amount of catalyst (a): 0.25 μmol) and a toluene solution of the catalyst (e) (amount of catalyst (e): 0.25 μmol), and the polymerization time was changed to 30 minutes. As a result, 3.38 g of a polymer was obtained. The polymerization activity was 1.35 kg-PP/mmol-Zr·hr, and the resulting polymer had [η] of 1.65 dl/g, Mw of 142000, Mw/Mn of 2.01 and Tm of 147.5° C.

Polymerization conditions, properties of the resulting polymers, etc. in Examples 1 to 5 and Comparative Examples 1 and 2 are set forth in Tables 1 and 2.

normal pressure while the temperature was still maintained at 50° C. Thereafter, while the temperature was still maintained at 50° C., unreacted propylene was purged off. Also by opening a top plate of the autoclave and visually observing the state of the polymer solution in the autoclave, it was confirmed that the polymer solution was in a homogeneous state. The resulting polymer solution in a homogeneous state was introduced into a large excess of methanol to precipitate a phours. As a result, 10.53 g of a polymer was obtained. The polymer, and the polymer was vacuum dried at 80° C. for 12

TABLE 1

| | Transition metal compound(a) | | | | | | | |
|---|---|---|---|---|---|---|---|---|
| | Type [1] | [1] (μmol) | Type [1B] | [1B] (μmol) | Molar ratio [1] (mol)/[1B](mol) | Time (min) | Yield (g) | Activity (kg/mmol-Zr·hr) |
| Ex. 1 | catalyst a | 3.2 | catalyst b | 1.8 | 1.8 | 15 | 4.65 | 3.72 |
| Ex. 2 | catalyst a | 4.0 | catalyst b | 1.0 | 4.0 | 30 | 2.61 | 1.04 |
| Ex. 3 | catalyst b | 4.0 | catalyst f | 1.0 | 4.0 | 40 | 9.87 | 1.48 |
| Ex. 4 | catalyst f | 2.5 | catalyst d | 2.5 | 1.0 | 22 | 1.88 | 1.02 |
| Ex. 5 | catalyst a | 3.0 | catalyst b | 2.0 | 1.5 | 30 | 2.60 | 1.04 |
| Comp. Ex. 1 | catalyst e | 0.25 | catalyst d | 0.25 | 1.0 | 30 | 8.76 | 3.05 |
| Comp. Ex. 2 | catalyst a | 0.25 | catalyst e | 0.25 | 1.0 | 30 | 3.38 | 1.35 |

TABLE 2

| | Polymerization temperature °C. | Tm 1 (°C.) | Tm 2 (°C.) | ΔH (Tm) mJ/mg | Tm 2-Tm 1 (°C.) | Tc (°C.) | ΔH (Tc) mJ/mg | [η] dl/g | MFR g/10 min | Mw | Mn | Mw/Mn | rrrr % |
|---|---|---|---|---|---|---|---|---|---|---|---|---|---|
| Ex. 1 | 50 | 148.3 | 153.5 | — | 5.2 | — | — | 3.82 | — | 254000 | 109000 | 2.33 | — |
| Ex. 2 | 50 | 143.9 | 151.3 | — | 7.4 | — | — | 2.22 | — | 191000 | 85800 | 2.23 | 88.9 |
| Ex. 3 | 50 | 147.8 | 154.6 | — | 6.8 | — | — | 1.92 | — | 142000 | 60400 | 2.35 | — |
| Ex. 4 | 50 | 144.7 | 152.9 | — | 8.2 | — | — | 2.05 | — | 205000 | 100500 | 2.04 | — |
| Ex. 5 | 50 | 147.6 | 153.6 | — | 6 | — | — | 2.01 | — | 201000 | 86200 | 2.33 | — |
| Comp. Ex. 1 | 50 | 142.5 | 148.8 | — | 6.3 | — | — | 1.45 | — | 135000 | 67800 | 1.99 | — |
| Comp. Ex. 2 | 50 | 139.2 | 147.5 | — | 8.3 | — | — | 1.65 | — | 142000 | 70600 | 2.01 | — |

Example 6

In a stainless steel autoclave having an internal volume of 1 liter and having been thoroughly purged with nitrogen, 150 ml of cyclohexane and 150 ml of the solvent A were placed, then propylene was passed through the autoclave at a rate of 30 l/hr, and the contents in the autoclave were maintained at 50° C. for 20 minutes. On the other hand, in a side arm flask having an internal volume of 30 ml and having been thoroughly purged with nitrogen, a magnetic stirrer was placed, then 0.40 μmol of the catalyst (f), 0.10 μmol of the catalyst (d) and 250.0 μmol (in terms of aluminum atom: 3.46 mol/liter) of a hexane slurry of TMAO-341 (available from Tosoh Finechem Corporation) were placed in the flask, and subsequently the solvent A was added, followed by stirring for 1 hour. This solution was added to the mixed solvent of cyclohexane and the solvent A (ratio by volume=1:1) in the stainless steel autoclave through which propylene had been passed, to initiate polymerization. Thereafter, only propylene was continuously fed to maintain the total pressure at 0.5 MPa-G, and polymerization was carried out at 50° C. for 1 hour. Generation of heat in the polymerization was easily controlled, so that the polymer solution was presumed to be in a homogeneous state during the polymerization. After the polymerization was completed, the pressure was released to olymerization activity of polypropylene was 26.3 kg/mmol-Zr·hr, and the resulting polymer had an intrinsic viscosity [η] of 2.23 dl/g, MFR of 1.00 g/10 min and Tm of 158.7° C.

Example 7

In a stainless steel autoclave having an internal volume of 1 liter and having been thoroughly purged with nitrogen, 150 ml of cyclohexane and 150 ml of the solvent A were placed, then propylene was passed through the autoclave at a rate of 30 l/hr, and the contents in the autoclave were maintained at 60° C. for 20 minutes. On the other hand, in a side arm flask having an internal volume of 30 ml and having been thoroughly purged with nitrogen, a magnetic stirrer was placed, then 0.96 μmol of the catalyst (f), 0.24 μmol of the catalyst (d) and 600.0 μmol (in terms of aluminum atom: 3.46 mol/liter) of a hexane slurry of TMAO-341 (available from Tosoh Finechem Corporation) were placed in the flask, and subsequently the solvent A was added, followed by stirring for 1 hour. This solution was added to the mixed solvent of cyclohexane and the solvent A (ratio by volume=1:1) in the stainless steel autoclave through which propylene had been passed, to initiate polymerization. Thereafter, only propylene was continuously fed to maintain the total pressure at 0.5 MPa-G, and polymerization was carried out at 60° C. for 1 hour. Generation of heat in the polymerization was easily controlled, so that the polymer solution was presumed to be in a homogeneous state during the polymerization. After the polymerization was completed, the pressure was released to normal pressure while the temperature was still maintained at 60° C. Thereafter, while the temperature was still maintained at 60° C., unreacted propylene was purged off. Also by opening a top plate of the autoclave and visually observing the state of the polymer solution in the autoclave, it was confirmed that the polymer solution was in a homogeneous state. The resulting polymer solution in a homogeneous state was introduced into a large excess of methanol to precipitate a polymer, and the polymer was vacuum dried at 80° C. for 12 hours. As a result, 17.81 g of a polymer was obtained. The polymerization activity of polypropylene was 18.6 kg/mmol-Zr·hr, and the resulting polypropylene had a number-average molecular weight Mn, as measured by GPC, of 79800, a weight-average molecular weight Mw of 192121, an intrinsic viscosity [η] of 1.93 dl/g, MFR of 1.65 g/10 min and Tm of 156.0° C.

Example 8

In a stainless steel autoclave having an internal volume of 1 liter and having been thoroughly purged with nitrogen, 150 ml of cyclohexane and 150 ml of n-heptane were placed, then propylene was passed through the autoclave at a rate of 30 l/hr, and the contents in the autoclave were maintained at 70° C. for 20 minutes. On the other hand, in a side arm flask having an internal volume of 30 ml and having been thoroughly purged with nitrogen, a magnetic stirrer was placed, then 1.60 μmol of the catalyst (f), 0.40 μmol of the catalyst (d) and 1000.0 μmol (in terms of aluminum atom: 3.46 mol/liter) of a hexane slurry of TMAO-341 (available from Tosoh Finechem Corporation) were placed in the flask, and subsequently the solvent A was added, followed by stirring for 1 hour. This solution was added to the mixed solvent of cyclohexane and n-heptane (ratio by volume=1:1) in the stainless steel autoclave through which propylene had been passed, to initiate polymerization. Thereafter, only propylene was continuously fed to maintain the total pressure at 0.5 MPa-G, and polymerization was carried out at 70° C. for 1 hour. Generation of heat in the polymerization was easily controlled, so that the polymer solution was presumed to be in a homogeneous state during the polymerization. After the polymerization was completed, the pressure was released to normal pressure while the temperature was still maintained at 70° C. Thereafter, while the temperature was still maintained at 70° C., unreacted propylene was purged off. Also by opening a top plate of the autoclave and visually observing the state of the polymer solution in the autoclave, it was confirmed that the polymer solution was in a homogeneous state. The resulting polymer solution in a homogeneous state was introduced into a large excess of methanol to precipitate a polymer, and the polymer was vacuum dried at 80° C. for 12 hours. As a result, 36.91 g of a polymer was obtained. The polymerization activity of polypropylene was 23.1 kg/mmol-Zr·hr, and the resulting polymer had an intrinsic viscosity [η] of 1.60 dl/g, MFR of 3.80 g/10 min and Tm of 151° C.

Example 9

In a stainless steel autoclave having an internal volume of 1 liter and having been thoroughly purged with nitrogen, 150 ml of cyclohexane and 150 ml of the solvent A were placed, then propylene was passed through the autoclave at a rate of 30 l/hr, and the contents in the autoclave were maintained at 50° C. for 20 minutes. On the other hand, in a side arm flask having an internal volume of 30 ml and having been thoroughly purged with nitrogen, a magnetic stirrer was placed, then 0.25 μmol of the catalyst (b), 0.25 μmol of the catalyst (f) and 250.0 μmol (in terms of aluminum atom: 3.46 mol/liter) of a hexane slurry of TMAO-341 (available from Tosoh Finechem Corporation) were placed in the flask, and subsequently the solvent A was added, followed by stirring for 1 hour. This solution was added to the mixed solvent of cyclohexane and the solvent A (ratio by volume=1:1) in the stainless steel autoclave through which propylene had been passed, to initiate polymerization. Thereafter, only propylene was continuously fed to maintain the total pressure at 0.5 MPa-G, and polymerization was carried out at 50° C. for 1 hour. Generation of heat in the polymerization was easily controlled, so that the polymer solution was presumed to be in a homogeneous state during the polymerization. After the polymerization was completed, the pressure was released to normal pressure while the temperature was still maintained at 50° C. Thereafter, while the temperature was still maintained at 50° C., unreacted propylene was purged off. Also by opening a top plate of the autoclave and visually observing the state of the polymer solution in the autoclave, it was confirmed that the polymer solution was in a homogeneous state. The resulting polymer solution in a homogeneous state was introduced into a large excess of methanol to precipitate a polymer, and the polymer was vacuum dried at 80° C. for 12 hours. As a result, 10.25 g of a polymer was obtained. The polymerization activity of polypropylene was 41.0 kg/mmol-Zr·hr, and the resulting polymer had an intrinsic viscosity [η] of 2.08 dl/g and Tm of 160° C.

Example 10

In a stainless steel autoclave having an internal volume of 1 liter and having been thoroughly purged with nitrogen, 150 ml of cyclohexane and 150 ml of the solvent A were placed, then propylene was passed through the autoclave at a rate of 30 l/hr, and the contents in the autoclave were maintained at 60° C. for 20 minutes. On the other hand, in a side arm flask having an internal volume of 30 ml and having been thoroughly purged with nitrogen, a magnetic stirrer was placed, then 0.40 μmol of the catalyst (b), 0.40 μmol of the catalyst (f) and 400.0 μmol (in terms of aluminum atom: 3.46 mol/liter) of a hexane slurry of TMAO-341 (available from Tosoh Finechem Corporation) were placed in the flask, and subsequently the solvent A was added, followed by stirring for 1 hour. This solution was added to the mixed solvent of cyclohexane and the solvent A (ratio by volume=1:1) in the stainless steel autoclave through which propylene had been passed, to initiate polymerization. Thereafter, only propylene was continuously fed to maintain the total pressure at 0.5 MPa-G, and polymerization was carried out at 60° C. for 1 hour. Generation of heat in the polymerization was easily controlled, so that the polymer solution was presumed to be in a homogeneous state during the polymerization. After the polymerization was completed, the pressure was released to normal pressure while the temperature was still maintained at 60° C. Thereafter, while the temperature was still maintained at 60° C., unreacted propylene was purged off. Also by opening a top plate of the autoclave and visually observing the state of the polymer solution in the autoclave, it was confirmed that the polymer solution was in a homogeneous state. The resulting polymer solution in a homogeneous state was introduced into a large excess of methanol to precipitate a polymer, and the polymer was vacuum dried at 80° C. for 12 hours. As a result, 8.42 g of a polymer was obtained. The polymerization activity of polypropylene was 21.0 kg/mmol-Zr·hr, and the resulting polymer had an intrinsic viscosity [η] of 1.77 dl/g, MFR of 2.9 g/10 min and Tm of 157.2° C.

Example 11

In a stainless steel autoclave having an internal volume of 1 liter and having been thoroughly purged with nitrogen, 150 ml of cyclohexane and 150 ml of n-heptane were placed, then propylene was passed through the autoclave at a rate of 30 l/hr, and the contents in the autoclave were maintained at 70° C. for 20 minutes. On the other hand, in a side arm flask having an internal volume of 30 ml and having been thoroughly purged with nitrogen, a magnetic stirrer was placed, then 1.00 µmol of the catalyst (b), 1.00 µmol of the catalyst (f) and 1000.0 µmol (in terms of aluminum atom: 3.46 mol/liter) of a hexane slurry of TMAO-341 (available from Tosoh Finechem Corporation) were placed in the flask, and subsequently the solvent A was added, followed by stirring for 1 hour. This solution was added to the mixed solvent of cyclohexane and n-heptane (ratio by volume=1:1) in the stainless steel autoclave through which propylene had been passed, to initiate polymerization. Thereafter, only propylene was continuously fed to maintain the total pressure at 0.5 MPa-G, and polymerization was carried out at 70° C. for 1 hour. Generation of heat in the polymerization was easily controlled, so that the polymer solution was presumed to be in a homogeneous state during the polymerization. After the polymerization was completed, the pressure was released to normal pressure while the temperature was still maintained at 70° C. Thereafter, while the temperature was still maintained at 70° C., unreacted propylene was purged off. Also by opening a top plate of the autoclave and visually observing the state of the polymer solution in the autoclave, it was confirmed that the polymer solution was in a homogeneous state. The resulting polymer solution in a homogeneous state was introduced into a large excess of methanol to precipitate a polymer, and the polymer was vacuum dried at 80° C. for 12 hours. As a result, 28.66 g of a polymer was obtained. The polymerization activity of polypropylene was 28.7 kg/mmol-Zr·hr, and the resulting polymer had an intrinsic viscosity [η] of 1.53 dl/g, MFR of 4.9 g/10 min and Tm of 153.0° C.

Polymerization conditions, properties of the resulting polymers, etc. in Examples 6 to 11 are set forth in Tables 3 and 4.

TABLE 3

| | Transition metal compound | | | | Polymerization | Polymerization | | Polymerization |
|---|---|---|---|---|---|---|---|---|
| | Amount in terms of Zr atom | | | Molar ratio | temperature | time | Yield | activity |
| | [1] | µmol | [1B] | µmol | [1](mol/[1B](mol) | ° C. | min | g | kg/mmol-Zr-hr |
| Ex. 6 | catalyst f | 0.40 | catalyst d | 0.10 | 4.0 | 50 | 60 | 10.53 | 26.3 |
| Ex. 7 | catalyst f | 0.96 | catalyst d | 0.24 | 4.0 | 60 | 60 | 17.81 | 18.6 |
| Ex. 8 | catalyst f | 1.60 | catalyst d | 0.40 | 4.0 | 70 | 60 | 36.91 | 23.1 |
| Ex. 9 | catalyst b | 0.25 | catalyst f | 0.25 | 1.0 | 50 | 60 | 10.25 | 41.0 |
| Ex. 10 | catalyst b | 0.40 | catalyst f | 0.40 | 1.0 | 60 | 60 | 8.42 | 21.0 |
| Ex. 11 | catalyst b | 1.00 | catalyst f | 1.00 | 1.0 | 70 | 60 | 28.66 | 28.7 |

TABLE 4

| | Polymerization temperature | Tm 1 (° C.) | Tm 2 (° C.) | ΔH (Tm) | Tm 2-Tm 1 (° C.) | Tc (° C.) | ΔH (Tc) | [η] | MFR | Mw | Mn | Mw/Mn | rrrr |
|---|---|---|---|---|---|---|---|---|---|---|---|---|---|
| Ex. 6 | 50 | 154.5 | 158.7 | — | 4.2 | 107 | — | 2.23 | 1 | 228270 | 91300 | 2.50 | 91.5 |
| Ex. 7 | 60 | 150.9 | 156.0 | — | 5.1 | 106 | — | 1.93 | 1.65 | 192121 | 79800 | 2.41 | 91.5 |
| Ex. 8 | 70 | 150.4 | 151.0 | — | 0.6 | 94 | — | 1.6 | 3.8 | 153000 | 70800 | 2.16 | 89.8 |
| Ex. 9 | 50 | 153.0 | 160.0 | — | 7 | 109 | — | 2.08 | unable to be pulverized | 211523 | 85300 | 2.48 | 93.4 |
| Ex. 10 | 60 | 152.1 | 157.2 | — | 5.1 | 106 | — | 1.77 | 2.9 | 166668 | 71000 | 2.35 | 92.4 |
| Ex. 11 | 70 | 144.5 | 153.0 | — | 8.5 | 96 | — | 1.53 | 4.9 | 138612 | 58200 | 2.38 | 90 |

Examples 12 to 17

Reaction was carried out in the same manner as in Example 11, except that the catalysts, the polymerization temperature and the polymerization time were adopted as shown in Table 5.

Polymerization conditions, properties of the resulting polymers, etc. in Examples 12 to 17 are set forth in Tables 5 and 6.

TABLE 5

| | Transition metal compound | | | | Polymerization | Polymerization | | Polymerization |
|---|---|---|---|---|---|---|---|---|
| | Amount in terms of Zr atom | | | Molar ratio | temperature | time | Yield | activity |
| | [1] | mmol | [1B] | mmol | [1](mol/[1B](mol) | ° C. | min | g | kg/mmol-Zr-hr |
| Ex. 12 | catalyst f | 0.30 | catalyst d | 0.20 | 1.5 | 50 | 30 | 31.48 | 104.9 |
| Ex. 13 | catalyst f | 0.50 | catalyst d | 0.30 | 1.7 | 60 | 60 | 13.16 | 43.9 |
| Ex. 14 | catalyst b | 0.47 | catalyst f | 0.23 | 2.0 | 50 | 60 | 22.78 | 75.9 |
| Ex. 15 | catalyst b | 0.80 | catalyst f | 0.40 | 2.0 | 60 | 60 | 13.83 | 46.1 |

TABLE 5-continued

| | Transition metal compound | | | | Polymerization | Polymerization | | Polymerization |
| | Amount in terms of Zr atom | | | Molar ratio | temperature | time | Yield | activity |
| | [1] | mmol | [1B] | mmol | [1](mol/[1B](mol) | °C. | min | g | kg/mmol-Zr-hr |
|---|---|---|---|---|---|---|---|---|---|
| Ex. 16 | catalyst b | 0.53 | catalyst f | 0.18 | 2.9 | 50 | 60 | 22.9 | 76.33 |
| Ex. 17 | catalyst b | 0.90 | catalyst f | 0.30 | 3.0 | 60 | 60 | 36.89 | 122.97 |

TABLE 6

| | Polymerization temperature | Tm 1 (° C.) | Tm 2 (° C.) | ΔH (Tm) | Tm 2 − Tm 1 (° C.) | Tc (° C.) | ΔH (Tc) | [η] | MFR | Mw | Mn | Mw/Mn | rrrr |
|---|---|---|---|---|---|---|---|---|---|---|---|---|---|
| Ex. 12 | 50 | 153.1 | 159.4 | — | 6.3 | 100.0 | — | 1.71 | 3.30 | 150000 | 72100 | 2.08 | — |
| Ex. 13 | 60 | 151.1 | 155.7 | — | 4.6 | 103.0 | — | 1.50 | 6.00 | 131000 | 64000 | 2.05 | — |
| Ex. 14 | 50 | 156.3 | 160.3 | — | 4 | 108.0 | — | 1.97 | 1.60 | — | — | — | — |
| Ex. 15 | 60 | 153.0 | 157.8 | — | 4.8 | 105.5 | — | 1.72 | 3.20 | — | — | — | — |
| Ex. 16 | 50 | 156.3 | 159.7 | — | 3.4 | 119.8 | — | 1.87 | 2.10 | — | — | — | — |
| Ex. 17 | 60 | 152.4 | 157.8 | — | 5.4 | 114.7 | — | 1.60 | 4.10 | — | — | — | — |

Example 18

In a SUS autoclave having an internal volume of 15 ml and having been thoroughly purged with nitrogen, 3.9 ml of a mixed solvent of cyclohexane and the solvent A in a mixing ratio of 9:1 was placed, followed by stirring at 600 rpm. The solution was heated to 50° C., and subsequently the autoclave was pressurized with propylene until the total pressure became 7 bar. In an atmosphere of nitrogen, 3.6 mg (molecular weight: 917.98 g/mol) of the catalyst (c) was placed in a Schlenk flask and dissolved in 16 ml of dehydrated toluene to prepare a metallocene solution of 0.00025 M. Then, 0.48 ml of a suspension of modified methylalumoxane (n-hexane solvent, in terms of aluminum atom: 4.08 M, 1.96 mmol) was added, and the mixture was stirred at room temperature for 15 minutes to prepare a catalyst solution A. In a different Schlenk flask, 3.0 mg (molecular weight: 877.15 g/mol) of the catalyst (a) was placed and dissolved in 20 ml of dehydrated toluene to prepare a metallocene solution B of 0.00017 M. Then, 0.42 ml of a suspension of modified methylalumoxane (n-hexane solvent, in terms of aluminum atom: 4.08 M, 1.71 mmol) was added, and the mixture was stirred at room temperature for 15 minutes to prepare a catalyst solution B. In the autoclave, 0.2 ml (0.05 M, 10 μmol) of triisobutylaluminum, 0.14 ml (0.00025 M, 0.035 μmol) of the catalyst solution A, 0.09 ml (0.00017M, 0.015 μmol) of the catalyst solution B and 0.7 ml of a mixed solvent of cyclohexane and the solvent A in a mixing ratio of 9:1 were placed to initiate polymerization. After the polymerization was carried out at 50° C. for 10 minutes, a small amount of isobutyl alcohol was added to terminate the polymerization. To the resulting polymer, 50 ml of methanol and a small amount of a hydrochloric acid aqueous solution were added, and they were stirred at room temperature for 1 hour. The polymer was filtered and vacuum dried to obtain 0.5587 g of syndiotactic polypropylene. The resulting polymer had a weight-average molecular weight (Mw) of 214000 and a molecular weight distribution (Mw/Mn) of 2.49, and had an intrinsic viscosity [η] of 1.82 dl/g and a melting point (Tm), as measured by DSC, of 156.1° C.

Example 19

In a SUS autoclave having an internal volume of 15 ml and having been thoroughly purged with nitrogen, 3.9 ml of a mixed solvent of cyclohexane and the solvent A in a mixing ratio of 9:1 was placed, followed by stirring at 600 rpm. The solution was heated to 50° C., and subsequently the autoclave was pressurized with propylene until the total pressure became 7 bar. In an atmosphere of nitrogen, 2.9 mg (molecular weight: 917.98 g/mol) of the catalyst (b) was placed in a Schlenk flask and dissolved in 13 ml of dehydrated toluene to prepare a metallocene solution of 0.00024 M. Then, 0.39 ml of a suspension of modified methylalumoxane (n-hexane solvent, in terms of aluminum atom: 4.08 M, 1.59 mmol) was added, and the mixture was stirred at room temperature for 15 minutes to prepare a catalyst solution A. In a different Schlenk flask, 3.0 mg (molecular weight: 877.15 g/mol) of the catalyst (a) was placed and dissolved in 20 ml of dehydrated toluene to prepare a metallocene solution B of 0.00017 M. Then, 0.42 ml of a suspension of modified methylalumoxane (n-hexane solvent, in terms of aluminum atom: 4.08 M, 1.71 mmol) was added, and the mixture was stirred at room temperature for 15 minutes to prepare a catalyst solution B. In the autoclave, 0.2 ml (0.05 M, 10 μmol) of triisobutylaluminum, 0.12 ml (0.00025 M, 0.035 μmol) of the catalyst solution A, 0.12 ml (0.00017M, 0.015 μmol) of the catalyst solution B and 0.7 ml of a mixed solvent of cyclohexane and the solvent A in a mixing ratio of 9:1 were placed to initiate polymerization. After the polymerization was carried out at 50° C. for 10 minutes, a small amount of isobutyl alcohol was added to terminate the polymerization. To the resulting polymer, 50 ml of methanol and a small amount of a hydrochloric acid aqueous solution were added, and they were stirred at room temperature for 1 hour. The polymer was filtered and vacuum dried to obtain 0.5491 g of syndiotactic polypropylene. The resulting polymer had a weight-average molecular weight (Mw) of 236000 and a molecular weight distribution (Mw/Mn) of 2.44, and had an intrinsic viscosity [η] of 1.80 dl/g and a melting point (Tm), as measured by DSC, of 155.6° C.

Example 20

In a SUS autoclave having an internal volume of 15 ml and having been thoroughly purged with nitrogen, 3.8 ml of a mixed solvent of cyclohexane and the solvent A in a mixing ratio of 9:1 was placed, followed by stirring at 600 rpm. The solution was heated to 50° C., and subsequently the autoclave was pressurized with propylene until the total pressure became 7 bar. In an atmosphere of nitrogen, 3.0 mg (molecular weight: 917.98 g/mol) of the catalyst (c) was placed in a Schlenk flask and dissolved in 15 ml of dehydrated toluene to prepare a metallocene solution of 0.00022 M. Then, 0.40 ml of a suspension of modified methylalumoxane (n-hexane solvent, in terms of aluminum atom: 4.08 M, 1.63 mmol) was added, and the mixture was stirred at room temperature for 15 minutes to prepare a catalyst solution A. In a different Schlenk flask, 1.0 mg (molecular weight: 821.04 g/mol) of the catalyst (g) was placed and dissolved in 20 ml of dehydrated toluene to prepare a metallocene solution B of 0.00006 M. Then, 0.15 ml of a suspension of modified methylalumoxane (n-hexane solvent, in terms of aluminum atom: 4.08 M, 0.61 mmol) was added, and the mixture was stirred at room temperature for 15 minutes to prepare a catalyst solution B. In the autoclave, 0.2 ml (0.05 M, 10 μmol) of triisobutylaluminum, 0.20 ml (0.00022 M, 0.044 μmol) of the catalyst solution A, 0.10 ml (0.00006M, 0.006 μmol) of the catalyst solution B and 0.7 ml of a mixed solvent of cyclohexane and the solvent A in a mixing ratio of 9:1 were placed to initiate polymerization. After the polymerization was carried out at 50° C. for 10 minutes, a small amount of isobutyl alcohol was added to terminate the polymerization. To the resulting polymer, 50 ml of methanol and a small amount of a hydrochloric acid aqueous solution were added, and they were stirred at room temperature for 1 hour. The polymer was filtered and vacuum dried to obtain 0.1714 g of syndiotactic polypropylene. The resulting polymer had a weight-average molecular weight (Mw) of 240000 and a molecular weight distribution (Mw/Mn) of 2.70, and had an intrinsic viscosity [η] of 2.29 dl/g and a melting point (Tm), as measured by DSC, of 158.4° C.

Example 21

In a SUS autoclave having an internal volume of 15 ml and having been thoroughly purged with nitrogen, 3.8 ml of a mixed solvent of cyclohexane and the solvent A in a mixing ratio of 9:1 was placed, followed by stirring at 600 rpm. The solution was heated to 50° C., and subsequently the autoclave was pressurized with propylene until the total pressure became 7 bar. In an atmosphere of nitrogen, 2.6 mg (molecular weight: 917.98 g/mol) of the catalyst (b) was placed in a Schlenk flask and dissolved in 16 ml of dehydrated toluene to prepare a metallocene solution of 0.00018 M. Then, 0.35 ml of a suspension of modified methylalumoxane (n-hexane solvent, in terms of aluminum atom: 4.08 M, 1.43 mmol) was added, and the mixture was stirred at room temperature for 15 minutes to prepare a catalyst solution A. In a different Schlenk flask, 1.0 mg (molecular weight: 821.04 g/mol) of the catalyst (g) was placed and dissolved in 20 ml of dehydrated toluene to prepare a metallocene solution B of 0.00006 M. Then, 0.15 ml of a suspension of modified methylalumoxane (n-hexane solvent, in terms of aluminum atom: 4.08 M, 0.61 mmol) was added, and the mixture was stirred at room temperature for 15 minutes to prepare a catalyst solution B. In the autoclave, 0.2 ml (0.05 M, 10 μmol) of triisobutylaluminum, 0.25 ml (0.00018 M, 0.045 μmol) of the catalyst solution A, 0.08 ml (0.00006M, 0.005 μmol) of the catalyst solution B and 0.7 ml of a mixed solvent of cyclohexane and the solvent A in a mixing ratio of 9:1 were placed to initiate polymerization. After the polymerization was carried out at 50° C. for 10 minutes, a small amount of isobutyl alcohol was added to terminate the polymerization. To the resulting polymer, 50 ml of methanol and a small amount of a hydrochloric acid aqueous solution were added, and they were stirred at room temperature for 1 hour. The polymer was filtered and vacuum dried to obtain 0.1770 g of syndiotactic polypropylene. The resulting polymer had a weight-average molecular weight (Mw) of 222000 and a molecular weight distribution (Mw/Mn) of 2.76, and had an intrinsic viscosity [η] of 2.13 dl/g and a melting point (Tm), as measured by DSC, of 158.5° C.

Polymerization conditions, properties of the resulting polymers, etc. in Examples 18 to 21 are set forth in Table 7.

TABLE 7

|  | Polymerization temperature | Tm 1 (° C.) | Tm 2 (° C.) | ΔH (Tm) | Tm 2-Tm 1 (° C.) | Tc (° C.) | ΔH (Tc) | [η] | MFR | Mw | Mn | Mw/Mn |
|---|---|---|---|---|---|---|---|---|---|---|---|---|
| Ex. 18 | 50 | 150.3 | 156.1 | 59.9 | 5.8 | 104.9 | 55.8 | 1.82 | — | 214000 | 86000 | 2.49 |
| Ex. 19 | 50 | 150.1 | 155.6 | 55.8 | 5.5 | 102.3 | 51.8 | 1.80 | — | 236000 | 96700 | 2.44 |
| Ex. 20 | 50 | 153.7 | 158.4 | 61.6 | 4.7 | 108.2 | 54.4 | 2.29 | — | 240000 | 88800 | 2.70 |
| Ex. 21 | 50 | 154.1 | 158.5 | 66.3 | 4.4 | 109.7 | 59.3 | 2.13 | — | 222000 | 80300 | 2.76 |

Comparative Example 3

In a SUS autoclave having an internal volume of 15 ml and having been thoroughly purged with nitrogen, 3.9 ml of a mixed solvent of cyclohexane and the solvent A in a mixing ratio of 9:1 was placed, followed by stirring at 600 rpm. The solution was heated to 50° C., and subsequently the autoclave was pressurized with propylene until the total pressure became 7 bar. In an atmosphere of nitrogen, 3.3 mg (molecular weight: 696.90 g/mol) of the catalyst (e) was placed in a Schlenk flask and dissolved in 10 ml of dehydrated toluene to prepare a metallocene solution of 0.00047 M. Then, 0.55 ml of a suspension of modified methylalumoxane (n-hexane solvent, in terms of aluminum atom: 4.08 M, 2.24 mmol) was added, and the mixture was stirred at room temperature for 15 minutes to prepare a catalyst solution A. In a different Schlenk flask, 3.0 mg (molecular weight: 917.98 g/mol) of the catalyst (c) was placed and dissolved in 10 ml of dehydrated toluene to prepare a metallocene solution B of 0.00033 M. Then, 0.38 ml of a suspension of modified methylalumoxane (n-hexane solvent, in terms of aluminum atom: 4.08 M, 1.55 mmol) was added, and the mixture was stirred at room temperature for 15 minutes to prepare a catalyst solution B. In the autoclave, 0.2 ml (0.05 M, 10 μmol) of triisobutylaluminum, 0.25 ml (0.00047 M, 0.012 μmol) of the catalyst solution A, 0.24 ml (0.00033M, 0.008 μmol) of the catalyst solution B and 0.7 ml of a mixed solvent of cyclohexane and the solvent A in a mixing ratio of 9:1 were placed to initiate polymerization. After the polymerization was carried out at 50° C. for 10 minutes, a small amount of isobutyl alcohol was added to terminate the polymerization. To the resulting polymer, 50 ml of methanol and a small amount of a hydrochloric acid aqueous solution were added, and they were stirred at room temperature for 1 hour. The polymer was filtered and vacuum dried to obtain 1.8637 g of syndiotactic polypropylene. The resulting polymer had a weight-average molecular weight (Mw) of 79800 and a molecular weight distribution (Mw/Mn)

of 2.01, and had an intrinsic viscosity [η] of 1.05 dl/g and a melting point (Tm), as measured by DSC, of 145.6° C.

Comparative Example 4

The same operations as in Comparative Example 3 were carried out, except that the solvent A was replaced with n-hexane. As a result, 1.7962 g of syndiotactic polypropylene was obtained. The resulting polymer had an intrinsic viscosity [η] of 1.05 dl/g and a melting point (Tm), as measured by DSC, of 145.4° C.

Comparative Example 5

In a SUS autoclave having an internal volume of 15 ml and having been thoroughly purged with nitrogen, 3.9 ml of a mixed solvent of cyclohexane and the solvent A in a mixing ratio of 9:1 was placed, followed by stirring at 600 rpm. The solution was heated to 60° C., and subsequently the autoclave was pressurized with propylene until the total pressure became 7 bar. In an atmosphere of nitrogen, 2.7 mg (molecular weight: 917.98 g/mol) of the catalyst (b) was placed in a Schlenk flask and dissolved in 12 ml of dehydrated toluene to prepare a metallocene solution of 0.00025 M. Then, 0.36 ml of a suspension of modified methylalumoxane (n-hexane solvent, in terms of aluminum atom: 4.08 M, 1.47 mmol) was added, and the mixture was stirred at room temperature for 15 minutes to prepare a catalyst solution A. In an autoclave, 0.2 ml (0.05 M, 10 μmol) of triisobutylaluminum, 0.20 ml (0.00025 M, 0.05 μmol) of the catalyst solution A and 0.7 ml of a mixed solvent of cyclohexane and the solvent A in a mixing ratio of 9:1 were placed to initiate polymerization. After the polymerization was carried out at 60° C. for 10 minutes, a small amount of isobutyl alcohol was added to terminate the polymerization. To the resulting polymer, 50 ml of methanol and a small amount of a hydrochloric acid aqueous solution were added, and they were stirred at room temperature for 1 hour. The polymer was filtered and vacuum dried to obtain 0.1510 g of syndiotactic polypropylene. The resulting polymer had an intrinsic viscosity [η] of 1.41 dl/g and a melting point (Tm), as measured by DSC, of 158.8° C.

Comparative Example 6

The same operations as in Comparative Example 5 were carried out, except that the polymerization temperature was changed to 65° C. As a result, 0.0990 g of syndiotactic polypropylene was obtained. The resulting polymer had an intrinsic viscosity [η] of 1.18 dl/g and a melting point (Tm), as measured by DSC, of 158.4° C.

Comparative Example 7

The same operations as in Comparative Example 5 were carried out, except that the catalyst (b) was replaced with the catalyst (g) and the polymerization temperature was changed to 50° C. As a result, 1.0740 g of syndiotactic polypropylene was obtained. The resulting polymer had a weight-average molecular weight (Mw) of 356000 and a molecular weight distribution (Mw/Mn) of 2.39, and had a melting point (Tm), as measured by DSC, of 139.7° C.

Comparative Example 8

The same operations as in Comparative Example 5 were carried out, except that the catalyst (b) was replaced with the catalyst (d). As a result, 0.6465 g of syndiotactic polypropylene was obtained. The resulting polymer had a weight-average molecular weight (Mw) of 102000 and a molecular weight distribution (Mw/Mn) of 1.84, and had an intrinsic viscosity [η] of 1.22 dl/g and a melting point (Tm), as measured by DSC, of 156.0° C.

Polymerization conditions, properties of the resulting polymers, etc. in Comparative Examples 3 to 8 are set forth in Table 8.

TABLE 8

| | Polymerization temperature | Tm 1 (° C.) | Tm 2 (° C.) | ΔH (Tm) | Tm 2-Tm 1 (° C.) | Tc (° C.) | ΔH (Tc) | [η] | MFR | Mw | Mn | Mw/Mn |
|---|---|---|---|---|---|---|---|---|---|---|---|---|
| Comp. Ex. 3 | 50 | 132.6 | 145.6 | 52.3 | 13 | 94.3 | 49.4 | 1.05 | — | 79800 | 39700 | 2.01 |
| Comp. Ex. 4 | 50 | 132.9 | 145.4 | 46.3 | 12.5 | 97.0 | 39.6 | 1.05 | — | — | — | — |
| Comp. Ex. 5 | 60 | 154.1 | 158.8 | 65.2 | 4.7 | 109.4 | 61 | 1.41 | — | — | — | — |
| Comp. Ex. 6 | 65 | 153.0 | 158.4 | 62 | 5.4 | 109.6 | 63.4 | 1.18 | — | — | — | — |
| Comp. Ex. 7 | 50 | 130.2 | 139.7 | 36.3 | 9.5 | 88.7 | 31.9 | not dissolved | — | 356000 | 149000 | 2.39 |
| Comp. Ex. 8 | 60 | 149.4 | 156.0 | 56.3 | 6.6 | 104.6 | 57.8 | 1.22 | — | 102000 | 55400 | 1.84 |

INDUSTRIAL APPLICABILITY

Polymers having narrow molecular weight distribution, high melting point and high molecular weight give great merits to the olefin polymerization industry. For example, when propylene is used as a monomer in the present invention, the resulting propylene polymer has a narrow molecular weight distribution, a high melting point and a high molecular weight. When an olefin polymerization catalyst comprising the aforesaid crosslinked metallocene compound is used, polypropylene having a high melting point and a high molecular weight can be prepared under the polymerization conditions of high temperatures. Also when a monomer other than propylene is used, a polymer having a melting point and a molecular weight equivalent to or higher than those of a polymer obtained by the use of a publicly known metallocene compound can be prepared.

The invention claimed is:
1. A process for preparing an olefin polymer, comprising polymerizing at least one monomer selected from α-olefins of 2 or more carbon atoms, wherein the polymerization is carried out at a temperature of not lower than 40° C. in the presence of a catalyst comprising:

a transition metal compound component (A) comprising two or more kinds of transition metal compounds (a) represented by the following formula [A1], and an organometallic compound component (B) comprising one or more kinds of organometallic compounds (b) selected from the following compounds (b-1), (b-2) and (b-3):

(b-1) an organoaluminum oxy-compound, (b-2) a compound which reacts with the transition metal compound (a) to form an ion pair, (b-3) an organoaluminum compound, propylene is contained in the monomer, and the olefin polymer is an olefin polymer whose weight-average molecular weight (Mw) and number-average molecular weight (Mn), as determined by gel permeation chromatography (GPC), satisfy the relationship of $1 \leq (Mw/Mn) \leq 3$, and which has a melting point (Tm), as determined by DSC, of not lower than 150° C. and an intrinsic viscosity ([η]) of not less than 1.5 dl/g,

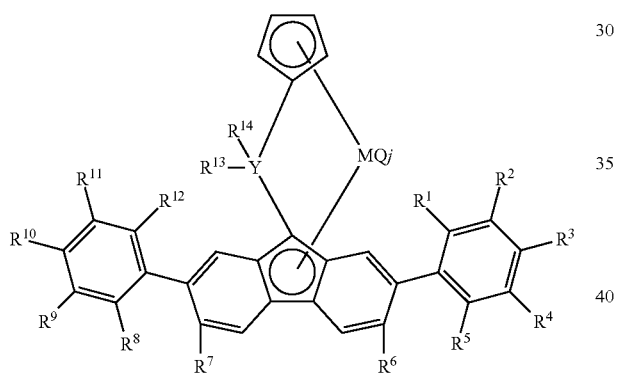

[A1]

wherein $R^1$ to $R^{12}$ are each independently a hydrogen atom, a halogen atom, a hydrocarbon group, a halogen-containing hydrocarbon group, a nitrogen-containing group, an oxygen-containing group or a silicon-containing group, two adjacent groups of $R^1$ to $R^5$ and $R^8$ to $R^{12}$ may be bonded to form a ring, $R^{13}$ and $R^{14}$ are each independently a hydrogen atom, a hydrocarbon group of 1 to 40 carbon atoms or a silicon-containing group of 1 to 40 carbon atoms and may be bonded to each other to form a ring, M is Ti, Zr or Hf, Y is a silicon atom or a carbon atom, Q is a halogen atom, a hydrocarbon group, an anionic ligand or a neutral ligand capable of being coordinated by a lone pair, j is an integer of 1 to 4, and when plural Q are present, they may be the same as or different from each other, wherein at least one of the transition metal compounds (a) of the transition metal compound component (A) is represented by the following formula [A1-2]:

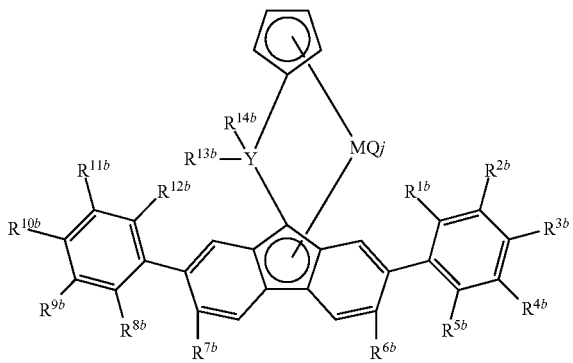

[A1-2]

wherein $R^{1b}$ to $R^{12b}$ are each independently a hydrogen atom, a halogen atom, a hydrocarbon group, a halogen-containing hydrocarbon group, a nitrogen-containing group, an oxygen-containing group or a silicon-containing group, two adjacent groups of $R^{1b}$ to $R^{5b}$ and $R^{8b}$ to $R^{12b}$ may be bonded to form a ring with the proviso that $R^{1b}$, $R^{5b}$, $R^{8b}$ and $R^{12b}$ are each a hydrogen atom, $R^{13b}$ and $R^{14b}$ are each independently an organic group represented by the following formula [A1-2-1], M is Ti, Zr or Hf, Y is a silicon atom or a carbon atom, Q is a halogen atom, a hydrocarbon group, an anionic ligand or a neutral ligand capable of being coordinated by a lone pair, j is an integer of 1 to 4, and when plural Q are present, they may be the same as or different from each other,

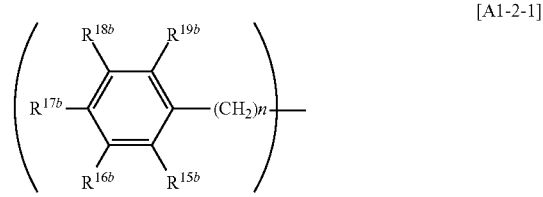

[A1-2-1]

wherein $R^{15b}$ to $R^{19b}$ are each independently a hydrogen atom, a halogen atom, a hydroxyl group, a hydrocarbon group of 1 to 14 carbon atoms, a halogen-containing hydrocarbon group of 1 to 14 carbon atoms, a sulfur-containing group, an oxygen-containing group or a silicon-containing group, two adjacent groups of $R^{15b}$ to $R^{19b}$ may be bonded to form a ring, and n is 0 or 1.

2. The process for preparing an olefin polymer as claimed in claim 1, wherein at least one of the transition metal compounds (a) of the transition metal compound component (A) is represented by the following formula [A1-1];

[A1-1]

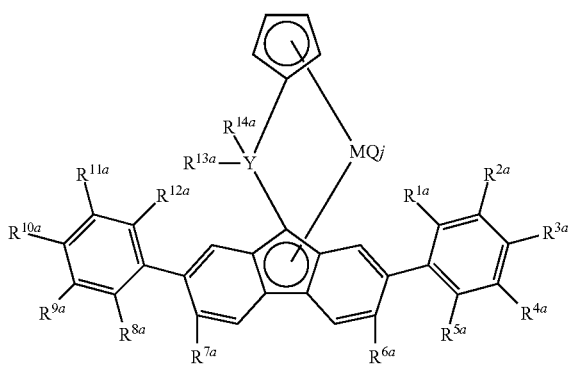

wherein $R^{1a}$ to $R^{12a}$ are each independently a hydrogen atom, a halogen atom, a hydrocarbon group, a halogen-containing hydrocarbon group, a nitrogen-containing group, an oxygen-containing group or a silicon-containing group, two adjacent groups of $R^{1a}$ to $R^{5a}$ and $R^{8a}$ to $R^{12a}$ may be bonded to form a ring with the proviso that $R^{1a}$, $R^{5a}$, $R^{8a}$ and $R^{12a}$ are each independently selected from a hydrogen atom, a hydrocarbon group and a silicon-containing group and at least one of $R^{1a}$, $R^{5a}$, $R^{8a}$ and $R^{12a}$ is selected from a hydrocarbon group and a silicon-containing group, $R^{13a}$ and $R^{14a}$ are each independently an organic group represented by the following formula [A1-1-1], M is Ti, Zr or Hf, Y is a silicon atom or a carbon atom, Q is a halogen atom, a hydrocarbon group, an anionic ligand or a neutral ligand capable of being coordinated by a lone pair, j is an integer of 1 to 4, and when plural Q are present, they may be the same as or different from each other,

[A1-1-1]

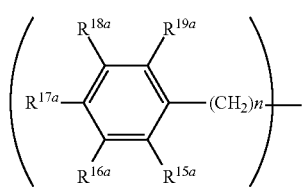

wherein $R^{15a}$ to $R^{19a}$ are each independently a hydrogen atom, a halogen atom, a hydroxyl group, a hydrocarbon group of 1 to 14 carbon atoms, a halogen-containing hydrocarbon group of 1 to 14 carbon atoms, a sulfur-containing group, an oxygen-containing group or a silicon-containing group, two adjacent groups of $R^{15a}$ to $R^{19a}$ may be bonded to form a ring, and n is 0 or 1.

3. The process for preparing an olefin polymer as claimed in claim 2, wherein in the formula [A1-1], $R^{1a}$ and $R^{12a}$ are each a hydrocarbon group of 1 to 40 carbon atoms or a silicon-containing group of 1 to 40 carbon atoms, and $R^{5a}$ and $R^{8a}$ are each a hydrogen atom.

4. The process for preparing an olefin polymer as claimed in claim 1, wherein the transition metal compound (a) is a transition metal compound in which at least one of $R^{3b}$ and $R^{10b}$ in the formula [A1-2] is selected from a halogen atom and a halogen-containing hydrocarbon group, or a transition metal compound in which at least one of $R^{15b}$ to $R^{19b}$ in the formula [A1-2-1] is selected from a halogen atom and a halogen-containing hydrocarbon group of 1 to 14 carbon atoms.

5. The process for preparing an olefin polymer as claimed in claim 1, wherein the polymerization is carried out at a gauge pressure of 0.5 MPa to 10 MPa.

6. The process for preparing an olefin polymer as claimed in claim 1, wherein the polymerization is carried out using an inert hydrocarbon solvent.

7. A mixed catalyst comprising two or more kinds of transition metal compounds (a) represented by the following formula [A1]:

[A1]

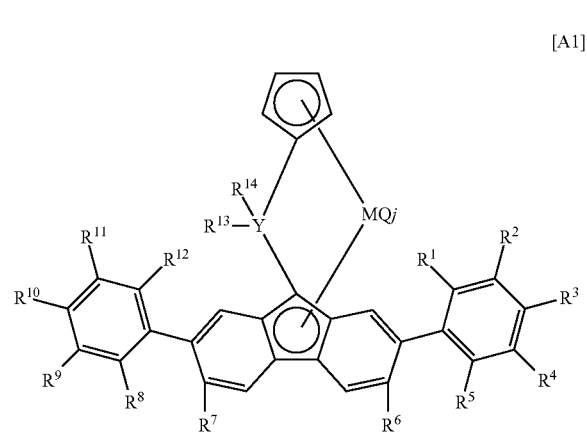

wherein $R^1$ to $R^{12}$ are each independently a hydrogen atom, a halogen atom, a hydrocarbon group, a halogen-containing hydrocarbon group, a nitrogen-containing group, an oxygen-containing group or a silicon-containing group, two adjacent groups of $R^1$ to $R^5$ and $R^8$ to $R^{12}$ may be bonded to form a ring, $R^{13}$ and $R^{14}$ are each independently a hydrogen atom, a hydrocarbon group of 1 to 40 carbon atoms or a silicon-containing group of 1 to 40 carbon atoms and may be bonded to each other to form a ring, M is Ti, Zr or Hf, Y is a silicon atom or a carbon atom, Q is a halogen atom, a hydrocarbon group, an anionic ligand or a neutral ligand capable of being coordinated by a lone pair, j is an integer of 1 to 4, and when plural Q are present, they may be the same as or different from each other, wherein at least one of the transition metal compounds (a) is represented by the following formula [A1-2]:

[A1-2]

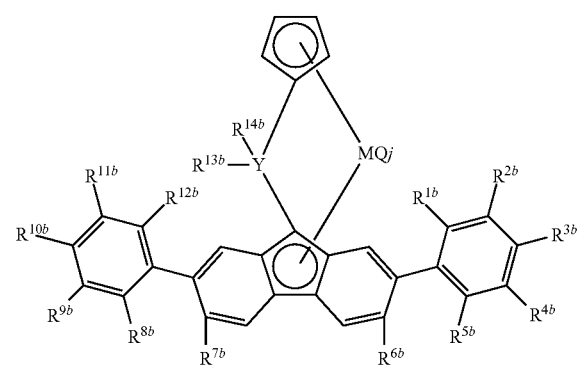

wherein $R^{1b}$ to $R^{12b}$ are each independently a hydrogen atom, a halogen atom, a hydrocarbon group, a halogen-containing hydrocarbon group, a nitrogen-containing group, an oxygen-containing group or a silicon-containing group, two adjacent groups of $R^{1b}$ to $R^{5b}$ and $R^{8b}$ to $R^{12b}$ may be bonded to form a ring with the proviso that $R^{1b}$, $R^{5b}$, $R^{8b}$ and $R^{12b}$ are each a hydrogen atom, $R^{13b}$ and $R^{14b}$ are each independently an organic group represented by the following formula [A1-2-1], M is Ti, Zr or Hf, Y is a silicon atom or a carbon atom, Q is a halogen atom, a hydrocarbon group, an anionic ligand or a neutral ligand capable of being coordinated by a lone pair, j is an integer of 1 to 4, and when plural Q are present, they may be the same as or different from each other,

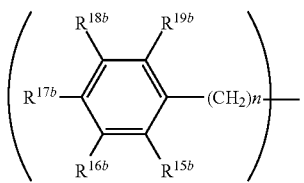

[A1-2-1]

wherein $R^{15b}$ to $R^{19b}$ are each independently a hydrogen atom, a halogen atom, a hydroxyl group, a hydrocarbon group of 1 to 14 carbon atoms, a halogen-containing hydrocarbon group of 1 to 14 carbon atoms, a sulfur-containing group, an oxygen-containing group or a silicon-containing group, two adjacent groups of $R^{15b}$ to $R^{18b}$ may be bonded to form a ring, and n is 0 or 1.

8. The mixed catalyst as claimed in claim 7, wherein at least one of the transition metal compounds (a) is represented by the following formula [A1-1]:

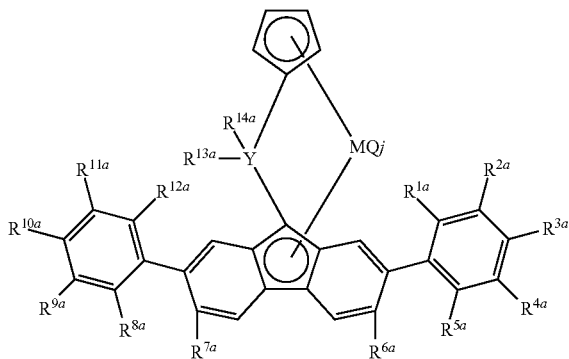

[A1-1]

wherein $R^{1a}$ to $R^{12a}$ are each independently a hydrogen atom, a halogen atom, a hydrocarbon group, a halogen-containing hydrocarbon group, a nitrogen-containing group, an oxygen-containing group or a silicon-containing group, two adjacent groups of $R^{1a}$ to $R^{5a}$ and $R^{8a}$ to $R^{12a}$ may be bonded to form a ring with the proviso that $R^{1a}$, $R^{5a}$, $R^{8a}$ and $R^{12a}$ are each independently selected from a hydrogen atom, a hydrocarbon group and a silicon-containing group and at least one of $R^{1a}$, $R^{5a}$, $R^{8a}$ and $R^{12a}$ is selected from a hydrocarbon group and a silicon-containing group, $R^{13a}$ and $R^{14a}$ are each independently an organic group represented by the following formula [A1-1-1], M is Ti, Zr or Hf, Y is a silicon atom or a carbon atom, Q is a halogen atom, a hydrocarbon group, an anionic ligand or a neutral ligand capable of being coordinated by a lone pair, j is an integer of 1 to 4, and when plural Q are present, they may be the same as or different from each other,

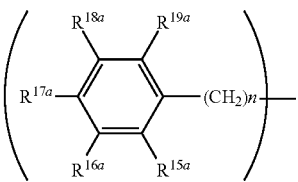

[A1-1-1]

wherein $R^{15a}$ to $R^{19a}$ are each independently a hydrogen atom, a halogen atom, a hydroxyl group, a hydrocarbon group of 1 to 14 carbon atoms, a halogen-containing hydrocarbon group of 1 to 14 carbon atoms, a sulfur-containing group, an oxygen-containing group or a silicon-containing group, two adjacent groups of $R^{15a}$ to $R^{19a}$ may be bonded to form a ring, and n is 0 or 1.

9. The mixed catalyst as claimed in claim 8, wherein in the formula [A1-1], $R^{1a}$ and $R^{12a}$ are each a hydrocarbon group of 1 to 40 carbon atoms or a silicon-containing group of 1 to 40 carbon atoms, and $R^{5a}$ and $R^{8a}$ are each a hydrogen atom.

10. The mixed catalyst as claimed in claim 7, wherein the transition metal compound (a) is a transition metal compound in which at least one of $R^{3b}$ and $R^{10b}$ in the formula [A1-2] is selected from a halogen atom and a halogen-containing hydrocarbon group, or a transition metal compound in which at least one of $R^{15b}$ to $R^{19b}$ in the formula [A1-2-1] is selected from a halogen atom and a halogen-containing hydrocarbon group of 1 to 14 carbon atoms.

\* \* \* \* \*